(12) United States Patent
Taubman et al.

(10) Patent No.: US 10,951,897 B2
(45) Date of Patent: Mar. 16, 2021

(54) METHOD AND APPARATUS FOR IMAGE COMPRESSION

(71) Applicant: KAKADU R & D PTY LTD, Redfern (AU)

(72) Inventors: David Scott Taubman, Redfern (AU); Reji Kuruvilla Mathew, Peakhurst (AU); Aous Thabit Naman, Oxley Park (AU)

(73) Assignee: KAKADU R & D PTY LTD, Redfern (AU)

( * ) Notice: Subject to any disclaimer, the term of this patent is extended or adjusted under 35 U.S.C. 154(b) by 0 days.

(21) Appl. No.: 16/303,323

(22) PCT Filed: May 23, 2017

(86) PCT No.: PCT/AU2017/050484
§ 371 (c)(1),
(2) Date: Nov. 20, 2018

(87) PCT Pub. No.: WO2017/201574
PCT Pub. Date: Nov. 30, 2017

(65) Prior Publication Data
US 2019/0222845 A1 Jul. 18, 2019

(30) Foreign Application Priority Data

May 23, 2016 (AU) ................................ 2016901947
Jul. 27, 2016 (AU) ................................ 2016902956
(Continued)

(51) Int. Cl.
*H04N 19/13* (2014.01)
*H04N 19/93* (2014.01)
(Continued)

(52) U.S. Cl.
CPC .......... *H04N 19/13* (2014.11); *H04N 19/129* (2014.11); *H04N 19/176* (2014.11);
(Continued)

(58) Field of Classification Search
CPC .... H04N 19/129; H04N 19/13; H04N 19/176; H04N 19/184; H04N 19/42; H04N 19/91; H04N 19/93
See application file for complete search history.

(56) References Cited

U.S. PATENT DOCUMENTS

| | | | | |
|---|---|---|---|---|
| 6,678,419 B1 * | 1/2004 | Malvar | .................. | H03M 7/40 375/240.08 |
| 6,778,709 B1 * | 8/2004 | Taubman | ............... | H04N 19/70 348/395.1 |
| 7,330,598 B2 * | 2/2008 | Fukuhara | ............ | H03M 7/4006 375/E7.047 |

OTHER PUBLICATIONS

International Search Report dated Aug. 16, 2017 from corresponding International Patent Application No. PCT/AU2017/050484 (3 pages).

(Continued)

*Primary Examiner* — Farzana Hossain
(74) *Attorney, Agent, or Firm* — Brinks Gilson & Lione; John C. Freeman

(57) ABSTRACT

The invention relates to a method and apparatus for image compression, particularly to an improved block-coding apparatus and method for image compression. Image compression systems such as JPEG and JPEG2000 are known and popular standards for image compression. Many of the advantageous features of JPEG2000 derive from the use of the EBCOT algorithm (Embedded Block-Coding with Optimized Truncation). One drawback of the JPEG2000 standards is computational complexity. This application discloses a relatively fast block-coding algorithm, particularly
(Continued)

as compared with the standard JPEG2000 EBCOT algorithm. Computational complexity is reduced.

15 Claims, 16 Drawing Sheets

(30) Foreign Application Priority Data

| | | |
|---|---|---|
| Aug. 5, 2016 | (AU) | 2016903093 |
| Oct. 17, 2016 | (AU) | 2016904209 |
| Feb. 24, 2017 | (AU) | 2017900628 |

(51) Int. Cl.
  *H04N 19/184* (2014.01)
  *H04N 19/176* (2014.01)
  *H04N 19/129* (2014.01)
  *H04N 19/91* (2014.01)
  *H04N 19/42* (2014.01)

(52) U.S. Cl.
  CPC .......... *H04N 19/184* (2014.11); *H04N 19/42* (2014.11); *H04N 19/91* (2014.11); *H04N 19/93* (2014.11)

(56) References Cited

OTHER PUBLICATIONS

Written Opinion dated Aug. 16, 2017 from corresponding International Patent Application No. PCT/AU2017/050484 (4 pages).
International Preliminary Report on Patentability dated Nov. 27, 2018 from corresponding International Patent Application No. PCT/AU2017/050484 (5 pages).
ITU-T Telecommunication Standardization Sector of ITU; "Information technology—JPEG 2000 image coding system; Motion JPEG 2000"; T.802; Series T: Terminals for Telematic Services; Jan. 2005 (3 pages).
ITU-T Telecommunication Standardization Sector of ITU; "Still-image compression—JPEG 2000; Information technology—JPEG 2000 image coding system; An entry level JPEG 2000 encoder"; T.812; Series T: Terminals for Telematic Services; Aug. 2007; Printed in Switzerland, Geneva, 2008 (62 pages).
Authors: Thubman, David; Marcellin, Michael; JPEG2000 image Compression Fundamentals. Standards and Practice, Standards and Practice, Chapter 17, Springer, 2002, pp. 645-696.

* cited by examiner

METHOD AND APPARATUS FOR IMAGE COMPRESSION

This application is a National Stage application of International Application No. PCT/AU2017/050484, filed May 23, 2017, wherein the above-mentioned International Application claims the benefit of the following under 35 U.S.C. § 119(a): 1) the filing date of May 23, 2016 of Australian Patent Application No. 2016901947, 2) the filing date of Jul. 27, 2016 of Australian Patent Application No. 2016902956, 3) the filing date of Aug. 5, 2016 of Australian Patent Application No. 2016903093, 4) the filing date of Oct. 17, 2016 of Australian Patent Application No. 2016904209, and 5) the filing date of Feb. 24, 2017 of Australian Patent Application No. 2017900628, the entire contents of each of which are incorporated herein by reference.

FIELD OF THE INVENTION

The present invention relates to a method and apparatus for image compression, and particularly, but not exclusively, to an improved block coding apparatus and method for image compression.

BACKGROUND OF THE INVENTION

Image compression systems are known. JPEG and JPEG2000 are popular standards for image compression.

The JPEG2000 algorithm provides a rich set of features that find application in many diverse fields. Some of the most important features are as follows:
- Compression efficiency
- Quality scalability
- Resolution scalability
- Region-of-interest accessibility
- Parallel computation
- Optimized rate control without iterative encoding
- The ability to target visually relevant optimization objectives
- Error resilience
- Compressed domain (i.e. very low memory) transposition and flipping operations
- Ability to re-sequence information at the code-block, precinct or J2K packet level Most of these features derive from the use of the EBCOT algorithm (Embedded Block Coding with Optimized Truncation), while use of the hierarchical Discrete Wavelet Transform (DWT) also plays an important role.

In addition to these core features, the JPEG2000 suite of standards provide good support for the following applications:
- Efficient and responsive remote interactive browsing of imagery (including video and animations) via JPIP.
- Efficient on demand rendering of arbitrary regions from huge imagery sources.
- High dynamic range compression, through the use of non-linear tone curves and/or custom floating point mappings.
- Rich metadata annotation.
- Efficient compression of hyper-spectral and volumetric content.

A drawback of the JPEG2000 standards is computational complexity. For video applications and for applications that are especially power conscious, compression and rendering complexity can become an obstacle to adopting JPEG2000, despite its many benefits.

SUMMARY OF INVENTION

In accordance with a first aspect, the present invention provides a method of image compression, where image samples are formed into code-blocks, with a block coding process that comprises the following steps:
- coding significance information for a set of samples, using codes that depend only on the significance of previous samples in a scanning order;
- coding magnitude and sign information for a set of samples, using codes that depend only on previous magnitude and significance information in the scanning order;
- arranging the significance and magnitude code bits on a set by set basis, such that the significance bits associated with each set of samples appear together in the coded representation (codeword segment);
- repeating the coding and code bit arrangement steps for each set of samples in the code-block.

In an embodiment, the block coding process comprises the step of collecting samples of the code-blocks into groups, so that a set of samples comprises a group of samples. The significance coding step is applied to groups. In one embodiment, each group comprises four contiguous samples, following a raster scan of the code-block. In another embodiment, each group comprises four contiguous samples, following a stripe oriented scan of the code-block with stripes of height 2, so that the groups have a 2×2 organization within the code-block.

In an embodiment, group significance symbols are coded for certain groups within the code-block, using an adaptive code to communicate whether each such group contains any significant samples, or no significant samples at all. In embodiments, group significance symbols are coded for groups whose already coded spatial neighbours within the code-block are entirely insignificant. In embodiments, the step of coding significance for the samples in a group depends on whether the group is the subject of adaptive group significance symbol coding and the value of any such group significance symbol.

In embodiments, the block coding process comprises the step of producing a single codeword segment which comprises multiple bit-streams. In one embodiment, a forward growing bit-stream and a backward growing bit-stream are used (dual bit-stream) so that the lengths of the individual bit-streams need not be separately communicated, it being sufficient for a decoder to know the length of the codeword segment to which they belong. In another embodiment, three bit-streams are used (triple bit-stream), two growing forward, while one grows backward, and the interface between the two forward growing bit-streams is explicitly identified, in addition to the overall length of the codeword segment which is comprised of the three bit-streams. In embodiments, bit-stuffing techniques are applied within the separate bit-streams of a code-block's codeword segment in order to avoid the appearance of forbidden codes within the final compressed codestream.

In embodiments, the bits produced by adaptive coding of group significance symbols are assigned to their own bit-stream (adaptively coded bit-stream) within the code-block's codeword segment.

In an embodiment, group significance symbols are coded using an adaptive arithmetic coding engine.

In another embodiment, group significance symbols are coded using an adaptive run-length coding engine.

In an embodiment, the step of coding significance for a set of samples is based on context, the context of a set of samples depending only on the significance information that has already been coded for previous sets of samples in the code-block, in scan-line order. In an embodiment, the step of context-based significance coding utilizes variable length codes and a single codeword is emitted for each set of samples that is not otherwise known to be entirely insignificant.

In embodiments, the bits produced by context-based significance coding are arranged within a bit-stream (a raw bit-stream) that is separate from the adaptively coded bit-stream.

In an embodiment, the step of coding magnitude information is based on magnitude contexts, wherein the magnitude context for each sample is formed from the magnitude exponents of its neighbours. In an embodiment, the magnitude context is formed from the sum of the neighbouring sample magnitude exponents.

In an embodiment, the bits used to encode magnitude and sign information for significant samples of a code-block are arranged within the same bit-stream (raw bit-stream) as the context-based significance code bits, but separated so that the significance bits for a set of samples appears before the magnitude and sign bits for the same set of samples. In an embodiment, the sets of samples that form the basis for separating significance and magnitude/sign bits within a bit-stream are whole scan-lines of the code-block.

In another embodiment, the bits used to encode magnitude and sign information are arranged within a separate bit-stream (a raw bit-stream) from the context-based significance code-bits.

In other embodiments, magnitude and sign information for significant samples is separated into a variable length coded part and an uncoded part, where the bits produced by the variable length coded part are arranged within the same bit-stream (VLC bit-stream) as the context-based significance code bits, while the uncoded part is arranged within a separate bit-stream (raw bit-stream). In such embodiments, the significance and magnitude VLC bits are separated within the VLC bit-stream so that the significance VLC bits for a set of samples appear before the magnitude VLC bits for the same set of samples. In an embodiment, said sets of samples that are used to separate significance from magnitude VLC bits correspond to group pairs, where significance coding is based on groups In an embodiment, the method of image compression complies with the JPEG2000 format and the block coding process described above is used in place of the usual JPEG2000 block coding process.

In an embodiment, the steps of significance and magnitude coding (Cleanup pass) produce a codeword segment (Cleanup segment) that communicates quantized subband samples within a code-block relative to a certain magnitude bit-plane. In an embodiment, an additional codeword segment (SigProp segment) is produced that represents the significance of certain samples within the code-block that were coded as insignificant in the Cleanup pass, relative to the next finer (higher precision) magnitude bit-plane, along with the sign information for samples that are significant only relative to this finer bit-plane. In an embodiment, a further codeword segment (MagRef segment) is produced that holds the least significant magnitude bit, with respect to the finer (higher precision) bit-plane, for samples that are coded as significant in the Cleanup pass. In embodiments, the SigProp pass codes significance information for previously insignificant samples whose neighbours have been coded as significant in either the Cleanup or SigProp pass, following the 4-line stripe-oriented scan, exactly as defined in JPEG2000. In an embodiment, the significance and sign bits produced by the SigProp pass are separated within a single raw bit-stream, so that any new significance bits for a set of samples precede any sign bits for the same set of samples. In an embodiment, the sets of samples that form the basis for arranging significance and sign bits within the SigProp codeword segment consist of 4 samples.

In an embodiment, the method of this invention has the advantage of providing a relatively fast block coding algorithm, particularly as compared with the standard JPEG2000 EBCOT algorithm. In this document, we use the term FBCOT (Fast Block Coder with Optimized Truncation). The Fast Block Coder option has a number of advantages, which will become clear from the following detailed description.

In accordance with a second aspect, the present invention provides an encoding apparatus, arranged to implement a method in accordance with the first aspect of the invention.

In accordance with a third aspect, the present invention provides an encoding apparatus, comprising a block coder arranged to code significance information for a set of samples, to code magnitude and sign information for the set of samples, to arrange the resulting code-bits within the final compressed result (codeword segment), and to repeat the coding steps and code-bit arrangement step for other sets of samples until significance, sign and magnitude information has been coded for all the sets of samples in a code-block.

In accordance with a fourth aspect, the present invention provides a transcoding process comprising the steps of converting a standard JPEG2000 block bit-stream to a block bit-stream such as would be produced by the method of the first aspect of the invention, including zero or one Cleanup codeword segment, zero or one SigProp codeword segment, and zero or one Magref codeword segment, as required to preserve all information from the JPEG2000 block bit-stream.

In accordance with a fifth aspect, the present invention provides a transcoding apparatus arranged to convert a standard JPEG2000 block bit-stream to a block bit-stream such as would be produced by the method of the first aspect of the invention.

In accordance with a sixth aspect, the present invention provides a transcoding process comprising the steps of converting the block bit-stream such as would be produced by the method of the first aspect of the invention, to a standard JPEG2000 block bit-stream.

In accordance with a seventh aspect, the present invention provides a transcoding apparatus arranged to convert a block bit-stream such as would be produced by the method of the first aspect of the invention, to a standard JPEG2000 block bit-stream.

In accordance with an eighth aspect, the present invention provides a method of image compression complying with the JPEG2000 standard, wherein image samples are formed into code-blocks by a block coding process, the improvement comprising implementing a Cleanup pass in the block coding process, which encodes the information that would be encoded by a corresponding JPEG2000 Cleanup pass, along with the information that would be encoded by all corresponding preceding JPEG2000 coding passes.

In accordance with a ninth aspect, the present invention provides a rate control method that allows a target compressed size to be achieved when compressing an image or sequence of images, with the property that only a limited set of coding pass operations need be performed for each code-block.

In accordance with a tenth aspect, the present invention provides a decoding process, arranged to decode a digital bit-stream produced by the method of the first aspect of the invention.

In accordance with an eleventh aspect, the present invention provides a decoding apparatus, arranged to decode a bit-stream produced by the method of the first aspect of the invention.

BRIEF DESCRIPTION OF THE FIGURES

Features and advantages of the present invention will become apparent from the following description of embodiments thereof, by way of example only, by reference to the accompanying drawings, in which.

DETAILED DESCRIPTION OF EMBODIMENTS OF THE INVENTION

Figure 1:
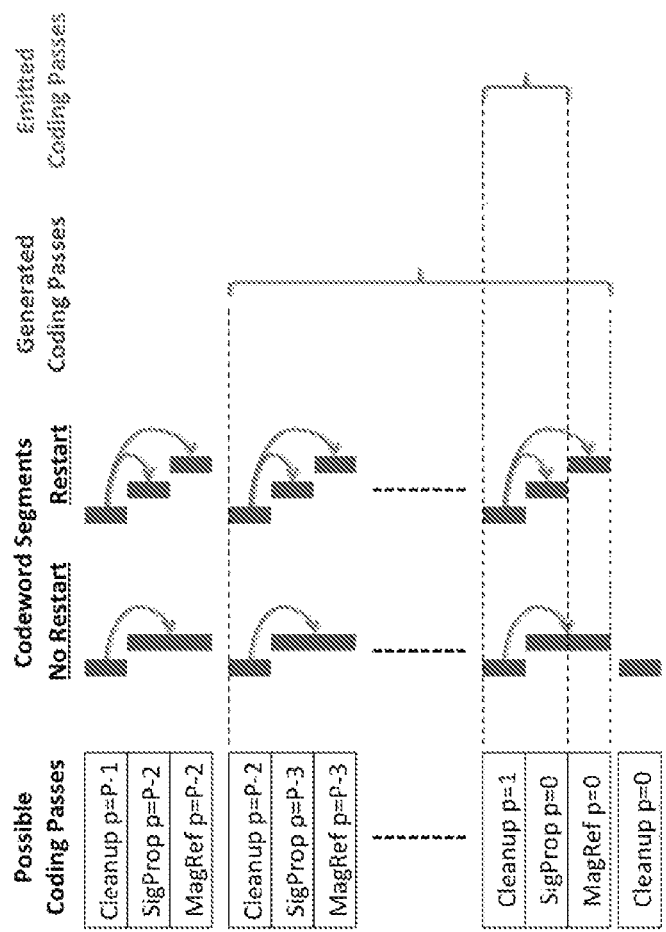
FIG. 1 is a diagram of FAST coding passes showing the codeword segments that are produced with/without the RESTART mode flag, as well as examples of coding passes that might be generated by an encoder and ultimately emitted to the codestream.

Brief Review of the JPEG2000 Block Coding Algorithm

The existing JPEG2000 block coding algorithm processes the subband samples within each code-block through a sequence of coding passes. It is helpful to briefly revise this in order to explain the different, yet related coding pass structure of the FAST block coding algorithm in the next section.

Let X[n] denote the samples within a code-block, indexed by location $n=(n_1,n_2)$, where $0 \leq n_1 < W$ represents horizontal position, $0 \leq n_2 < H$ denotes vertical position, and W and H are the code-block's width and height, respectively. Each coding pass belongs to a bit-plane index $p \geq 0$, with respect to which the quantized magnitude of sample X[n] is given by $$M_P[n] = \left\lfloor \frac{|X[n]|}{2^P \Delta} \right\rfloor$$

Here, $\Delta$ is the quantization step size, that is not present for reversible coding procedures.

We say that sample X[n] is "significant" with respect to bit-plane p if $M_p[n] \neq 0$.

The finest bit-plane (highest quality) corresponds to p=0, while the coarsest quality corresponds to p=K−1, where K is the maximum number of bit-planes for any code-block belonging to a given subband, determined by subband-specific parameters recorded in codestream headers.

For each code-block a parameter $M_{start}$ is communicated via the relevant JPEG2000 packet headers, which is interpreted as the number of missing bit-planes in the code-block's representation. The JPEG2000 block decoder is entitled to expect that all samples in the code-block are insignificant in bit planes $p \geq K-M_{start}$. Equivalently, the total number of bit-planes that may contain significant samples is given by $$P=K-M_{start}$$

The first coding pass in the JPEG2000 block coding algorithm encodes the significance information and sign (for significant samples only) for bit-plane p=P−1. This coding pass is identified as a "Cleanup" pass. Importantly, any significant sample coded in this cleanup pass must have magnitude 1.

For each successively finer bit-plane, three coding passes are produced, identified as the "SigProp" (significance propagation) and "MagRef" (magnitude refinement) coding passes. In total then, there are 3P−2 coding passes, with the following structure.

Cleanup (p=P−1): Codes significance, in bit-plane p, of all samples, plus the sign of significant samples.
SigProp (p=P−2): Visits insignificant neighbours of known significant samples, coding their significance (and sign), in plane p.
MagRef (p=P−2): Visits samples that were already significant with respect to plane p+1, coding the least significant bit of $M_p[n]$.
Cleanup (p=P−2): Codes significance (and sign), in bit-plane p, of all samples whose significance has not yet been established.
SigProp (p=P−3): . . .
MagRef (p=P−3): . . .
Cleanup (p=P−3): . . .
. . .
Cleanup (p=0): . . .

Note that the encoder may drop any number of trailing coding passes from the information included in the final codestream. In fact, the encoder need not generate such coding passes in the first place if it can reasonably anticipate that they will be dropped.

In the standard JPEG2000 block coding algorithm, all coding passes adopt a stripe oriented scanning pattern, with 4 line stripes. The columns of each stripe are visited from left to right before moving to the next stripe, while inside each stripe column the 4 samples of the stripe column are scanned from top to bottom.

The JPEG2000 block coder employs arithmetic coding for all symbols in the cleanup pass, but can optionally just emit raw (uncoded) bits in the SigProp and MagRef coding passes. This mode, in which raw bits are emitted for the non-cleanup passes, is identified as the "arithmetic coder bypass" mode, or just the "BYPASS" mode for short Key Elements of the FAST Block Coding Algorithm in Accordance with this Embodiment of the Invention
Coding Pass Structure The FAST block coder also adopts a coding pass structure, with Cleanup, SigProp and MagRef coding passes, defined with respect to bit-planes p. Significantly, however, the Cleanup pass associated with each bit-plane p fully encodes the magnitudes $M_p[n]$ and the signs of those samples for which $M_p[n] \neq 0$. This information completely subsumes that associated with all previous (larger p) coding passes, so that there is no point in emitting them to the codestream.

It follows that both leading and trailing coding passes may be dropped (or never generated) by the encoder, so long as the first emitted coding pass is a Cleanup pass. In fact, it never makes sense for an encoder to actually include more than 3 coding passes for any given code-block in the final codestream. FIG. 1 illustrates the coding passes that might be generated by the FAST block encoder and/or emitted to the final codestream.

From a decoder's perspective the $M_{start}$ value that is recovered by parsing the JPEG2000 packet headers still serves to identify the bit-plane index $p=K-M_{start}-1$ associated with the first available coding pass for the code-block. However, since the FAST Cleanup pass can encode multiple magnitude bits for any given sample, $M_{start}$ can no longer be interpreted as the number of leading magnitude bits that are all 0. Encoders should be careful to ensure that $M_{start}$ correctly describes the first emitted coding pass for each code-block.

The SigProp and MagRef coding passes generated by the FAST block coder do not depend on each other; they depend only on the immediately preceding Cleanup pass. The SigProp and MagRef coding passes generated by the FAST block coder encode exactly the same information as in JPEG2000, so that the effective quantization associated with truncating the representation at the end of a Cleanup, SigProp or MagRef pass is the same, regardless of whether the FAST block coding algorithm or the standard JPEG2000 block coder is used.

All significance and associated sign information from the SigProp pass is emitted as raw binary digits and all magnitude refinement information from the MagRef pass is emitted as raw binary digits, where these raw bit-streams are subjected only to bit-stuffing procedures that are consistent with the JPEG2000 requirement to avoid the appearance of false marker codes in the range FF90h to FFFFh[1].

[1] Actually, bit-stuffing in JPEG2000 raw codeword segments avoids the appearance of byte pairs whose big-endian hex value lies in the range FF80h to FFFFh, but the block coding algorithm in general is only required to avoid marker codes in the range FF90h to FFFFh.

The MagRef pass adopted by the FAST block coding algorithm is identical to that of the standard JPEG2000 block coder, operating in the arithmetic coder bypass mode (BYPASS mode, for short), except that code bits are packed into bytes of the raw bit-stream with a little-endian bit order. That is, the first code bit in a byte appears in its LSB, as opposed to its MSB.

The SigProp coding pass adopted by the FAST block coding algorithm is also very similar to that of the standard JPEG2000 block coder, operating in the BYPASS mode, with the following differences:

1. Code bits are again packed into bytes of the raw bit-stream with a little-endian bit order, whereas the JPEG2000 coder uses a big-endian bit packing order.
2. For stripes of height 3 or height 4 the significance bits associated with each stripe column are emitted first, followed by the associated sign bits, before advancing to the next stripe column.
3. For stripes of height 2, the significance bits associated with each pair of stripe columns are emitted first, followed by the associated sign bits, before advancing to the next pair of stripe columns.
4. For stripe columns of height 1, the significance bits associated with each group of four stripe columns (4 samples) are emitted first, followed by the associated sign bits, before advancing to the next group of four stripe columns.

These modifications together have implementation advantages over the original JPEG2000 methods, especially for software based implementations. We note that the last three modifications are consistent with the principle of separating significance information from other aspects of the sample data, a principle which we adopt on a larger scale for the Cleanup pass, as explained below. These last three modifications are carefully crafted to allow accelerated decoding based on modest lookup tables. The last two modifications are important only for applications in which short and wide code-blocks are expected to occur frequently—especially low latency applications. For other applications, it may be appropriate to extend the second modification to cover all stripe heights and eliminate the last two.

Apart from the block coding algorithm itself, the FAST block coder has no impact on other JPEG2000 codestream constructs or their interpretation. Precincts, packets, tiles, transforms, and all other JPEG2000 elements remain unchanged. In particular, the construction of JPEG2000 packets depends upon the codeword segments that are produced by the block coder, regardless of whether the conventional block coding algorithm or the FAST block coding algorithm is used.

A codeword segment is a sequence of bytes, whose length is necessarily identified via the packet header. The standard JPEG2000 block coder may pack all coding passes into a single codeword segment (default mode); in the RESTART mode, however, each coding pass is assigned its own codeword segment, while in the BYPASS mode(s) without RESTART, SigProp and MagRef coding passes are collectively assigned a codeword segment.

The FAST block coder supports all of the mode flags defined for the standard JPEG2000 block coder, except for the BYPASS mode flag, which is implied, and the RESET mode flag which has no meaning. Since no more than 3 coding passes are emitted to the codestream, and BYPASS is implied, there are only two types of codeword segments that can arise, depending on the RESTART mode flag, as shown in FIG. 1. The CAUSAL mode must be retained, as an option, to ensure completely reversible transcoding to/from all standard JPEG2000 block bit-streams, since the CAUSAL mode affects the interpretation of the SigProp coding pass.

Cleanup Pass Overview

The remainder of this section is devoted to describing the FAST block coder's Cleanup pass. Before proceeding, it is helpful to provide summary block diagrams for the encoder and decoder. To facilitate later discussion, we provide the encoding and decoding block diagrams in several versions, corresponding to several different variants of the FAST cleanup pass that are covered by this document. The variants are distinguished in two main ways, as follows:

1. Each variant has either a dual bit-stream structure, or a tripple bit-stream structure. The dual bit-stream structure is conceptually simpler, and very slightly more efficient, from a compression point of view, but the tripple bit-stream structure provides more options for software and hardware optimization, and so is generally to be preferred. The dual bit-stream structure interleaves VLC and MagSgn bits within one bit-stream, while the tripple bit-stream structure provides separate VLC and MagSgn bit-streams.
2. The other distinguishing feature is whether the magnitude information for each significant sample is consolidated within one bit-stream (the MagSgn bit-stream) or distributed between the VLC bit-stream and the MagSgn bit-stream. The distributed approach provides slightly less opportunity to exploit statistical redundancy, but improves software decoding throughput and increases hardware decoding clock rates, by reducing or eliminating sample-to-sample dependencies. The distributed approach also reduces the worst case data rate associated with the MagSgn bit-stream, which is better for hardware implementations.

Figure 2:
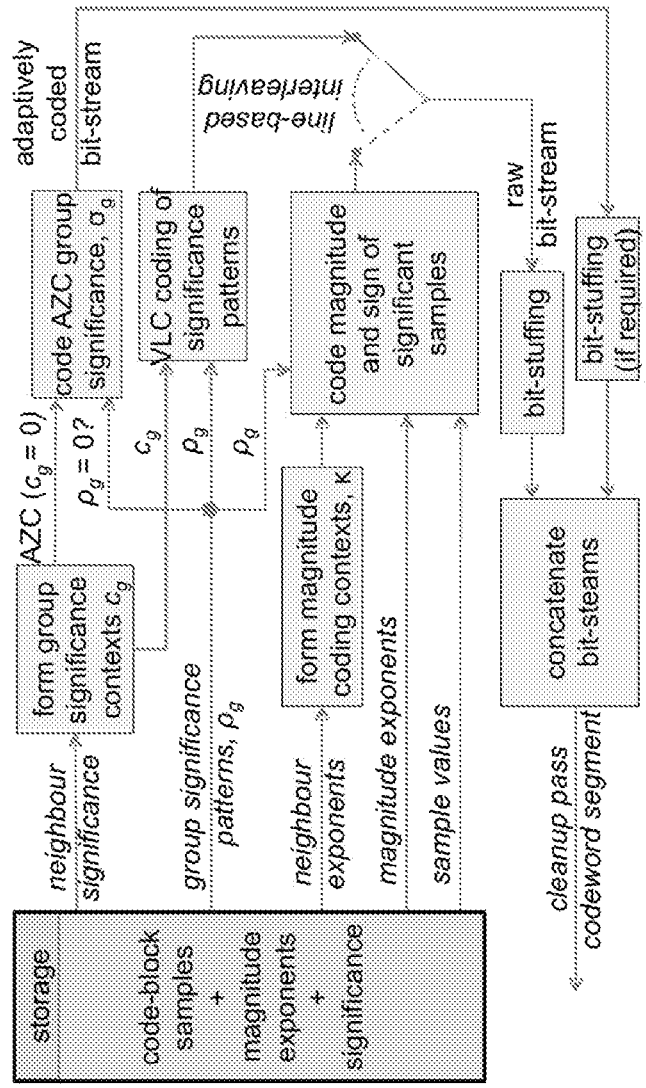
FIG. 2 is a block diagram of the Cleanup pass encoder (dual bit-stream version)
Figure 3:
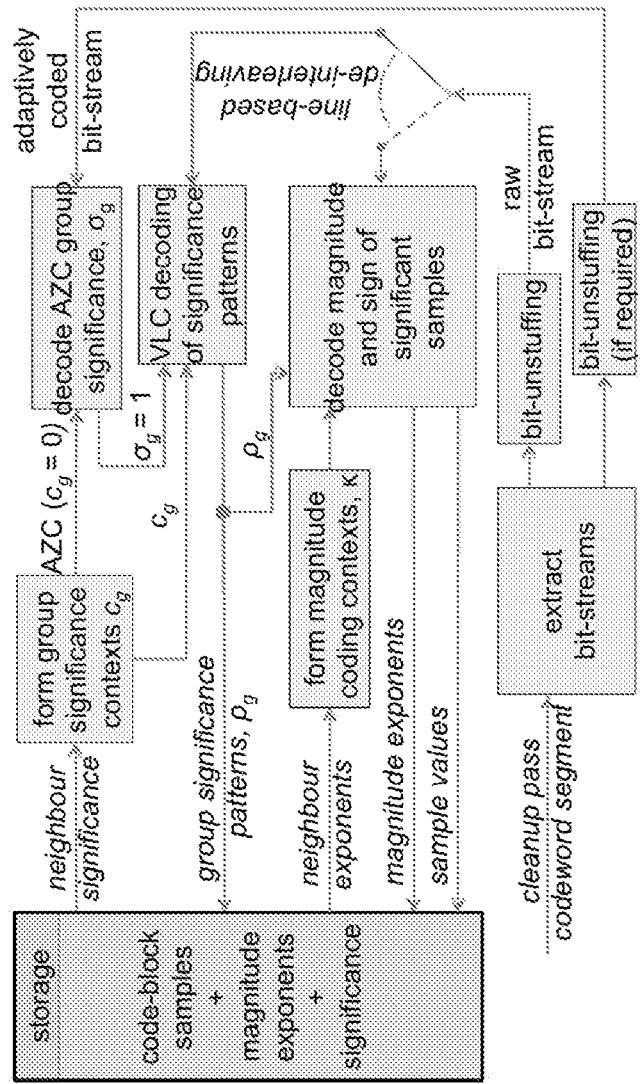
FIG. 3 is a block diagram of the Cleanup pass decoder (dual bit-stream version)
Figure 4:
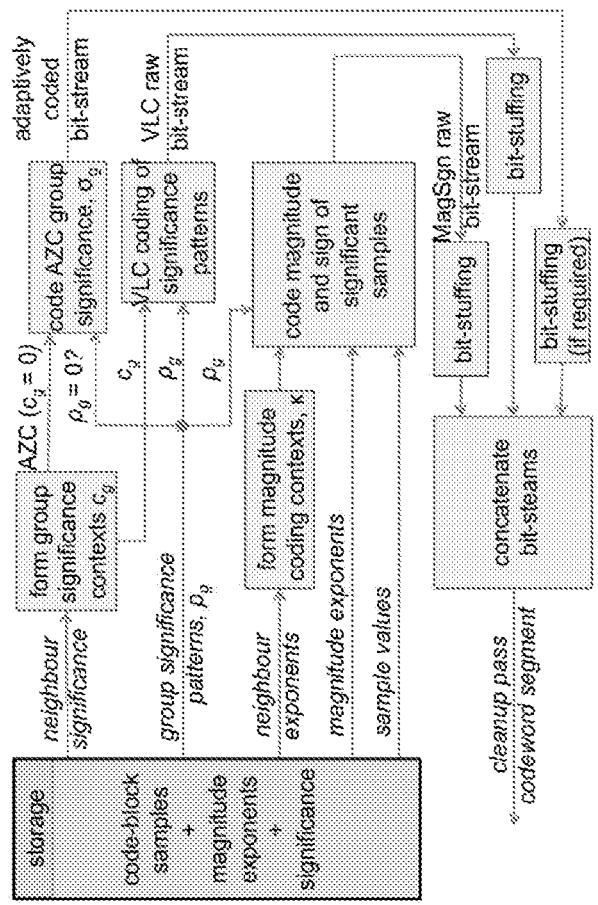
FIG. 4 is a block diagram of the Cleanup pass encoder (triple bit-stream version)
Figure 5:
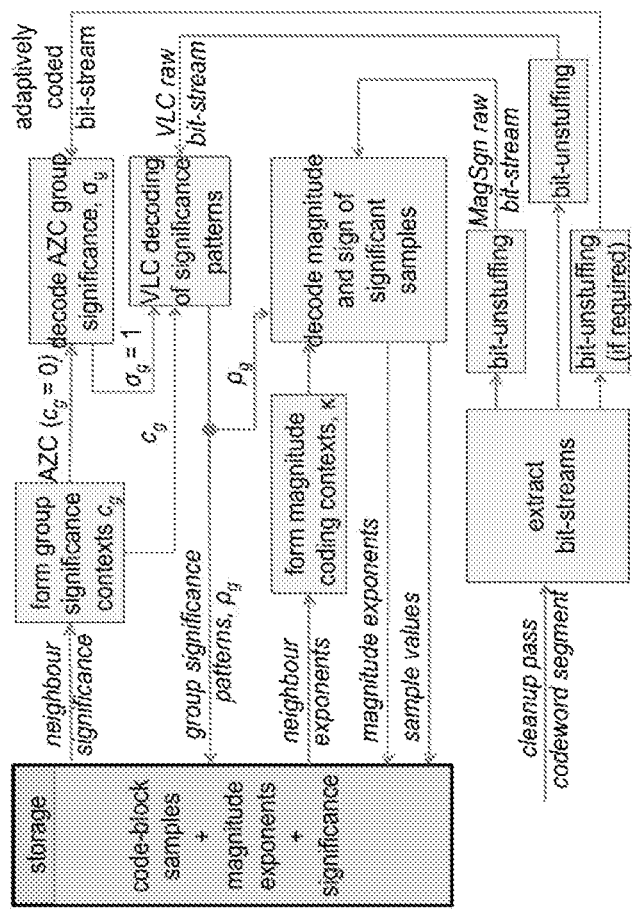
FIG. 5 is a block diagram of the Cleanup pass decoder (triple bit-stream version)
Figure 6:
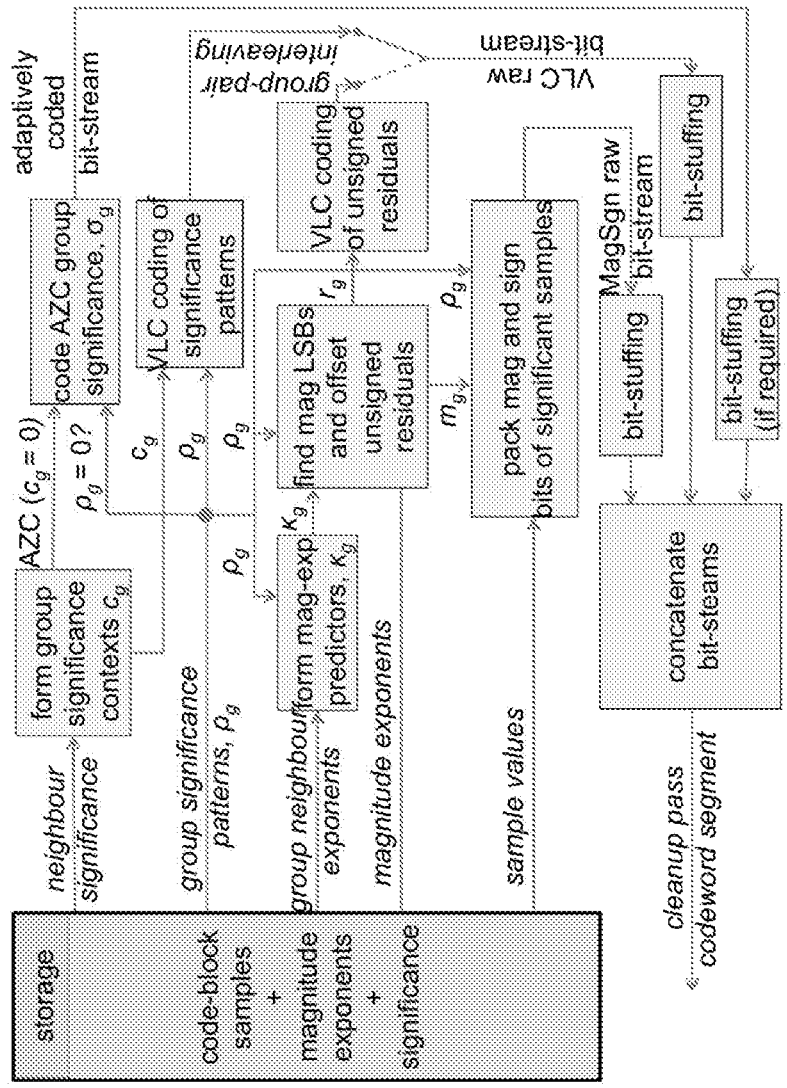
FIG. 6 is a block diagram of the Cleanup pass encoder (triple bit-stream version with distributed magnitude information)
Figure 7:
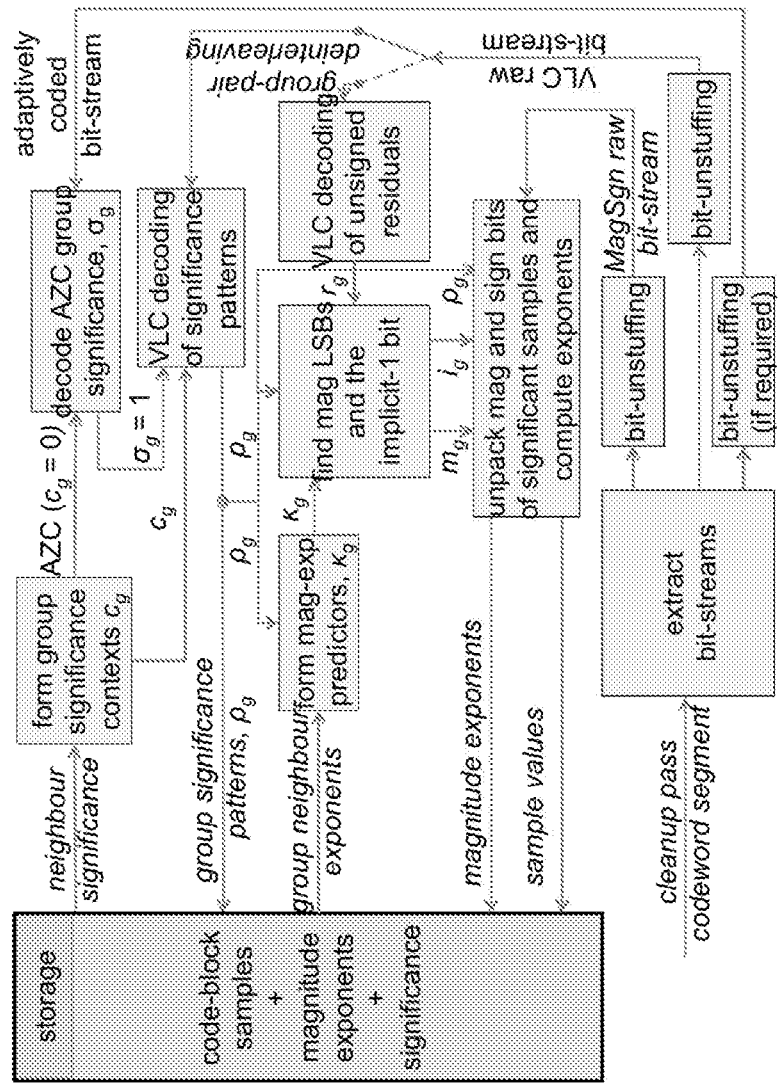
FIG. 7 is a block diagram of the Cleanup pass decoder (triple bit-stream version with distributed magnitude information)

FIG. 2 and FIG. 3 provide encoder and decoder block diagrams for the dual bit-stream structure with consolidated magnitudes. FIG. 4 and FIG. 5 provide the corresponding block diagrams for the triple bit-stream structure, again with consolidated magnitudes. Finally, FIG. 6 and FIG. 7 show the encoding and decoding procedures for the triple bit-stream variant with distributed magnitude information. We do not bother to explicitly present the variant with dual bit-streams and distributed magnitude information here, but the block diagrams should be apparent from those already provided. The elements of these block diagrams are explained in the following sub-sections, but the "storage" element perhaps deserves some clarification up front.

The storage element represents a buffer that can store the code-block's samples, as well as some deduced state information. During encoding, the storage element is populated with subband samples, after which the derived quantities (significance flags and magnitude exponents) can be found immediately. During decoding, the storage element is progressively populated with subband samples and the derived quantities (significance flags and magnitude exponents) as the decoding progresses. The storage element need not necessarily accommodate all samples or derived quantities for the entire code-block, but it is easiest to conceptualize things this way. A more thorough discussion of storage requirements appears below.

Dual or Triple Bit-Streams in the Cleanup Pass

As mentioned, for compatibility with the JPEG2000 codestream structure, the FAST block coder's Cleanup pass produces a single codeword segment whose length is communicated for the relevant packet header(s) via the existing methods. In the FAST block coder, however, this codeword segment is divided into two or three bit-streams:
A. an adaptively coded bit-stream, which grows forwards;
B. a raw bit-stream that grows backwards from the end of the codeword segment; and
C. in some variants, a second raw bit-stream that grows forwards from the start of the codeword segment.

The term "adaptively coded" here identifies the presence of a context-adaptive entropy coder, which learns and adapts to symbol statistics in one way or another. By contrast, the raw bit-streams just consist of packed bits, apart from mandatory bit-stuffing to avoid false marker codes (see below). Various adaptive coding technologies can be employed, of which this document describes two that are of particular interest: a) the MQ arithmetic coder from JPEG2000; and b) a MEL coding algorithm, similar to that used by JPEG-LS. As it turns out, both offer very similar compression efficiency and similar state transition patterns, but the MEL coding approach has a smaller state machine and so is generally preferred.

Figure 8:
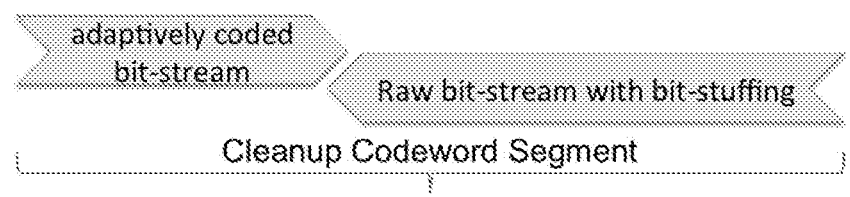
FIG. 8 is a representation of a dual bit-stream codeword structure for the FAST block coder's Cleanup pass.

FIG. 8 illustrates the dual bit-stream arrangement. Referring to the corresponding block diagrams of FIG. 2 and FIG. 3, the raw bit-stream here includes VLC significance codewords, as well as magnitude and sign bits, interleaved on a line-by-line basis.

Figure 9:
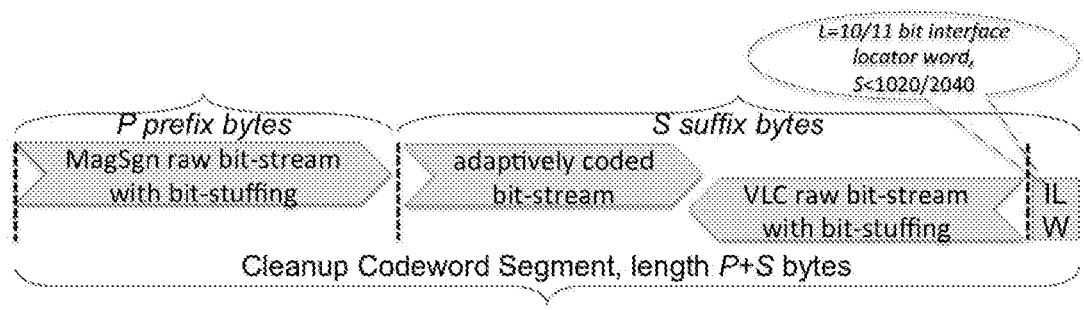
FIG. 9 is a representation of a triple bit-stream codeword structure for the FAST block coder's Cleanup pass.

FIG. 9 illustrates the triple bit-stream arrangement, in which VLC significance codewords are completely separated (decoupled) from the magnitude and sign bits, rather than being interleaved—see FIG. 4 and FIG. 5. The triple bit-stream arrangement is slightly less efficient, since extra signalling (the interface locator word) is required to identify the boundary between the two forward growing bit-streams. There is no need, however, to explicitly identify the boundary between forward and reverse growing bit-streams, which can be disjoint, meet in the middle or even overlap, so long as this does not interfere with correct decoding.

Here, the objective is to enable the use of different coding technologies, representing different trade-offs between processing complexity and coding efficiency, while still presenting only one codeword segment to the packet generation and parsing machinery for maximum compatibility with the existing JPEG2000 standard.

The use of two different bit-streams within a single codeword segment has significant advantages in enabling concurrent/parallel processing. The adaptively coded bit-stream associated with the FAST block coder can be encoded and decoded independently from the other bit-stream(s). In advanced decoder implementations, some or all of the adaptively coded symbols might be decoded well ahead of the raw symbols whose decoding depends upon them. Encoders can defer the adaptive encoding steps until after some or all of the raw bits have been emitted for a code-block, which is beneficial in software implementations and may well be beneficial for hardware deployments.

While slightly less efficient, the triple bit-stream arrangement is preferred on the grounds that it provides even greater levels of concurrency, supporting greater levels of flexibility in the ordering of encoding and decoding processes. These can be especially beneficial in hardware. As described shortly, the coding processes are such that significance information can be encoded or decoded independently of the magnitude and sign information. This means that a decoder can process the adaptively coded bit-stream without reference to the other two bit-streams and can process the VLC raw bit-stream without reference to the MagSgn raw bit-stream. Encoders can generate all three bit-streams concurrently if desired, without the synchronization constraints imposed by the interleaving operation of the dual bit-stream variant. A further important advantage of the triple bit-stream arrangement is that both encoders and decoders can process any significance propagation (SigProp) or magnitude refinement (MagRef) passes concurrently with the Cleanup pass, without substantial inter-pass delays.

These properties facilitate guaranteed single clock per sample processing for hardware implementations of the block coder, which combines with the availability of multiple code-blocks to enable very high data throughputs to be obtained at low clock rates.

The benefits that the dual and triple bit-stream structures bring in concurrency and decoupling are independent of the order in which the bit-streams evolve, so there are of course other very closely related bit-stream arrangements that could be considered. We prefer the arrangement in FIG. 7 for a number of reasons, which may be appreciated from the following points.

1. The MagSgn bit-stream tends to be the largest of the bit-streams at high bit-rates, so there is some benefit to having this one grow forwards from the start of the codeword segment, minimize the effort required to rearrange the generated bytes at the end of each code-block.
2. The combined size of the VLC bit-stream and the adaptively coded bit-stream can be deterministically bounded.
   a. With consolidated magnitude information, where all magnitude related bits for the significant samples are found in the MagSgn bit-stream alone, this bound can be shown to satisfy $S_{max} < 1020$ bytes, subject to suitable choices for the codes that are employed within the VLC bit-stream, allowing us to signal the boundary between two forward growing bit-streams using an L=10-bit interface locator word (ILW).
   b. For variants which distribute the coded magnitude information between the VLC bit-stream and the MagSgn bit-stream, the combined size of the VLC and adaptively coded bit-streams increases, with a bound that can be shown to satisfy $S_{max} < 2040$ bytes, subject to suitable choices for the codes that are employed with the VLC bit-stream. This allows us to signal the boundary between the two forward growing bit-streams using an L=11-bit interface locator word (ILW).

Placing the L-bit (i.e, 10- or 11-bit) ILW at the end of the codeword segment, with its 8 MSB's appearing in the last byte, has the benefit that a terminal "FFh" is avoided (a JPEG2000 requirement). The L-8 (i.e., 2 or 3) LSB's of the ILW occupy the least significant L-8 bit positions of the codeword segment's second last byte, whose other 16-L (i.e., 6 or 5) bits are then available for code bits.

3. If extra bytes need to be stuffed between the two forward growing segments to avoid buffer underflow in CBR applications, the stuffing location can easily be found, even after multiple codeword segments have been emitted to a codestream buffer, simply by reading the last two generated bytes.

The concurrency benefits of the multiple bit-stream arrangements here are also independent of the choice of adaptive coding algorithm used for the adaptively coded bit-stream. In the next two sub-sections, we provide specific details and considerations for the two adaptive coding technologies that we have explored in depth: MQ and MEL coding.

The entire codeword segment is required to be free from false marker codes in the range FF90h to FFFFh, which is a general requirement found in multiple ISO/IEC image coding standards. That is, no pair of bytes should have the property that the hex value of the first is FFh, while that of the second is in the range 90h to FFh. Additionally, the JPEG2000 standard requires that the terminal byte of a codeword segment may not be FFh, so as to allow later re-arrangement of codeword segments, without the risk of creating false marker codes. The MQ arithmetic coder used in JPEG2000 and also in JBIG2 already has the property that it cannot emit false marker codes.

For other adaptive coding algorithms, bit-stuffing needs to be introduced separately to avoid false marker codes, as described below for the case of MEL coding.

For forward growing raw bit-streams, false marker codes are avoided using the same strategy as the raw bit-streams produced in the JPEG2000 block coder's BYPASS mode. Specifically, the byte following an emitted FFh contains only 7 valid bits, with 0 stuffed into its most significant bit position.

The raw bit-stream that grows backward from the end of the Cleanup codeword segment avoids false marker codes as follows. Bits are emitted from the coding procedure to the raw bit-stream via an emit raw operation, which packs bits into bytes starting from the least significant bit position. Once a byte has been assembled, it is combined with the last emitted byte (0 if there is none) to form a 16-bit big-endian unsigned integer V. If the encoder finds that $$(V \,\&\, 7FFFh) > 7F8Fh$$

then the most significant bit of V is reset before emitting the newly generated byte, after which the bit that was just removed is passed to emit-rraw so that it becomes the least significant bit of the next byte.

There are, of course, fast implementations that are equivalent to the bit-stuffing strategy described above[2]. The decoder watches for the same condition to remove the stuffing bit as it reads bytes (backwards) from the raw bit-stream.

[2] For software implementations, all bit-stuffing procedures can be efficiently vectorized, so that individual byte-oriented tests are not required.

An alternate bit-stuffing approach could be considered in which the condition tested is simply $$(V \,\&\, 7F80h) \neq 0$$

This approach is very slightly simpler, at the expense of a similarly tiny reduction in compression efficiency.

Care must be taken at the interface between the bit-streams, to ensure that no false marker codes are generated there either. To do this, encoders may need to insert an additional byte, or flip unused bits at the tail of one or another of the bit-streams.

For the dual bit-stream arrangement, the encoder addresses the requirement that the last byte of the codeword segment is not FFh, by emitting a stuffing bit (i.e. 0) to the backward growing raw bit-stream as its very first step; this stuffing bit is consumed by the decoder before any valid bits.

For the triple bit-stream arrangement, no initial stuffing bit is required, since the backward growing VLC raw bit-stream starts from the last 16-L (i.e, 6 or 5) bits of the second last byte of the codeword segment, the last L (i.e., 10 or 11) bits being occupied by an interface locator word, whose final byte that cannot be as large as FFh. For the purpose of the bit-stuffing and bit-unstuffing algorithms, the last L bits of the codeword segment are treated as if they were all 1's; this allows the encoder to perform bit-stuffing and generate completed bytes for all bit-streams without any dependence on the L-bit value which will be inserted into the interface locator word.

In a practical implementation, this may be achieved by actually emitting L place-holder bits (all equal to 1) to the VLC raw bit-stream prior to encoding, overwriting these bits with the ILW value after all encoding is complete. Meanwhile, the decoder can first extract the ILW to determine S, replacing the corresponding L bits with 1's, and then pass all S suffix bytes to the bit-unstuffing machinery associated with the VLC raw bit-stream; in this approach, the L place-holder bits would be consumed from the VLC raw bit-stream and discarded before actual block decoding commences.

For the triple bit-stream arrangement, the decoder always appends a single FFh at the end of the MagSgn bit-stream prior to ingesting its bits to decode magnitude and sign information. Accordingly, the encoder can, and generally should discard any terminal FFh that would otherwise be emitted to the MagSgn bit-stream, avoiding any possibility that false marker codes arise at the interface between the two forward growing bit-stream segments.

In some applications, such as the JPEG-XS application with a CBR constraint, it may be necessary to introduce stuffing bytes into the cleanup codeword segment to ensure that communication buffers do not underflow. This is easily achieved with the dual or triple bit-stream structures described here. Stuffing bytes can be introduced between forward and backward growing bit-streams without interfering with correct decoding. For the triple bit-stream arrangement, we strongly recommend that stuffing bytes are inserted immediately before the second forward growing bit-stream, at the location identified via the interface locator byte. Moreover, we recommend that such stuffing bytes follow the pattern FFh 80h FFh 80h . . . , which is easy to detect and safely remove without actually decoding any bits.

MQ Adaptive Arithmetic Coding

While arithmetic coding is an extremely powerful and flexible technology, the FAST block coder uses adaptive coding to represent a variable length string of binary symbols $\sigma_{AZC}[i]$, known as AZC symbols. As explained below, these samples all have identical (all-zero) neighbourhoods, so there is no a priori way to separate them into sub-classes with different statistics. Accordingly, only one adaptive MQ coding context need be employed, which simplifies both encoding and decoding implementations.

The MQ coder employs a state machine with 46 reachable states, where state transitions occur only on renormalization events. Renormalization always occurs when an LPS (least-probable symbol) is coded, where the LPS almost invariably corresponds to $\sigma_{AZC}[i]=1$. Additionally, one MPS (most-probable symbol) renormalization event typically occurs between LPS symbols. Thus, approximately two state transitions can be expected for each run of 0 AZC symbols that is terminated by a 1. In fact, the MQ coder can be understood as a type of run-length coder, with a lineage that can be traced back to the "skew coder," which is nothing other than an efficient run-length coding algorithm.

While details of the MQ coding algorithm need not be repeated here, we point out that the dual bit-stream structure employed by the FAST block coder has an impact on the choice of MQ termination strategy. The simplest approach is to use the well-known Elias termination methodology, in which the interval base register C of the MQ coder is augmented by $2^{14}$ (the MQ interval length register A is 16 bits wide) and bytes are flushed from the coder until this added bit 14 has been flushed. If the last flushed byte is FFh, one additional byte might then need to be emitted between the MQ and raw bit-streams of the Cleanup bit-stream segment to avoid false marker codes.

Truly optimal MQ bit-stream terminations are also possible, of course, at a larger cost in complexity that is unlikely to be warranted. Minimal length MQ terminations often share some of their information bits with the raw bit-stream and achieve an average reduction in overall Cleanup codeword segment length of approximately 6 bits relative to the Elias termination approach described above.

MEL Adaptive Coding Algorithm

The MELCODE is most easily understood as an adpative run length code. For convenience of explanation, therefore, we consider that the AZC symbol stream $\sigma_{AZC}[i]$ is first converted to a sequence of run lengths $R_{AZC}[j]$, where each run represents the number of 0's that precede the next 1. Since there is at most one AZC symbol for every group of 4 code-block samples, and no code-block may have more than 4096 samples, the maximum run-length that need be coded is 1024—this corresponds to an entirely insignificant code-block so should not normally occur, but we allow for the possibility nonetheless. This allows a non-empty codeword segment to be used to represent an entirely empty code-block, which is inefficient, but can be useful for the avoidance of buffer underflow in CBR applications.

The MEL coder used in the JPEG-LS standard has 32 states, but we find it helpful to define a different state machine for the FAST block coder, with only 13 states state indices k in the range 0 to 12. Each state k is associated with an exponent $E_{MEL}[k]$ and a threshold $T_{MEL}[k]=2^{E_{MEL}[k]}$. Table 1 lists the values of the key quantities.

TABLE 1

MEL coding state machine

| State k | exponent $E_{MEL}$ | threshold $T_{MEL}$ | next state, hit | next state, miss |
|---|---|---|---|---|
| 0 | 0 | 1 | 1 | 0 |
| 1 | 0 | 1 | 2 | 0 |
| 2 | 0 | 1 | 3 | 1 |
| 3 | 1 | 2 | 4 | 2 |
| 4 | 1 | 2 | 5 | 3 |
| 5 | 1 | 2 | 6 | 4 |
| 6 | 2 | 4 | 7 | 5 |
| 7 | 2 | 4 | 8 | 6 |
| 8 | 2 | 4 | 9 | 7 |
| 9 | 3 | 8 | 10 | 8 |

TABLE 1-continued

MEL coding state machine

| State k | exponent $E_{MEL}$ | threshold $T_{MEL}$ | next state, hit | next state, miss |
|---|---|---|---|---|
| 10 | 3 | 8 | 11 | 9 |
| 11 | 4 | 16 | 12 | 10 |
| 12 | 5 | 32 | 12 | 11 |

The MELCODE is an adaptive Golomb code for the run lengths $R_{AZC}[j]$, where the threshold $T_{MEL}[k]$ plays the role of the Golomb parameter. Ignoring the adaptation, the coding procedure can be summarized as:

while R≥T, emit 1 (a "hit") and subtract T from R emit 0 (a "miss"), followed by the E LSB's of R The optimal Golomb parameter for an exponentially distributed information source is a little over half of its mean value. Thus, a typical run R should be coded by one hit followed by a miss. This implies that the adaptive state machine should (on average) experience one hit and one miss for each run, which is achieved by incrementing the state after each hit and decrementing the state after each miss, as shown in Table 1.

The complete MEL coding algorithm is as follows:

```
Initialize k=0
For each j=0,1,...
    Set R ← R_AZC[j]
    While R ≥ T_MEL[k]
        Emit "1" ("hit")
        Update R ← R - T_MEL[k]
        Update k ← min{k + 1,12}
    Emit "0" ("miss")
    Emit E_MEL[k] LSB's of R
    Update k ← max{k - 1,0}
```

While the algorithm is expressed in terms of run length coding, it can always be re-cast as an adaptive state machine that operates on individual symbols, just as the MQ coder can be recast as a state machine that operates on runs. As an encoder for individual AZC symbols, the MEL coder here cannot produce more than 6 code bits, but often produces no bits at all. Both MQ and MEL coding approaches exhibit roughly the same number of state transitions, but the advantage of the MEL coder is that it has a very small state machine. For the purpose of multi-symbol coding, the MQ coder's state machine can be considered to consist of both the MQ state index and the 16-bit A register, while our MEL coder has only a 4-bit state index. In software implementations at least, it is advisable to use small lookup tables to drive the encoding and decoding of runs, where in most cases a single lookup suffices to encode or decode a complete run.

The bits emitted by the MEL coder are packed into bytes in big-endian fashion, starting from the MSB and working down to the LSB. Moreover, to prevent the appearance of false marker codes, a 0 bit is stuffed into the MSB of any byte that follows an FFh.

More often than not, the last AZC symbol in a code-block is 0, so that the final run is actually "open," meaning that encoding a larger run does not interfere with correct decoding of the AZC symbols. Additionally, the final byte produced by the MEL coder often contains one or more unused LSB's. With these things in mind, various termination strategies can be devised for the MEL coded bit-stream. As with an MQ coded bit-stream, the bytes that belong to the MEL bit-stream may partially overlap those belonging to the raw bit-stream within the cleanup codeword segment, so long as correct decoding is assured.

It should be apparent that the sequencing policies for bits and bytes in the various bit-streams of the FAST block coder can be modified in various ways without changing the key operating principles. For example, one could arrange for a backward growing MEL coded bit-stream to meet a forward growing raw bit-stream. One could also arrange for bits in the raw bit-stream to be packed in big-endian order, with those in the MEL coded bit-stream packed in little-endian order, while still allowing enabling termination strategies at the interface between the two bit-streams. However, a little-endian bit packing order tends to bring benefits for software implementations, so it makes sense to adopt the little-endian order for the raw bit-streams, which are typically larger than the adaptively coded bit-stream.

Cleanup Pass Groups and Scanning Patterns

An important property of the FAST block coding algorithm is that significance information for the Cleanup pass is collected in groups and coded ahead of other information. Efficient coding of significance is very important, especially at lower bit-rates, where half or more of the coded bits may be expended identifying which samples in the code-block are significant (i.e., non-zero). The FAST block coder uses a fixed set of VLC codewords to identify the significance (or otherwise) of all samples in a group at once. Additionally, the FAST block coder identifies certain groups of samples, known as AZC (All-Zero Context) groups, as likely to be entirely insignificant; an adaptive (MQ or MEL) coding engine is used to efficiently encode whether or not each AZC group actually is entirely insignificant.

Since groups play such an important role, their size and geometry is important. Empirical evidence strongly suggests that groups of size 4 provide the best trade-off between complexity and coding efficiency. With smaller groups, adaptive AZC group coding tends to be more effective, and VLC codewords can be small. With larger groups, the significance of more samples can be coded at once, but VLC codewords become too long to manage with small tables.

In this document we describe variants of the FAST block coding algorithm that are based on two types of groups, each with 4 samples:

1. Linear (or 1×4) groups consist of 4 horizontally adjacent samples within a single scan-line. If the code-block width is not divisible by 4, the last group within each scan-line is padded with zero-valued samples.
2. Square (or 2×2) groups consist of two consecutive columns from a stripe of 2 consecutive code-block rows. Code-blocks whose width or height is not divisible by 2 are again simply padded with 0's, for simplicity.

Figure 10:
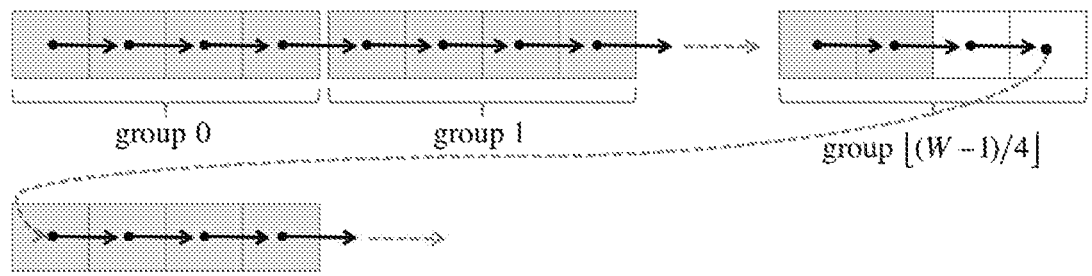
FIG. 10 illustrates a Raster scanning order with linear 1×4 groups, showing parts of the first two lines of a code-block with an even width W that is not divisible by 4. Note that the missing samples of right-most groups are padded with zero's rather than being ignored.
Figure 11:
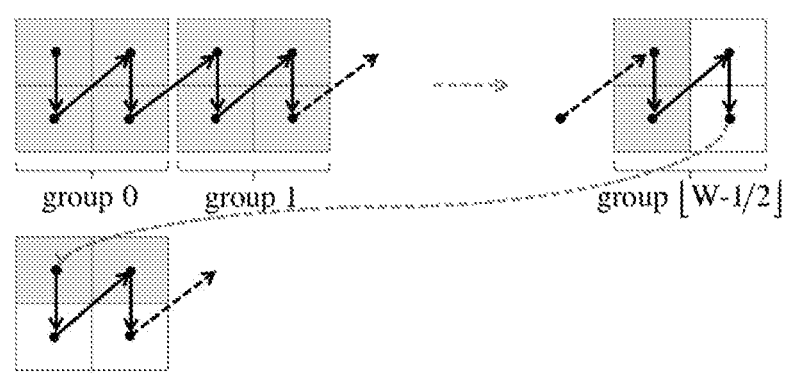
FIG. 11 is an illustration of line-interleaved scanning order with square 2×2 groups, showing a code-block with 3 lines of odd width W. Note that the missing samples within each group that overlaps the code-block are padded with zero's rather than being ignored.

These two different group structures (and potentially others) can be considered equivalent subject to a rearrangement of the samples, which amounts to a change in the order in which samples are visited for coding purposes—i.e., the scanning pattern. FIG. 10 and FIG. 11 show the scanning patterns associated with the two group structures identified above. In each case, a group consists of 4 consecutive samples in scan order, with missing samples padded with 0. While 0 padding introduces inefficiencies, it simplifies implementations that need to deal with code-blocks that are truncated at subband boundaries. Evidently, the 2×2 square group structure is transformed into the 1×4 linear group structure by interleaving each pair of code-block scan-lines into one scan-line with twice the width.

The linear group structure has the advantage that the code-block is coded in a line-by-line fashion, which has the potential to minimize overall latency of the algorithm. On the other hand, the advantage of square groups is that it is better suited to high throughput software implementations when working with code-blocks with modest width—e.g., 32×32 code-blocks. Compression performance results presented in Section 0 suggest that the 2×2 group structure may perform slightly better than the 1×4 linear structure.

Significance Coding

As mentioned above, significance is coded on a group basis. Each group g has a binary significance state $\sigma_g$ that is 1 if any sample in the group is significant, else 0. Additionally, group g has a 4-bit significance pattern $\sigma_g$, in the range 0 to 15, each bit of which (from LSB to MSB, in scanning order) is 1 if the corresponding sample in the group is significant. Evidently, $\sigma_g=0 \Leftrightarrow \rho_g=0$.

For the purpose of significance coding, each group is assigned a coding context $c_g$ that depends only on the significance information associated with previous groups, visited in the scanning order. This is important, since it allows significance to be decoded ahead of the magnitude and sign information, which improves computational throughput, at least in software implementations of both the encoder and decoder, and also allows SigProp and MagRef coding passes to be encoded and decoded in parallel with the Cleanup pass.

Groups for which $c_g=0$ are said to be in the All-Zero-Context (AZC) state. In practice, these are groups whose causal neighbours are all insignificant, which explains the term AZC. Adaptive coding is employed only to code the significance $\sigma_g$ of AZC groups, as explained in Sections 4.4 (MQ coding) and 0 (MEL coding) above. Specifically, the binary symbols $\sigma_g$ associated with each AZC group in sequence are concatenated to form a variable length binary string $\sigma_{AZC}[i]$, which is subjected to one of the variable coding techniques described above. The encoding and decoding of this AZC symbol string need not be synchronized with any other encoding or decoding steps.

For non-AZC groups, and AZC groups that are significant (i.e., $\sigma_g=1$), the significance pattern $\rho_g$ is encoded using variable length coding (VLC), emitting the resulting codewords directly to the raw VLC bit-stream, where they are subjected only to the bit-stuffing procedures described previously. A separate set of VLC codewords is used for each group context $c_g$. Efficient implementations can use VLC tables whose entries are formulated to facilitate the generation of context labels for subsequent groups.

Figure 12:
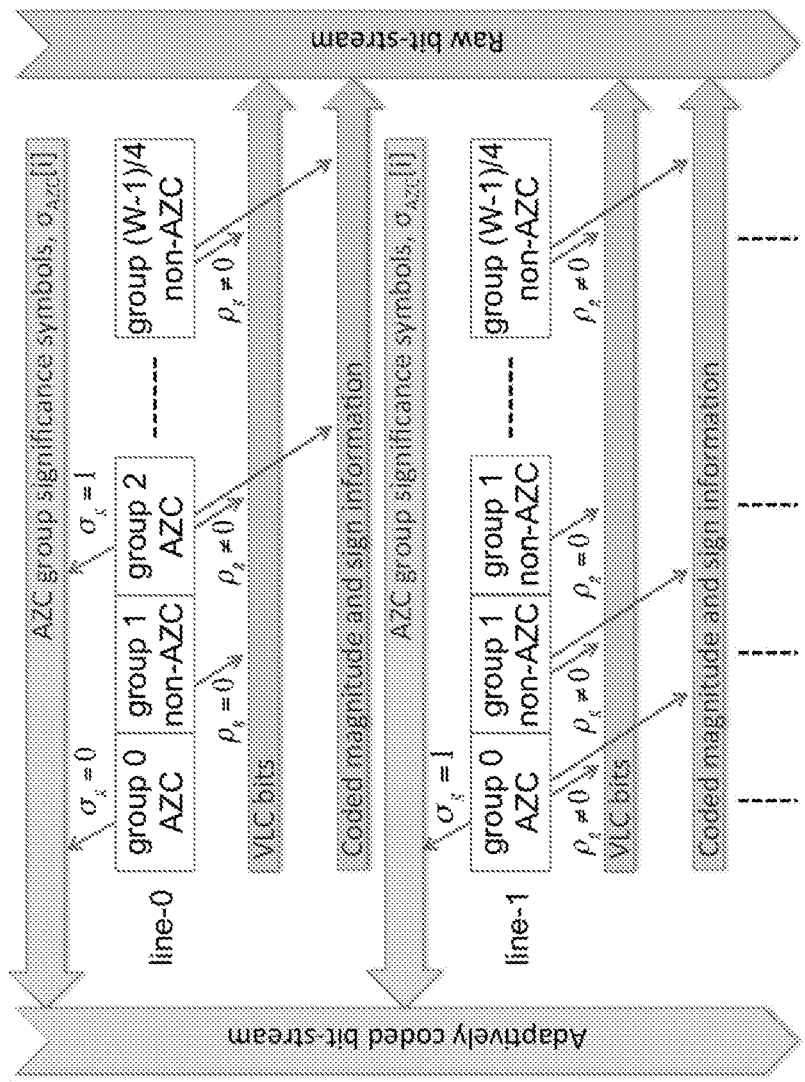
FIG. 12 is a representation of a line-interleaved sequencing of significance and magnitude/sign information for dual bit-stream versions of the FAST Cleanup pass. The illustration here is not specific to the 1×4 linear group structure, but for 2×2 groups W should be interpreted as twice the code-block width.

As mentioned above, the significance information is coded/decoded separately from some or all of the magnitude and sign information, which introduces a degree of decoupling into implementations of the FAST block coder. In this document, it is helpful to use the term "MagSgn bits" to refer to the binary digits that encode magnitude and sign information for the significant samples. With the dual bit-stream arrangement of FIG. 8, VLC codewords and MagSgn bits are interleaved within a single raw bit-stream on the basis of a row of groups (i.e., line by line for 1×4 linear groups, or line-pair by line-pair for 2×2 square groups), as shown in FIG. 2. That is, for each row of groups within the code-block, all VLC codewords associated with group significance coding are emitted to the raw bit-stream before the MagSgn bits are emitted for the significant samples in that row of groups. FIG. 12 illustrates these concepts.

Figure 13:
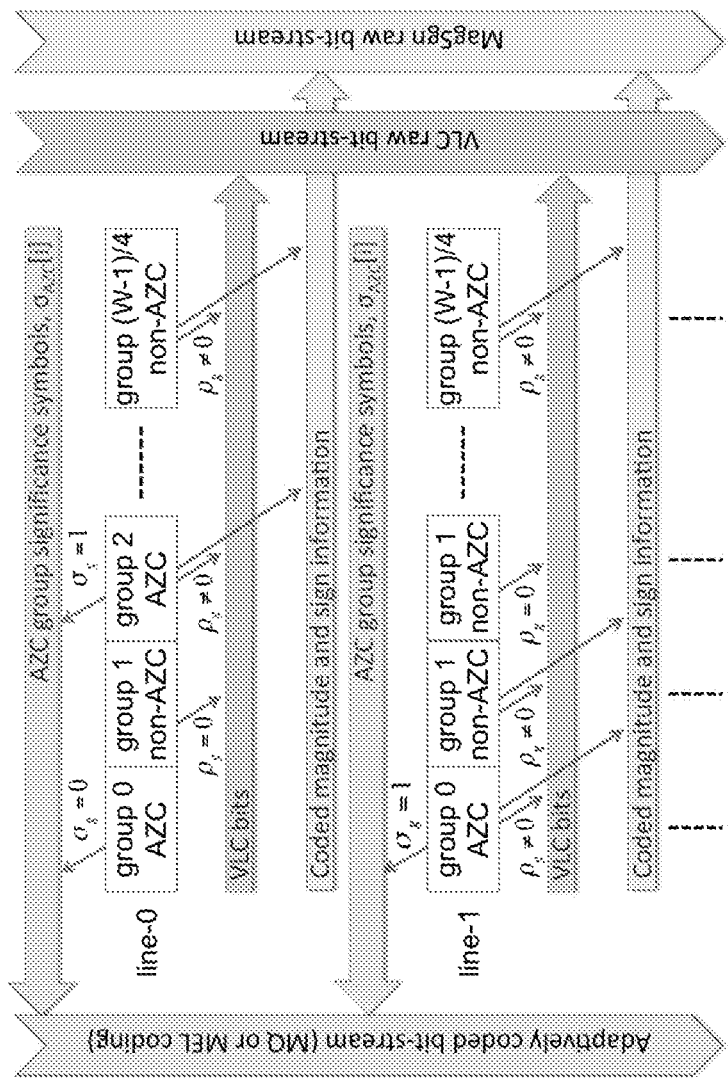
FIG. 13 is a representation of fully de-coupled processing of significance and magnitude/sign information for triple bit-stream versions of the FAST Cleanup pass. The illustration here is not specific to the 1×4 linear group structure, but for 2×2 groups W should be interpreted as twice the code-block width.

With the triple bit-stream arrangement of FIG. 9, the encoding and decoding of significance information is fully decoupled from the magnitude and sign bits, providing tremendous flexibility in the sequencing of encoding and decoding operations within both the encoder and decoder. The flow of information for this arrangement is depicted in FIG. 13.

As mentioned earlier, important variants of the FAST block coder actually distribute the magnitude information between the VLC and MagSgn bit-streams. In this case, the VLC bits are augmented, but it is unnecessarily distracting to show this explicitly in the figures.

Group Significance Contexts for Linear Groups

Figure 14:
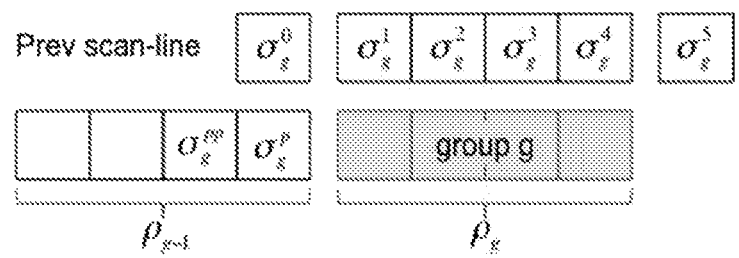
FIG. 14 is a diagram of information used for significance coding in linear 1×4 group g.

Here we describe a specific set of group significance contexts $c_g$ that are used in our current implementation, when working with linear 1×4 groups. Let $\rho_{g-1}$ denote the significance pattern of the group to the left (0 if there is none), let $\sigma_g^p$ denote the significance of the sample to the left, let $\sigma_g^{pp}$ denote the significance of the sample two to the left, and let $\sigma_g^0$ through $\sigma_g^5$ denote the significance of the six samples centred above group g on the previous scan-line (each 0 if it does not exist), as shown in FIG. 14.

Then, for the first scan-line of the code-block, $$c_g = \begin{cases} 0 & \text{if}(\sigma_g^{pp}|\sigma_g^p) = 0 \text{ [this is the AZC condition]} \\ 4 & \text{if } \sigma_g^{pp} = 1, \sigma_g^p = 0 \\ 5 & \text{if } \sigma_g^p = 1, \rho_{g-1} \neq 15 \\ 7 & \text{if } \rho_{g-1} = 15 \end{cases}$$

while for all other scan-lines, $$c_g =$$

$$\begin{cases} 0 & \text{if } (\sigma_g^p|\sigma_g^0|\sigma_g^1|\sigma_g^2|\sigma_g^3|\sigma_g^4|\sigma_g^5) = 0 \text{ [this is the AZC condition]} \\ 1 & \text{if } (\sigma_g^p|\sigma_g^0|\sigma_g^1|\sigma_g^2) = 0, (\sigma_g^3|\sigma_g^4|\sigma_g^5) = 1 \\ 2 & \text{if } (\sigma_g^p|\sigma_g^0|\sigma_g^1|\sigma_g^2) = 1, (\sigma_g^3|\sigma_g^4|\sigma_g^5) = 0, \rho_{g-1} \neq 15 \\ 3 & \text{if } (\sigma_g^p|\sigma_g^0|\sigma_g^1|\sigma_g^2) = 1, (\sigma_g^3|\sigma_g^4|\sigma_g^5) = 1, \rho_{g-1} \neq 15 \\ 6 & \text{if } (\sigma_g^3|\sigma_g^4|\sigma_g^5) = 0, \rho_{g-1} = 15 \\ 7 & \text{if } (\sigma_g^3|\sigma_g^4|\sigma_g^5) = 1, \rho_{g-1} = 15 \end{cases}$$

The actual numerical values of $c_g$ are not important, although they have been chosen because they can be computed efficiently in both hardware and software. The notation a|b here means logical OR of binary digits a and b. There are 8 contexts in total, with contexts 7 and 0 available to all lines in the code-block. Context 0 always means that all of the samples used to form the contexts are insignificant—the AZC context. Conversely, context 7 means that all of the samples used to form the contexts are significant. The contexts associated with non-initial scan-lines are substantially formed from two binary digits, one of which is 1 if the first sample of the group has a significant neighbour, while the other is 1 if the last sample of the group has a significant neighbour.

In software, it is possible for a decoder to index a single VLC lookup table that incorporates all contexts, using an index that is computed from a simple function of the significance states in the previous scan-line (can be computed using vector arithmetic), logically OR'd with the masked output of the previous group's VLC table and the next 6 bits from the raw bit-stream, assuming a suitable structure for the VLC table entries. This can lead to very high decoding throughput. Encoders are inherently simpler since their context information can all be computed using highly parallel byte-oriented vector arithmetic.

Group Significance Contexts for Square Groups

Figure 15:
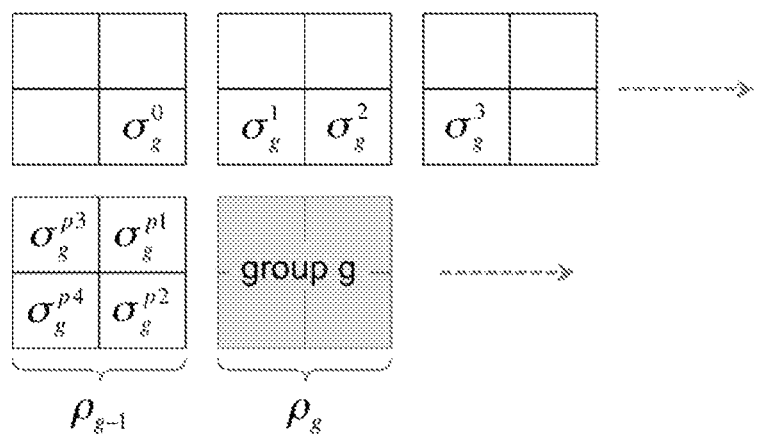
FIG. 15 is an illustration showing information used for significance coding in square 2×2 group g.

With the 2×2 square group structure, the significance coding contexts used in our current implementation are shown in FIG. 15. For this case, we prefer to use a completely separate VLC codebook for the first pair of lines, where no previous scan-line's significance is available, with 8 distinct contexts for this case and another 8 contexts for groups found within a non-initial pair of scan-lines.

For the first case, where group g is found in the first pair of scan-lines, group context is formed using the significance of the preceding 4 samples, in scanning order (see FIG. 12), identified here as $\sigma_g^{p1}$ through $\sigma_g^{p4}$, all of which are taken to be 0 if g is the first group in the code-block. The group context for this case is given by $$c_g = \sigma_g^{p1} + 2\sigma_g^{p2} + 4(\sigma_g^{p3} | \sigma_g^{p4})$$

For all other groups, the significance coding context is formed using the significance of the previous two samples, in scanning order, i.e., $\sigma_g^{p1}$ and $\sigma_g^{p2}$, together with the significance of four neighbouring samples on the previous scan-line, identified in FIG. 15 as $\sigma_g^0$ through $\sigma_g^3$. One of the following simple formulations may then be adopted for the group context $$c_g^{unbal} = (\sigma_g^{p1} | \sigma_g^0 | \sigma_g^1) + 2\sigma_g^{p2} + 4(\sigma_g^2 | \sigma_g^3), \text{ or}$$

$$c_g^{bal} = (\sigma_g^0 | \sigma_g^1) + 2(\sigma_g^{p1} | \sigma_g^{p2}) + 4(\sigma_g^2 | \sigma_g^3)$$

Both context label definitions are amenable to efficient formation during encoding and decoding, in software and hardware.

Variable Length Coding of Group Significance Patterns

Here we provide specific information about the VLC codes used to encode significance patterns for non-AZC groups and for AZC groups that are identified as significant within the adaptively coded bit-stream.

A separate VLC table is defined for each context $c_g$. Each of these has 16 codewords, except when $c_g = 0$ (the AZC context), which only has 15 codewords, because the existence of at least one significant sample in the group has already been coded within the adaptively coded bit-stream, as already explained. The codeword length is limited to 6 bits, so that decoding can be achieved using lookup tables with only 64 entries per context.

The VLC tables are essentially defined by the lengths of each codeword, since a suitable set of codewords can always be derived from the set of codeword lengths in each context. Some choices of codewords may allow direct computation of the VLC codes in place of a lookup table. One very simple construction that allows this is to simply map the significance of each sample in the group to its own codeword bit, except for the AZC context, where the first 2 bits of the codeword identify the index f of the first sample in the group (in scanning order) that is significant, which is followed by 3-f bits that identify the individual significance of each later sample in the group. The codeword lengths for this (reference) choice are shown in Table 2.

TABLE 2

A simple set of VLC codeword lengths, compatible with coding the a run of initial zeros in the AZC context, and assigning an individual bit to each other sample's significance.

| p: | 0h | 1h | 2h | 3h | 4h | 5h | 6h | 7h | 8h | 9h | Ah | Bh | Ch | Dh | Eh | Fh |
|---|---|---|---|---|---|---|---|---|---|---|---|---|---|---|---|---|
| $c_g = 0$: | — | 5 | 4 | 5 | 3 | 5 | 4 | 5 | 2 | 5 | 4 | 5 | 3 | 5 | 4 | 5 |
| $c_g > 0$: | 4 | 4 | 4 | 4 | 4 | 4 | 4 | 4 | 4 | 4 | 4 | 4 | 4 | 4 | 4 | 4 |

To generate a good set of VLC codeword lengths, we collect statistics on a large set of natural images, compressed at bit-rates in the range 1 bits/pel to 6 bits/pel, using the well-known Huffman construction to discover optimal lengths, constrained to at most 6 bits per codeword.

TABLE 3

An optimized set of VLC codeword lengths for the 1 × 4 group structure.

| p: | 0h | 1h | 2h | 3h | 4h | 5h | 6h | 7h | 8h | 9h | Ah | Bh | Ch | Dh | Eh | Fh |
|---|---|---|---|---|---|---|---|---|---|---|---|---|---|---|---|---|
| $c_g = 0$: | — | 3 | 3 | 4 | 3 | 5 | 4 | 5 | 3 | 5 | 5 | 5 | 4 | 5 | 4 | 4 |
| $c_g = 1$: | 1 | 5 | 5 | 6 | 4 | 6 | 5 | 6 | 3 | 6 | 6 | 6 | 4 | 6 | 5 | 6 |
| $c_g = 2$: | 1 | 3 | 4 | 4 | 5 | 6 | 6 | 5 | 5 | 6 | 6 | 6 | 6 | 6 | 6 | 5 |
| $c_g = 3$: | 3 | 5 | 5 | 5 | 5 | 5 | 5 | 4 | 4 | 5 | 5 | 4 | 4 | 4 | 4 | 2 |
| $c_g = 4$: | 2 | 4 | 4 | 5 | 5 | 5 | 5 | 4 | 4 | 5 | 5 | 5 | 4 | 5 | 4 | 3 |
| $c_g = 5$: | 3 | 4 | 5 | 4 | 5 | 5 | 5 | 4 | 4 | 5 | 5 | 4 | 5 | 5 | 4 | 2 |
| $c_g = 6$: | 2 | 3 | 5 | 3 | 6 | 5 | 5 | 4 | 5 | 5 | 6 | 5 | 5 | 5 | 5 | 3 |
| $c_g = 7$: | 5 | 5 | 6 | 5 | 6 | 6 | 6 | 4 | 6 | 5 | 6 | 4 | 5 | 4 | 4 | 1 |

For linear 1×4 groups, the derived codeword lengths are shown in Table 3. These codeword lengths are substantially superior to those of Table 2, yielding typical improvements in the range 0.2 to 0.5 dB in PSNR, at the same bit-rate, across the full range of operating conditions. Note that for linear groups we use only one set of VLC tables, for both the initial line and non-initial lines of the code-block, with just 8 contexts in total. This works because relatively little context information is available to the first line, so not many contexts are required, and their importance is diminished by the fact that the first line typically accounts for only a very small fraction of the code-block samples.

For the 2×2 square group structure, we develop two separate sets of VLC codewords: one for groups found in the first line-pair; and one for groups found in non-initial line-pairs. Optimized codeword lengths are reported in Table 4 and Table 5, where the latter corresponds to the "unbalanced" labels identified above as $c_g^{unbal}$. The use of optimized VLC codewords are even more important to compression performance in the 2×2 group case than they are for 1×4 linear groups. We find that the overall coding efficiency for 2×2 groups is slightly higher than for 1×4 groups when using the respective optimized VLC codewords, while the reverse is true if the trivial codewords of Table 2 are used.

Software based encoders can compute the magnitude exponents of all samples in the code-block ahead of time and store them in memory (1 byte per sample). Note that most CPU's include instructions that can be used to efficiently compute the magnitude exponents.

TABLE 4

An optimized set of VLC codeword lengths for 2 × 2 square groups within the initial row of groups in a code-block.

| p: | 0h | 1h | 2h | 3h | 4h | 5h | 6h | 7h | 8h | 9h | Ah | Bh | Ch | Dh | Eh | Fh |
|---|---|---|---|---|---|---|---|---|---|---|---|---|---|---|---|---|
| $c_g = 0$: | — | 3 | 3 | 5 | 3 | 4 | 5 | 6 | 3 | 6 | 4 | 5 | 3 | 5 | 5 | 4 |
| $c_g = 1$: | 1 | 4 | 5 | 5 | 4 | 4 | 6 | 6 | 5 | 6 | 6 | 6 | 5 | 5 | 6 | 4 |
| $c_g = 2$: | 1 | 5 | 4 | 5 | 5 | 6 | 6 | 6 | 4 | 6 | 4 | 6 | 5 | 6 | 5 | 4 |
| $c_g = 3$: | 2 | 5 | 5 | 4 | 5 | 5 | 6 | 4 | 5 | 6 | 5 | 4 | 5 | 5 | 5 | 2 |
| $c_g = 4$: | 1 | 5 | 5 | 5 | 4 | 5 | 6 | 6 | 4 | 6 | 5 | 6 | 5 | 5 | 5 | 4 |
| $c_g = 5$: | 3 | 4 | 5 | 5 | 5 | 2 | 5 | 4 | 5 | 5 | 5 | 5 | 5 | 4 | 5 | 3 |
| $c_g = 6$: | 3 | 5 | 4 | 5 | 5 | 5 | 5 | 5 | 5 | 5 | 2 | 4 | 5 | 5 | 4 | 3 |
| $c_g = 7$: | 5 | 6 | 6 | 5 | 6 | 5 | 6 | 4 | 6 | 6 | 5 | 4 | 5 | 4 | 4 | 1 |

TABLE 5

An optimized set of VLC codeword lengths for 2 × 2 square groups within non-initial group rows of a code-block, based on context labels $c_g^{\text{unbal}}$.

| p: | 0h | 1h | 2h | 3h | 4h | 5h | 6h | 7h | 8h | 9h | Ah | Bh | Ch | Dh | Eh | Fh |
|---|---|---|---|---|---|---|---|---|---|---|---|---|---|---|---|---|
| $c_g = 0$: | — | 3 | 3 | 5 | 3 | 5 | 6 | 6 | 2 | 6 | 3 | 6 | 4 | 6 | 5 | 6 |
| $c_g = 1$: | 1 | 4 | 4 | 5 | 5 | 4 | 6 | 6 | 4 | 6 | 5 | 6 | 5 | 6 | 6 | 5 |
| $c_g = 2$: | 1 | 6 | 3 | 6 | 6 | 6 | 6 | 6 | 4 | 6 | 3 | 6 | 6 | 6 | 6 | 6 |
| $c_g = 3$: | 2 | 4 | 4 | 4 | 5 | 5 | 5 | 5 | 4 | 5 | 4 | 4 | 5 | 5 | 5 | 3 |
| $c_g = 4$: | 1 | 5 | 5 | 6 | 3 | 6 | 6 | 6 | 4 | 6 | 6 | 6 | 4 | 6 | 5 | 5 |
| $c_g = 5$: | 2 | 4 | 5 | 5 | 4 | 4 | 5 | 4 | 5 | 5 | 5 | 5 | 5 | 4 | 4 | 3 |
| $c_g = 6$: | 2 | 5 | 4 | 5 | 4 | 5 | 5 | 5 | 4 | 5 | 4 | 5 | 4 | 5 | 4 | 3 |
| $c_g = 7$: | 5 | 6 | 6 | 5 | 6 | 5 | 6 | 4 | 6 | 6 | 5 | 4 | 5 | 4 | 4 | 1 |

One might expect that coding efficiency can be improved by using separately optimized VLC codeword tables for DWT subbands with different orientations, or perhaps even different levels in the DWT hierarchy. Indeed this does bring some small benefits, but our experiments suggest that these benefits are typically smaller than 1% of the overall coded data rate, which may not be sufficient to justify the expanded number of tables.

Magnitude Exponents

As mentioned, in bit-plane p, the magnitude of sample X[n] is taken to be $$M_p[n] = \left\lfloor \frac{|X[n]|}{2^p \Delta} \right\rfloor$$

and the sample is considered significant if $M_p[n] \neq 0$. The "magnitude exponent" $E_p[n]$ for the sample in bit-plane p is defined as follows:

$$E_p[n] = \min\{E \in \mathbb{N} \mid M_p[n] - \tfrac{1}{2} < 2^{E-1}\}$$

where $\mathbb{N}$ is the set of natural numbers (non-negative integers). The following table should help explain this definition.

$M_p$: 0 1 2 3 4 5 ... 8 9 ... 16 17 ... 32 ... $2^{30}+1$ ... $2^{31}$
$E_p$: 0 1 2 3 3 4 ... 4 5 ... 5 6 ... 6 ... 32 ... 32

Note that the algorithm described here assumes that magnitudes can be represented as 32-bit integers, so that their magnitude should never exceed $2^{31}$. However, extensions of the algorithm to even higher precisions are easy to derive.

Magnitude and Sign Coding: Introduction

We turn our attention now to the coding of magnitude and sign information for samples that are known to be significant. Importantly, since a sample is known to be significant, it is sufficient to code the value of $M_p - 1 \geq 0$. In this case, we also have magnitude exponent $E_p - 1 \geq 0$ and we have $$E_p = \min\{E \in \mathbb{N} \mid M_p - 1 < 2^{E-1}\}$$

That is, the $E_p - 1$ is the minimum number of bits required to represent the value of $M_p - 1$. Our magnitude exponent definition has been devised precisely in order to make this so. The magnitude exponent depends on the bit-plane p in a non-trivial way, and this is important to the efficient coding of the magnitudes of significant samples.

Our coding strategy effectively takes $M_p$ to be uniformly distributed over the range from 1 to $2^{E_p-1}$, so that it is sufficient to emit the $E_p - 1$ least significant bits of $M_p - 1$ to the relevant bit-stream, once the value of $E_p$ itself has been established. We also take the sign of each significant sample to be uniformly distributed, so that it is also sufficient to emit the sign bit as a raw binary digit.

Greater care needs to be exercised in coding the value of $E_p$. As mentioned earlier, variants of the FAST block coding algorithm that are described in this document can be classified according to whether the coding of magnitude information is consolidated within a single bit-stream, or distributed between the VLC and MagSgn bit-streams, as shown in FIG. 6 (encoder) and FIG. 7 (decoder). In particular, distributed variants of the FAST block coder move some of the information required to identify $E_p$ to the VLC bit-stream.

In the following sections, we describe first the consolidated coding of exponents and mag-sign bits, using previously decoded magnitude values to condition the coding of subsequent magnitude exponents. Then, Consolidated Magnitude and Sign Coding we describe a distributed magnitude coding method.

Consolidated Magnitude and Sign Coding

The coding of magnitude information for a significant sample at location n is based on a context, which is formed by accumulating the magnitude exponents of its causal neighbours. In the following we drop the subscript p from all magnitudes and magnitude exponents, taking the bit-plane index to be implied.

The method described here is suitable for the raster scanning order of FIG. 10, along with its 1×4 linear group structure. For 2×2 square groups, it is much simpler to use the distributed magnitude coding strategy described in below (Distributed Magnitude and Sign Coding).

For non-initial scan-lines, the magnitude coding context is formed from $$E_{sum}[n]=E^{W}[n]+E^{NW}[n]+E^{N}[n]+E^{NE}[n]$$

where $E^{W}[n]$ is the magnitude exponent of the neighbour to the left (0 if there is no left neighbour), $E^{N}[n]$ is the magnitude exponent of the neighbour above (0 if there is no previous scan-line), while $E^{NW}[n]$ and $E^{NE}[n]$ correspond to neighbours above and to the left or right of location n, on the previous scan-line (0 if there is no such neighbour). The superscripts W, NW, N and NE are intended to signify compass directions.

Figure 16:
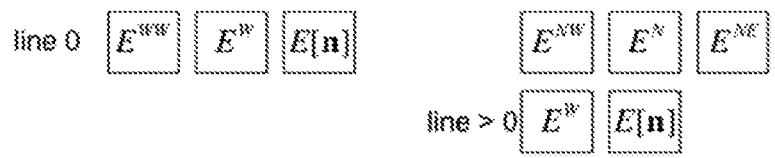
FIG. 16 is a representation of neighbouring magnitude exponents used to form magnitude coding contexts for E[n], shown separately for the case where E[n] does and does not belong to the first line of its code-block.

For the first line in the code-block, we use $$E_{sum}[n]=(2E^{W}[n]+E^{WW}[n])$$

where $E^{WW}[n]$ is the magnitude exponent of the second sample to the left (0 if there is none). These neighborhood configurations are shown in FIG. 16.

The magnitude coding context is intended to yield an effective predictor $\kappa[n]$ for the value of $E[n]-1$. This can be obtained in a variety of ways, amongst which we have experimented with using a family of prediction state machines indexed by a quantized version of $E_{sum}[n]/4$. In the end, however, we find that the best trade-off between compression efficiency and computational complexity results from the assignment:

$$\kappa[n] = \left[\frac{E_{sum}[n] - \kappa_{off}}{4}\right]$$

where the constant $\kappa_{off}$ is set to 4. The values 3 and 5 have proven to be nearly as effective, but are slightly less efficient to compute.

The magnitude and sign coding can be considered to proceed in two steps, as follows:

U-Step

Here we emit a comma code that represents the unsigned (hence the "U") prediction residual $$u[n]=\max\{0, E[n]-1-\kappa[n]\}$$

Specifically, u[n] 0's are emitted to the raw bit-stream, followed by a 1 (the "comma").

The decoder recovers u[n] from the raw bit-stream by counting zeros until the first 1 occurs. We note that u[n] should never exceed 31 for the case in which the originally coded subband samples were represented using 32-bit integers (after quantization), since then $E[n] \leq 32$, as explained above.

R-Step

Here we determine the number of magnitude bits which must be emitted as $$m[n]=\kappa[n]+u[n]-i[n]$$

where $$i[n] = \begin{cases} 0 & \text{if } u[n] = 0 \\ 1 & \text{if } u[n] \neq 0 \end{cases}$$

We emit first the sign of X[n], being 1 if negative and 0 if positive. Then we emit the least significant m[n] bits of the magnitude value M[n].

To explain this procedure, we note that the magnitude M of a significant sample satisfies $$0 \leq M-1 < 2^{E-1}$$

where $E-1 \geq 0$. If the unsigned prediction residual u>0, then the decoder can be sure that $E-1=\kappa+u$ and that $2^{E-2} \leq M-1 < 2^{E-1}$, so the least significant $E-2=\kappa+u-1$ bits of M−1 are sufficient to identify its value; the decoder adds back the implicit most significant 1 to recover M−1 from these m bits. If u=0, the decoder knows only that $E-1 \leq \kappa+u$, so that $0 \leq M-1 < 2^{\kappa+u}$, which is why m=κ+u bits are emitted.

In light of this discussion, i[n] can be recognized as identifying whether or not the sample at location n has an "implicit-1".

We note that the decoder forms κ[n] and then recovers m[n]=κ[n]+u[n], where u[n] was obtained in the U-step by decoding the comma code. Unlike the encoder, however, in the R-step the decoder must also recover the magnitude exponent E[n]. In the general case, this may require the m[n] magnitude bits to be retrieved from the raw bit-stream, so that the most significant 1 in the binary representation of M[n]−1 can be found. This step might be the critical path that determines the throughput of a hardware-based decoder. This is because the value of E[n] is required to form the next sample's $E_{sum}$ value, which is required in that sample's R-step if the sample is significant.

In summary, the unsigned prediction residual u[n] only partially encodes the value of E[n], given the neighbouring magnitude exponents; to complete the recovery of E[n] when u[n]=0, the magnitude bits themselves are required.

Closely Related Alternatives for Magnitude Coding

The above method for magnitude coding is effectively an exponential Golomb code for M[n]−1, with parameter κ[n], noting that the sign bit is actually interleaved between the comma (unary portion of the code) and the magnitude bits, since this turns out to facilitate efficient software based decoder implementations.

As mentioned, the one minor drawback of this approach is that a decoder cannot generally recover the magnitude exponent E[n] required for forming subsequent magnitude coding contexts until all magnitude bits of the code have been recovered from the raw bit-stream—i.e., until the R-step completes.

Rice Mapping

An alternative strategy is to employ a κ[n]-dependent Rice mapping of the signed prediction residual $$s[n]=E[n]-1-\kappa[n]$$

The Rice mapping interleaves +ve and −ve values of the prediction residual s, noting that the most negative value is −κ, and the most positive value is 31−κ, so as to produce an unsigned mapped quantity r[n] that can then be encoded directly using a comma code or a fixed Golomb code. The potential advantage of this approach is that a decoder can recover the magnitude exponent immediately, from E[n]=1+κ[n]+s[n], without having to wait for the magnitude bits to be imported from the raw bit-stream. That is, magnitude exponents can be propagated to causal neighbours directly from the first step of the decoding procedure, without having to wait for the second step to complete. Despite the small overhead of the Rice unmapping procedure, this is likely to allow hardware solutions to achieve slightly higher throughputs. On the other hand, the approach is somewhat disadvantageous to software deployments, where the Rice mapping/unmapping operations must usually be implemented using lookup tables. Furthermore, experiments show that the compression efficiency of these methods is slightly inferior to the preferred approach documented in the preceding section.

An Alternative Bit Arrangement for Magnitude and Sign Coding

This section presents an alternative arrangement for the bits emitted by the U and R steps to that described above. This alternative arrangement has the same coding efficiency of that of the above arrangement, since it is only a reordering of the emitted bits; in other words, we need exactly the same number of bits for this alternative representation.

Depending on the value of u[n], we identify four cases:

Case 1: u[n]>κ[n]. In this case, which is summarized in Table 6, the encoder emits u[n] zeros followed by 1 (the comma), followed by the sign X[n] of M[n], and then by κ[n]+u[n]−1=E[n]−2 least significant bits of M[n]−1. This is possible since we know that $2^{E-2} \leq M-1 < 2^{E-1}$. This is exactly the same code emitted by Section 0 when u[n]>0.

Case 2: κ[n]≥u[n]>0. In this case, the encoder emits u[n]−1 zeros followed by 1 (the comma), and then by a single zero (denoted by d[n]=0), followed by the sign X[n] of M[n], and then by κ[n]+u[n]−1=E[n]−2 least significant bits of M[n]−1. See Table 6.

Case 3: u[n]=0, and p[n]<κ[n], where p[n]=κ[n]−(E[n]−1). In this case, we have $2^{\kappa-p-1} \leq M-1 < 2^{\kappa-p}$. The encoder emits p[n] zeros followed by 1 (the comma), and then by a single one (denoted by d[n]=1), followed by the sign X[n] of M[n], and κ[n]−p[n]−1=E[n]−2 least significant bits of M[n]−1. See Table 6.

Case 4: u[n]=0, and p[n]=κ[n]. In this case E[n]−1=M[n]−1=0. The encoder emits κ[n] zeros followed by 1 (the comma), and then by the sign X[n] of M[n]. See Table 6.

TABLE 6

The four cases of the alternative bit arrangement. The table shows the condition for each case, the bits emitted and their arrangement.

| Case | Condition | # of LSB bits from M[n] − 1 | Sign | d[n] | | # of zeros |
|---|---|---|---|---|---|---|
| 1 | u[n] > k[n] | k[n] + u[n] − 1 | X[n] | NA | 1 | u[n] |
| 2 | k[n] ≥ u[n] > 0 | k[n] + u[n] − 1 | X[n] | 0 | 1 | u[n] − 1 |
| 3 | u[n] = 0 & p[n] < k[n] | k[n] − p[n] − 1 | X[n] | 1 | 1 | p[n] |
| 4 | u[n] = 0 & p[n] = k[n] | NA | X[n] | NA | 1 | k[n] |

"NA" means not applicable and indicates that no bits has to be emitted for that field.

We move our attention to the decoder now. The decoder evaluates κ[n] from the context of the significant sample under consideration. The decoder would then count the number of zeros ℓ[n] until a comma (a one) is found; the number of zeros ℓ[n] can be equal to u[n], u[n]−1, p[n], or κ[n]. The decoder would then proceed as follows:

If ℓ[n]=κ[n]: this is case 4, and decoding can proceed by reading the sign bit X[n] of M[n], and we have M[n]−1=0.

If ℓ[n]>κ[n]: this is case 1, where ℓ[n]=u[n], and decoding can proceed by reading the sign bit X[n] of M[n], and κ[n]+ℓ[n]−1=E[n]−2 LSBs of M[n]−1 from the bit-stream. The decoder would then need to add the implicit MSB of M[n]−1; the implicit MSB was not transmitted because it is known to be $2^{E-2}$.

If ℓ[n]<κ[n]: this can be either case 2 or case 3. The decoder can identify the case by inspecting the bit after the comma, d[n]. For case 2, we have d[n]=0, and for case 3 we have d[n]=1. Depending on the case, the decoder would proceed, as follows For case 2 (d[n]=0), where ℓ[n]=u[n]−1, the decoder would then read the sign bit X[n] of M[n], and κ[n]+ℓ[n]=E[n]−2 LSBs of M[n]−1 from the bit-stream. The decoder would then need to add the implicit MSB of M[n]−1; the implicit MSB was not transmitted because it is known to be $2^{E-2}$.

For case 3 (d[n]=1), where ℓ[n]=p[n], the decoder would then read the sign bit X[n] of M[n], and κ[n]−ℓ[n]−1=E[n]−2 LSBs of M[n]−1 from the bit-stream. The decoder would then need to add the implicit MSB of M[n]−1; the implicit MSB was not transmitted because it is known to be $2^{E-2}$.

TABLE 7

How the decoder can identify the four cases of the alternative bit arrangement of this section. The table shows the conditions for each case, the number of bits to read from the bit-stream, and the existence of an implicit MSB.

| Case | Condition | The # of LSBs that must be read from the bit-stream (equal to E[n] − 2) | Implicit MSB at position E[n] − 2 |
|---|---|---|---|
| 1 | ℓ[n] > K[n] | K[n] + ℓ[n] − 1 | yes |
| 2 | ℓ[n] < K[n] & d[n] = 0 | K[n] + ℓ[n] | yes |
| 3 | ℓ[n] < K[n] & d[n] = 1 | K[n] − ℓ[n] − 1 | yes |
| 4 | ℓ[n] = K[n] | NA | no |

The advantage of this method is that the exponent E[n] can be calculated immediately after decoding ℓ[n] and, whenever necessary, d[n] while the arrangement above requires counting the number of trailing zeros in M[n]−1, after decoding M[n]−1. Once the decoder knows E[n], it can propagate this information to causal neighbours to commence their decoding, without having to wait for M[n] decoding to finish. A pipelined hardware can benefit from the bit arrangement of this section by evaluating K for the following sample once it knows the exponent E[n].

Another advantage for hardware implementation is the all the information needed to determine E[n] exists at the bottom of the bit-stream, and therefore sequential processing of bits is possible, which simplifies decoding circuitry.

Software implementation can also benefit from this arrangement. Most modern CPUs employ pipelining, and can hide the latency of some instructions by overlapping them with other instructions. Thus, carefully written code can allow for the overlap of instructions decoding the current sample with instructions decoding the next sample once E[n] becomes available.

This arrangement is applicable to both dual and triple bit-stream variants of the FAST block coder's cleanup pass, since the method is only concerned with coding the magnitude and sign of significant samples.

Line-Causal Contexts

The problem addressed by each of the above alternatives is addressing arises from the fact that the context (or predictor) that is used to encode/decode the magnitude of a significant sample depends upon the preceding sample's magnitude exponent, in scanning order.

A simple way to address this problem is to modify the definition of $\kappa[n]$, so that it depends only upon the magnitudes of samples found in the previous scan-line. For example, the definition of $E_{sum}[n]$ can be replaced by $$E_{sum}[n] = E^{NW}[n] + 2E^{N}[n] + E^{NE}[n]$$

Note, however, this approach leaves the magnitudes on the very first scan-line without any predictor at all.

Distributed Magnitude and Sign Coding

In distributed magnitude coding variants of the FAST block coding algorithm, some of the information required to discover the magnitude exponents of significant samples is moved to the VLC bit-stream. As an example, the unary coded unsigned prediction residuals u[n] described in above can readily be moved to the VLC bit-stream, without damaging the important property that the VLC bit-stream can be decoded without reference to the MagSgn bit-stream. The decoded u[n] values cannot immediately be used to recover the magnitude exponents E[n] of the significant samples, since this requires knowledge of earlier magnitude exponents, which may depend on magnitude bits found in the MagSgn bit-stream. However, the ability to decode the u[n] values ahead of time can reduce critical path latencies and increase decoding throughput.

By coupling this approach with line-causal contexts, as described above, it is possible to eliminate all significant inter-sample dependencies associated with magnitude decoding. However, it is important to carefully bound the maximum number of bits that can be moved into the VLC bit-stream, since this affects the overall complexity of both hardware and software encoders and decoders.

We now describe our preferred approach for distributed coding of the magnitudes (and the signs) of significant samples. The approach is suitable for both the raster scanning order of FIG. 10, with its 1×4 group structure, and the line-interleaved scanning order of FIG. 11, with its 2×2 group structure. The approach involves just one unsigned prediction residual $u_g$, for each significant group g—i.e., each group with at least one significant sample.

Distributed Mag-Sign Coding for Non-Initial Group Rows

Figure 17:
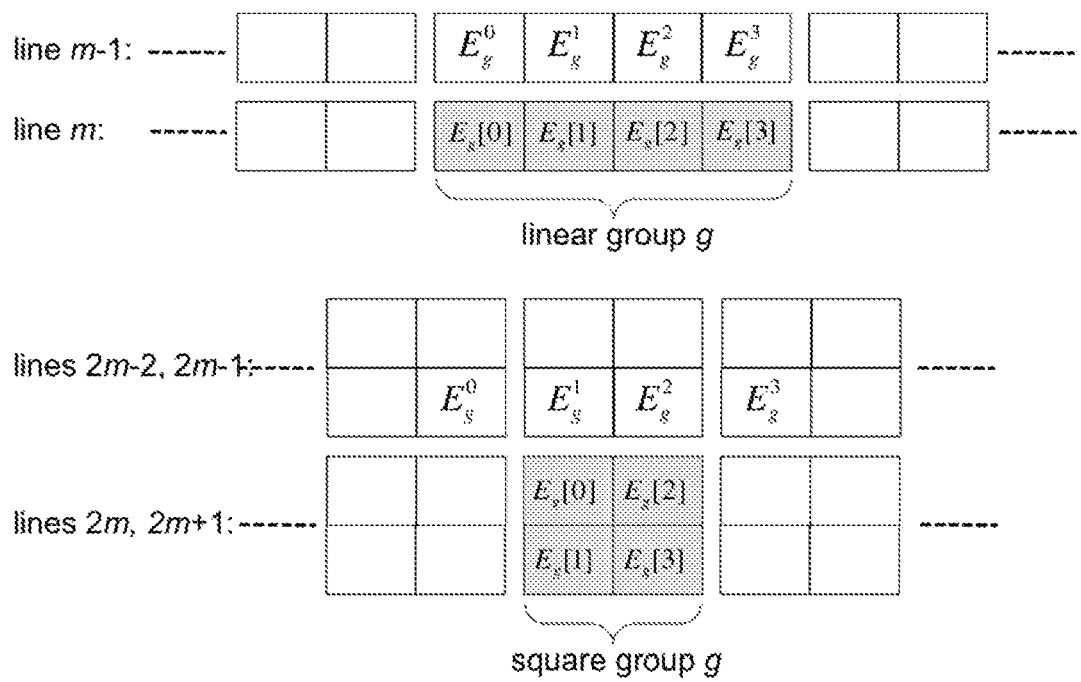
FIG. 17 is an illustration showing quantities involved in distributed magnitude coding for linear 1×4 groups (top) and square 2×2 groups (bottom), except in the initial row of groups within a codeblock.

We begin by describing the coding and interpretation of $u_g$ for non-initial group rows within the code-block—i.e., non-initial scan-lines with 1×4 groups, or non-initial line-pairs with 2×2 groups. A predictor $\kappa_g[n]$ is formed for each significant sample in group g, based on magnitude exponents from the previous scan-line. Here, n indexes the samples within group g, in the scanning order. FIG. 17 identifies the line-causal exponents $E_g^0$, $E_g^1$, $E_g^2$ and $E_g^3$ which are used to form the predictors $\kappa_g[n]$ in our preferred method, for both the 1×4 and 2×2 group structures.

The decoder adds $u_g$ to $\kappa_g[n]$ to form an upper bound $$U_g[n] = u_g + \kappa_g[n]$$

for the corresponding magnitude exponent $E_g[n]$ minus 1. That is, $$E_g[n] - 1 \leq U_g[n]$$

Moreover, this bound is required to be tight in the case where only one sample in the group is significant and $u_g > 0$, which is the condition under which the location of the most significant 1 in the binary representation of $M_g[n]-1$ is implicit. Specifically, we define the "implicit-1" condition for group g as $$i_g = \begin{cases} 0 & \text{if } u_g = 0 \text{ or } \rho_g \notin \{1, 2, 4, 8\} \\ 1 & \text{if } u_g \neq 0 \text{ and } \rho_g \in \{1, 2, 4, 8\} \end{cases}$$

and the number of emitted magnitude bits for each significant sample in group g to be $$m_g[n] = U_g[n] - i_g$$

The MagSgn bit-stream is formed by visiting each significant sample in scanning order, emitting first the sign bit and then the $m_g[n]$ least significant bits of $M_g[n]-1$.

Decoding for a row of groups involves three steps. First, the unsigned prediction residuals $u_g$ are decoded while decoding significance patterns. Second, the predictors $\kappa_g[n]$ are determined, using only the significance patterns $\sigma_g$ and decoded magnitudes from the previous scan-line, during which process the decoder uses $u_g$ to discover $m_g[n]$ and $i_g$. Finally, the sign and magnitude LSBs for $M_g[n]-1$ are unpacked from the MagSgn bit-stream for each significant sample, re-inserting any implicit-1 $i_g$.

Although these three steps are inter-dependent, they are nonetheless substantially decoupled. For example, the first step may be performed for all groups in the code-block, before the other steps are performed for any group; alternatively, the first step may be performed immediately before the second, on a group by group basis. The second step may be performed for a whole row of groups before the third step is performed for any of these groups, but again this is not necessary. In general, software implementations tend to benefit from the more distributed approach, where each step is performed on a large number of groups before moving to the second step, since this facilitates the exploitation of vector instructions and improves register utilization. By contrast, hardware implementations are likely to benefit from a less distributed strategy, since this reduces the need for memory resources to preserve intermediate state.

Even though the method is described here in terms of separate VLC and MagSgn bit-streams (i.e., for tripple bit-stream variants of the FAST block coder), the same strategy may be used with dual bit-stream variants, where VLC bits and MagSgn bits are interleaved on the basis of a row of groups (line interleaving for linear groups and line-pair interleaving for square groups).

In general, each significant sample in group g may have a different predictor $\kappa_g[n]$, which can be derived from the line-causal exponents $E_g^0$, $E_g^1$, $E_g^2$ and $E_g^3$, together with the significance pattern P associated with group g.

For both 1×4 linear groups and 2×2 square groups, a simple and effective method for assigning predictors is as follows:

$$P_g = \begin{cases} 0 & \text{if } \rho_g \in \{1, 2, 4, 8\} \\ \max\{E_g^0, E_g^1, E_g^2, E_g^3, 1\} - 1 & \text{if } \rho_g \notin \{1, 2, 4, 8\} \end{cases}$$

$$Z_g = \begin{cases} 0 & \text{if } P_g = 0 \\ 1 & \text{if } P_g > 0 \end{cases}$$

$$\kappa_g[n] = \kappa_g = P_g - Z_g$$

Here, $P_g$ can be understood as an initial predicted upper bound for the offset magnitude exponents $E_g[n]-1$ of each significant sample in group g. $Z_g$ is an offset which allows the unsigned prediction residual $u_g$ to effectively represent residuals as small as $-1$ if $P_g>0$. That is, the bound $U_g[n]$ that the decoder derives for $E_g[n]-1$ is actually equal to $P_g+(u_g-Z_g)$. The choice $P_g=0$ when only one sample in group g is significant turns out to be rather important.

The strategy described above involves the generation of a common predictor $\kappa_g$ for all significant samples in group g; however, it is possible to derive more effective location-specific predictors, based on the magnitude information from previous group rows, which is fully available at both encoder and decoder, well before the point at which the predictor for a group needs to be formed. It is also possible to use the significance information for all samples in a group, along with its causal neighbours (in scanning order) in order to optimize the prediction performance.

We turn our attention now to VLC codes for the unsigned predictor $u_g$. While a unary code (a.k.a. comma code) may be employed, the maximum codeword length in this case could be on the order of 32 for the highest precisions considered in this document; providing for such long codewords adversely impacts the efficiency of both software and hardware implementations. Instead, we prefer the so-called "u-code" in Table 8. The u-code starts out as a comma code, with u=0, u=1 and u=2 represented using the codewords "1", "01" and "001", respectively. The codewords for u=3 and u=4 involve the prefix "0001", followed by the least significant bit of u−3. All larger values of u turn out to be extremely unlikely, so they are assigned a common 4-bit prefix "0000", which is followed by the 5 LSBs of u−5. This u-code is sufficient for representing subband samples with up to 36 bits of precision.

TABLE 8 u-code used for coding unsigned residuals $u_g$, for non-initial group rows. Here, $l_p$ and $l_s$ denote the prefix and suffix lengths, with $l_p + l_s$ the overall codeword length, but note that the prefix and suffix bits are actually interleaved on a group-pair basis.

| u | prefix | Suffix | $l_p$(u) | $l_s$(u) | $l_p$(u) + $l_s$(u) |
|---|---|---|---|---|---|
| 0 | "1" | — | 1 | 0 | 1 |
| 1 | "01" | — | 2 | 0 | 2 |
| 2 | "001" | — | 3 | 0 | 3 |
| 3 | "0001" | (u−3) | 4 | 1 | 5 |
| 4 | "0001" | (u−3) | 4 | 1 | 5 |
| 5 | "0000" | (u−5) | 4 | 5 | 9 |
| 6 | "0000" | (u−5) | 4 | 5 | 9 |
| ... | ... | ... | ... | ... | ... |
| 36 | "0000" | (u−5) | 4 | 5 | 9 |

It is worth noting that the shortest codeword here is assigned to the event $u_g=0$, which corresponds to $U_g[n]=P_g-Z_g$. When $P_g>0$ this shortest codeword is thus assigned to the choice $U_g[n]=P_g-1$. One might expect that the most likely event would be $U_g[n]=P_g$, but this is not typically the case, in part because smaller sample exponents are a-priori much more likely than larger sample exponents. It turns out that in the specific case where all samples in a group are significant (i.e., $\rho_g=15$), the event $U_g[n]=P_g$ is actually more likely, while for all other significance patterns, $U_g[n]=P_g-Z_g$ is the most likely outcome. This can be exploited, if desired, by conditionally exchanging the codewords for $u_g=0$ with $u_g=1$ when $\rho_g=15$. That is, the encoder transforms to $u_g$ whenever $\rho_g=15$ and $u_g \leq 1$; this transformation is its own inverse, so the decoder does the same thing. Our experiments suggest that the benefit of this small change is a reduction in coded size by around 0.25%, which might not be sufficient to justify the complexity of introducing the conditional exchange procedure.

Pair-Wise Interleaving of Significance Bits and U-Code Bits

It turns out to be beneficial, especially for software implementations, to interleave the prefix and suffix components of the u-code across a pair of groups. Specifically, the VLC bit-stream is formed by emitting first the (possibly empty) significance VLC codewords associated with a pair of groups, then the u-code prefix for each significant group in the pair, and finally any u-code suffix for each significant group in the pair. For software encoders, this allows a modest lookup table to be used to generate the complete u-code for a pair of groups at once. For software decoders, a small lookup table is sufficient to decode the u-code prefix for a pair of quads at once, allowing the combined codeword length and suffix locations to be determined very efficiently. Each row of groups is extended, if necessary, to a whole number of group pairs, by adding an extra group that has no significance VLC codeword or AZC symbol and is always insignificant, so that it also has no u-code component.

Distributed Mag-Sign Coding for the Initial Group Row

For the initial row of groups within a code-block, no magnitude exponents are available from a previous scan-line. This case can always be handled using the method developed above, but with $E_g^0, E_g^1, E_g^2$ and $E_g^3$ all taken to be 0.

However, since this case may be important in low latency applications, where the code-block height is usually small, we prefer to employ an alternate mechanism for coding the bounds $U_g$ involving a form of horizontal prediction. As before, $U_g$ is any bound such that the magnitude exponents of all significant samples in group g satisfy $$E_g[n]-1 \leq U_g$$

except that the bound must be tight under the "implicit-1" condition, which is described below.

The alternate mechanism developed here again involves predictors and unsigned residuals $u_g$, but prediction is formed relative to a base value $B_g$, which is adapted from group to group. Specifically, $$U_g = \begin{cases} 0 & \text{if } \rho_g = 0 \\ B_g \mid u_g \; 3 & \text{if } \rho_g \neq 0 \end{cases}, \text{ where}$$

$$B_g = \begin{cases} 0 & \text{if } \rho_g = 0, \text{ else} \\ 1 & \text{if } g = 0 \text{ or } \rho_g \in \{1, 2, 4, 8\}, \text{ else} \\ \min\{3, U_{g-1}+1\} & \text{otherwise} \end{cases}$$

For a collection of consecutive groups with more than one significant sample, it is possible to understand the unsigned residuals $u_g$ as the offset (by 2) difference between consecutive values of $U_g$, since in this case $U_g=U_{g-1}+(u_g-2)$. Evidently, some values for $u_g$ should not be admissible, and this is reflected in the code for $u_g$, which depends on the value of $B_g$, as described below. For a group with only one significant sample, the relations above force $B_g$ to 1, so that $U_g=u_g-2$ has no dependence on previous groups; as we shall see, the B-dependent code for $u_g$ cannot represent values smaller than 2 in this case. The special value $B_g=0$ is not strictly important, since it corresponds to an insignificant group, for which no $u_g$ value is coded or used; however, this special value can be used to facilitate efficient implementations that are based on lookup tables.

Before describing the B-dependent VLC code for $u_g$, we briefly discuss the determination of the "implicit-1" condition, which is associated with the $i_g$ flag; this flag is combined with $U_g$ to determine the number of magnitude bits $m_g[n]$ that are emitted for each significant sample in group g. The implicit-1 condition can occur only when there is exactly one significant sample in group g, but this is very common condition in practice. In this case, as already mentioned, the relations above yield $U_g=u_g-2$ and $u_g$ is necessarily no smaller than 2. The implicit-1 condition occurs when u exceeds this minimum value of 2. That is, $$i_g = \begin{cases} 0 & \text{if } u_g = 2 \text{ or } \rho_g \notin \{1, 2, 4, 8\} \\ 1 & \text{if } u_g > 2 \text{ and } \rho_g \in \{1, 2, 4, 8\} \end{cases}$$

As for non-initial group rows, the number of emitted magnitude bits for each significant sample in group g is given by $$m_g[n]=U_g[n]-i_g$$

and the MagSgn bit-stream is formed by visiting each significant sample in scanning order, emitting first the sign bit and then the $m_g[n]$ least significant bits of $M_g[n]-1$.

To encode $u_g$, we employ the B-dependent variable length code (or "Bu-code") defined by Table 9. The code is based on the u-code of Table 8, having the same maximum codeword length of 9 bits, even with very high precision subband samples. Noting that $u_g-2$ plays the role of a signed prediction residual, the u-code is essentially being applied to the absolute value of this signed residual $|u_g-2|$, except that when $|u_g-2|<B_g$, a sign bit is appended to the 2- or 3-bit prefix, to identify whether $u_g-2$ is positive of negative. Since the prefix of the codeword never exceeds 4 bits in length, efficient LUT-based decoding strategies can be developed, indexed by the 2-bit B value, together with the 4-bit codeword prefix, returning the prefix length, suffix length, $U_g$ bound and the next group's B value, which need only be modified if the next group has fewer than 2 significant samples.

As for non-initial group rows, the significance VLC codewords and Bu-code bits are interleaved over a pair of groups. As before, the significance bits for each group in the pair appear first, followed by the Bu-code prefix for each significant group in the pair, and finally any Bu-code suffix for each significant group in the pair.

TABLE 9

Bu-code used for coding unsigned residuals $u_g$, within the initial row of groups in a code-block. Here, $l_p$ and $l_s$ denote the prefix and suffix lengths, with $l_p + l_s$ the overall codeword length, but note that the prefix and suffix bits are actually interleaved on a group-pair basis.

| u-2 | B | prefix | Suffix | $l_p(u, B)$ | $l_s(u, B)$ | $l_p(u, B) + l_s(u, B)$ |
|---|---|---|---|---|---|---|
| — | 0 | — | — | 0 | 0 | 0 |
| -2 | 3 | "0011" | — | 4 | 0 | 4 |
| -1 | 2, 3 | "011" | — | 3 | 0 | 3 |
| 0 | 1, 2, 3 | "1" | — | 1 | 0 | 1 |
| 1 | 2, 3 | "010" | — | 3 | 0 | 3 |
| 1 | 1 | "01" | — | 2 | 0 | 2 |
| 2 | 3 | "0010" | — | 4 | 0 | 4 |
| 2 | 1, 2 | "001" | — | 3 | 0 | 3 |
| 3 | 1, 2, 3 | "0001" | (u-5) | 4 | 1 | 5 |
| 4 | 1, 2, 3 | "0001" | (u-5) | 4 | 1 | 5 |
| 5 | 1, 2, 3 | "0000" | (u-7) | 4 | 5 | 9 |
| ... | ... | ... | ... | ... | ... | ... |
| 36 | 1, 2, 3 | "0000" | (u-7) | 4 | 5 | 9 |

Complexity Considerations
Magnitude Refinement (MagRef) Pass

The magnitude refinement pass is identical to that of the standard JPEG2000 block coder, in the arithmetic coding bypass mode, except that bits are packed into bytes of the raw bit-stream in little-endian order (i.e. starting from bit-0, rather than bit-7).

This coding pass simply visits each sample that was coded as significant in the Cleanup pass and emits one bit (the LSB of the relevant sample) to the raw bit-stream. The decoder is equally trivial. In software implementations, we find that the magnitude refinement pass contributes relatively little to the overall processing workload. The little-endian bit ordering convention helps to significantly accelerate software encoders and decoders.

Hardware encoders, in particular, can generate the magnitude refinement pass concurrently with the Cleanup pass, at almost no incremental cost, so long as the RESTART mode option is employed, so that the magnitude refinement pass gets its own codeword segment—this is recommended in any case.

Decoders can also process the magnitude refinement pass concurrently with the Cleanup pass, removing bits from its raw bit-stream as each significant sample is encountered. Again, this concurrent processing requires the RESTART mode, which is recommended.

In some applications, the encoder need not generate the magnitude refinement pass. A MagRef coding pass will only be included in the final codestream if it is preceded by a SigProp coding pass that is also included. In practice, therefore, the MagRef coding pass is the least likely coding pass to actually be included in the final codestream, so that it can be dropped altogether without incurring a large penalty in compression efficiency.

If rate control is managed by modulating the quantization parameters rather than via PCRD-opt, then only the Cleanup pass need actually be generated by an encoder.

Quantization parameters can be modulated with relatively fine granularity by using the QPD and QPC marker segments that are defined in JPEG2000 Part-2. In applications where a variable compressed data rate can be tolerated, perhaps modulated on a frame-by-frame basis, the encoder also need only generate the Cleanup pass.

Significance Propagation (SigProp) Pass

The SigProp pass is also very similar to that of the standard JPEG2000 block coder, in the arithmetic coding bypass mode, with two valuable differences: 1) bits are packed into bytes of the raw bit-stream, starting from bit-0 rather than bit-7; and 2) the significance bits of the samples that need to be coded are not interleaved with the sign bits on a sample-by-sample basis, but rather in groups of 4 samples at once (except for stripes of height 3).

One benefit of the modifications above is that they facilitate table-driven encoding and decoding approaches, which are of particular interest for software implementations. Hardware decoders can also benefit, because the significance bits that are coded in a stripe column dictate the propagation of coding pass membership to subsequent stripe columns. By moving the magnitude bits ahead of the sign bits within the bit-stream, the critical path decoding latency can be reduced, at least in some hardware decoding implementations.

In the standard JPEG2000 block coder, SigProp coding passes are often sandwiched between Cleanup coding passes. This means that the SigProp coding pass must update state information that will be used by later Cleanup passes; this update operation can be as costly or even more costly than the encoding/decoding steps themselves, which are quite trivial in the BYPASS mode. For example, a "context broadcasting" strategy is usually found to be most efficient for software implementations of JPEG2000, where each significant sample updates the significance coding context state of its neighbours, so that they can be efficiently processed in subsequent coding steps and passes. In the case of the FAST block coder, there is no need for this, since each Cleanup pass starts from scratch.

Hardware implementations, in particular, can benefit from the fact that the SigProp coding pass can always be generated concurrently with the Cleanup coding pass, producing or consuming a third bit-stream (the Cleanup pass produces/consumes two bit-streams of its own). This does not require the RESTART mode switch, since the Cleanup and SigProp coding passes always occupy distinct codeword segments.

In software encoders, the SigProp pass can be performed extremely efficiently, with similar complexity to the MagRef coding pass. As with the MagRef coding pass, the SigProp pass can also be skipped altogether in some applications.

Vectorizability

Modern CPU architectures provide powerful vector processing capabilities that have become essential tools for multi-media processing in general. The FAST block coding algorithm has been designed with vectorization in mind and this section reveals some of the opportunities that it presents in this regard. We note that although vectorizability is a software concept, a vectorizable algorithm is necessarily one that exhibits local parallelism. For this reason, a high degree of vectorizability suggest that the algorithm is also suitable for efficient hardware and GPU implementations. Vectorizability is most beneficial when the vectors can be comprised of many small elements (especially individual bytes), since this maximizes throughput. For hardware implementations, this means that the arithmetic and logic operations can be performed at low precision, which has a significant impact on complexity and power consumption.

Successive scan-lines (or line-pairs) in the Cleanup and SigProp coding passes are coupled by a collection of single-bit flags that identify the significance of each sample. Such 1-bit/sample flags also couple the Cleanup pass to the SigProp and MagRef coding passes. During decoding, these flags are generated on a group-by-group basis by VLC table lookups, which is very fast. During encoding, the significance flags can be generated directly from the source samples, or from their magnitude exponents, using common vector comparison and packing instructions found on modern CPU's.

Formation of significance coding contexts during the Cleanup pass requires horizontal aggregation of significance flags from the previous scan-line, together with aggregation of significance information from preceding groups on the same scan-line. The first operation can be efficiently vectorized by both encoders and decoders. The second operation can be vectorized by encoders, since all significance information is known ahead of time. Decoders can perform the second operation efficiently using well designed VLC tables, whose entries provide both the decoded significance flags and the information required to update horizontally aggregated significance bits from the previous scan-line into a the next group's context. Good implementations can achieve this with just one extra logical AND and one logical OR per group of 4 samples.

All quantities required to form magnitude coding contexts can be comfortably represented within 8 bits. In an encoder, the magnitude exponents $E_p[n]$ can be precomputed using vector arithmetic and stored in byte oriented vectors. They can then be converted to coding contexts/predictors using common saturating vector arithmetic operations, processing 16 to 32 samples at a time with common instruction sets such as NEON, SSE2 or AVX2. All of the key quantities that drive the emission of bits to the Cleanup pass's raw bit-stream (or the MagSgn raw bit-stream) can be computed directly using vector arithmetic, achieving high throughput and low latency. Only the packing of sign, magnitude and comma-code/u-code bits into the raw bit-stream(s) are operations that require sequential non-vectorized attention during encoding, and these are quite simple.

For decoders, the magnitude decoding contexts can be at least partially computed using vector arithmetic. Addition and max operations on the magnitude exponents from a preceding scan-line can be fully vectorized. For consolidated magnitude coding variants, horizontal aggregation of magnitude exponents needs to be done sequentially as each successive magnitude exponent is discovered, but this is not the case for distributed variants of the FAST block coding algorithm and some other magnitude coding variants, as explained above.

For the SigProp coding pass, significance flags from the Cleanup pass must be horizontally and vertically aggregated to determine an initial set of pass member locations, which must then be updated sequentially as coding proceeds. The initial set of members can be formed efficiently using vector processing, noting that a single 128-bit vector can manipulate the information associated with 128 samples at once. The scanning and progressive update of membership bit flags during the SigProp pass can be done efficiently with bit manipulation instructions that are now commonly available on modern CPU's.

Concurrent/Parallel Processing

As with JPEG2000, the algorithm described in this document provides macroscopic parallelism at the code-block level. Any number of code-blocks can be processed concurrently by an encoder or a decoder, depending on the memory usage and delay that they are prepared to incur. Since blocks are never more than 4096 samples in size, there is inevitably considerable scope for both software and hardware implementations to exploit this type of parallelism.

At the level of an individual code-block, the multiple bit-stream concept introduces concurrency that can be exploited by both encoders and decoders. In particular, the adaptive encoding/decoding procedure (MQ or MEL coding) associated with the adaptively coded bit-stream can proceed in parallel with significance, magnitude and sign information coding steps. In the triple bit-stream arrangement, concurrent encoding and decoding of all three bit-streams is possible.

Beyond this, the coding passes themselves can usually be processed concurrently. Encoders may generate many coding passes, while decoders may encounter at most 3 coding passes. Encoders may process all coding passes concurrently, so long as sufficient lines of sample data from the code-block are available[3]. In many cases, the encoder will buffer sufficient lines of subband data to accommodate whole code-blocks. However, it is also possible for block encoders to process the Cleanup pass immediately, even as the first line of samples begins to appear. Naturally, since the SigProp and MagRef coding passes work with 4-line stripes, their processing can only start once a full stripe of sample data is available, but apart from this all coding passes may be processed concurrently, with relatively little difficulty.
[3] As mentioned above, for the MagRef coding pass, this is strictly true only when the RESTART mode switch is used, which is highly recommended and incurs negligible overhead.

Concurrent processing of coding passes is less valuable for a decoder, simply because most of the information of interest, and most of the associated processing resources are associated with just one Cleanup pass. So long as the RESTART mode switch is employed, decoders may process any SigProp and MagRef coding passes together. Moreover, these may also be processed concurrently with the Cleanup coding pass, after a small delay, which we now discuss.

With the dual bit-stream structure, the initial 4 lines of significance information must generally be fully decoded before decoding of the other passes can commence. Since significance and magnitude/sign information are interleaved on a line-by-line basis, this means that 3 lines of magnitude/sign information must also be decoded before decoding of other coding passes can commence. In cases, where the code-block height is 4 lines or less, concurrent processing of the SigProp and MagRef coding passes can commence a little earlier, from the point at which the Cleanup pass reaches the start of the last line of the code-block. For example, if code-blocks have only 2 lines, SigProp and MagRef decoding may overlap the second half of the Cleanup decoding process. This property is likely to be valuable in high throughput, low latency applications, and so we discuss it further below.

With the triple bit-stream structure, the significance information can (and generally will) be decoded well ahead of the magnitude and sign information. Working on groups of 4 samples at a time, significance decoding is easily 4 times faster than the worst case magnitude/sign decoding throughput, in just about any implementation, so the inter-pass decoding delay can be deterministically bounded at less than 1 line, or W clock cycles, where W is the width of the code-block.

Local Dependencies

Encoders should experience few, if any, critical dependency paths that might significantly impact clock rates for hardware deployments. Significance coding contexts (group based) and magnitude coding contexts (sample or group based) can be formed directly from the source data, without any sequential dependency on the coding steps themselves. AZC groups can be identified immediately and their significance coded independently, without any dependence on the other coding steps. This is a direct consequence of the cleanup pass's dual bit-stream structure. Significance and magnitude bit patterns within significant groups do need to be sequenced correctly with dual bit-stream organisations, but they can be generated concurrently and sequenced as a separate step, if required, since they consist only of raw binary digits.

Decoders also benefit from the multiple bit-stream structure, which allows AZC significance information to be decoded ahead of time and then integrated with the VLC significance flags to reconstruct the significant sample locations. Significance decoding is performed on groups, rather than individual samples, so the dependencies that exist are between consecutive groups, not consecutive samples, greatly reducing their impact on throughput. Moreover, with triple bit-stream arrangements, the significance information can be fully decoded without any dependence upon the MagSgn bit-stream.

The consolidated magnitude coding method described in above does present some significant critical path dependencies for the decoder, that have an impact on throughput in software and most likely also in hardware. These dependencies are effectively eliminated, however, by adopting the distributed magnitude coding methods that are described above.

As to the adaptive coding throughput, we note that there is only one coding context, which facilitates the use of known multi-symbol concurrent decoding strategies if required. Multi-symbol MEL coding is simpler than multi-symbol MQ coding due to its smaller state machine. In fact, it is usually possible to encode or decode an entire run, or even multiple runs, of AZC significance symbols at once, folding all state transitions into a small lookup table. We also note that there is at most one AZC symbol to be coded/decoded for every 4 subband samples.

Encoding with Post-Compression R-D Optimization

Post-Compression Rate-Distortion Optimization (PCRD-opt) is a valuable feature of the JPEG2000 algorithm, allowing one or more target compressed bit-rates to be achieved simply by truncating the code-block bit-streams that have already been generated. Finding optimal truncation points is relatively straightforward, given a set of distortion estimates (or measurements) for each truncation point.

The PCRD-opt approach is effective because the JPEG2000 block coder produces a finely embedded bit-stream, offering numerous truncation points (3 per bit-plane), most of which typically lie on the convex hull of the code-block's operational rate-distortion characteristic.

Using PCRD-Opt with the FAST Block Coder

While the FAST block coding algorithm described above is not strictly embedded, it does provide a sufficient level of embedding to allow deployment of a PCRD-opt based rate control methodology. There are still 3 coding passes per bit-plane, whose rate-distortion properties turn out to be very similar to those of the standard JPEG2000 block coder. In experiments with typical photographic imagery, we find that applying an optimal truncation algorithm to the set of FAST block coding passes shown in FIG. 1 yields similar compression efficiency as that achieved with the standard JPEG2000 block coder[4].
[4] This observation is true for the case where the standard JPEG2000 block coding algorithm operates in the all-BYPASS mode, where all SigProp and MagRef coding passes emit raw bits and adaptive coding is used only in the Cleanup passes.

Of course, after truncating the set of coding passes generated by a FAST block coder, only the last surviving Cleanup pass is emitted to the codestream, along with the surviving SigProp and MagRef passes that follow it, if there are any. This is because each of the FAST block coder's Cleanup passes completely subsumes all preceding coding passes.

One could argue that any non-embedded block coding algorithm could be used with the PCRD-opt algorithm, by arranging for the encoder to compress the content at a larger number of different qualities (different quantization step sizes) and then eventually discarding all but one of the compressed versions of each code-block.

The difference between such an approach and that proposed here, however, is that the encoder needs at most to produce one Cleanup coding pass per bit-plane, relying upon the SigProp and MagRef coding passes to effectively interpolate the operational rate-distortion characteristic with extremely low computational effort.

Selective Generation of Coding Passes

Advanced implementations of the PCRD-opt methodology for JPEG2000 already make use of predictive strategies to avoid generating many coding passes that are likely to lie beyond the optimal truncation points that will later be found by the PCRD-opt rate control stage. For the FAST block coder, additional strategies can be used to avoid generating coding passes which are likely to be subsumed by a later Cleanup pass that is retained by the PCRD-opt truncation points. That is, predictive strategies can be used to determine both the last coding pass that is worth generating and the first (coarsest) bit-plane from which to start generating coding passes, as suggested by FIG. 1.

Apart from transcoding applications, where rate control is not normally required, the most important applications for the FAST block coder described in this document involve video, since such applications involve very high data rates that can be challenging for the standard JPEG2000 algorithm.

Existing strategies for predicting final coding passes that are not worth generating in JPEG2000 implementations take advantage of the fact that the distortion-length slope thresholds employed by the PCRD-opt algorithm usually change only slowly from frame to frame, so the block encoder can stop generating coding passes as soon as the distortion-length slope threshold associated with coding passes that it has generated becomes smaller than the distortion-length slope threshold selected by the PCRD-opt algorithm in a previous frame, or the smallest such threshold selected in a defined set of previously generated frames. This strategy can be adopted directly with the FAST block coding algorithm, limiting the generation of coding passes that are likely to be discarded by the PCRD-opt rate control stage.

The sub-sections which follow are primarily concerned with the second issue—i.e., predicting the first/coarsest coding pass that needs to be generated by the FAST block encoder. For this purpose, it is again possible to draw upon observations from the compression of earlier frames. It is also possible to supplement this information with statistics derived from subband samples, while they are being assembled into code-blocks. Before describing these methods, we make the following observations:

1. Discarding coarse bit-planes during the encoding process is more "risky" than discarding fine coding passes that we do not expect to survive the PCRD-opt stage. If the first generated bit-plane for a code-block results in the generation of too many bits, the PCRD-opt stage may not be able to include any content for the code-block at all. Thus, the worst case distortion impact associated with the decision to discard coarser bit-planes is much larger than that associated with discarding finer bit-planes.

2. Coarser bit-planes generally consume less computational resources than finer bit-planes, at least within software implementations, so it is advisable for an implementation to err on the side of generating more coarse bit-planes than it needs, rather than more fine bit-planes than it needs. In fact, even when no coarse bit-planes are skipped at all, the FAST block encoder can still be much faster than JPEG2000.

3. High throughput hardware implementations may need to fix the total number of coding passes that will be generated for any given code-block, in a deterministic way. This provides a greater challenge than software environments, where adaptive algorithms are more easily implemented.

4. Applications that require constant bit-rate compressed data streams with low end-to-end latency are the most challenging for algorithms that selectively generate coding passes or bit-planes. The likelihood that a poor decision results in large distortion is greatly increased if the PCRD-opt algorithm is forced to comply with a tight bit budget, especially where this is done regularly on small sets of code-blocks.

Despite the difficulties identified above, it is possible to develop effective algorithms that allow high throughput encoding, even in hardware, with good compression performance.

A Length-Based Bit-Plane/Coding Pass Selection Algorithm

In this section we describe a first algorithm that can be used to skip the generation of coarse bit-planes during the block encoding process. This algorithm relies upon coded length estimates and measurements to mitigate the risk that entire code-blocks must be discarded by the PCRD-opt algorithm. The method is suitable for situations in which at least two bit-planes are encoded, but preferably three or more, and they are encoded sequentially rather than concurrently. This allows the encoded length of each encoded bit-plane to guide the selection of subsequent bit-planes to encode. These attributes may render the algorithm more suitable for software implementations than hardware.

We assume that a sequence of frames from a video sequence is being compressed. For simplicity of description, we also assume that the PCRD-opt algorithm is being used to select coding passes for each frame's codestream subject to a constraint $L_{max}$ on each frame's compressed size. That is, all frames are taken to have the same length constraint. It is not hard to see how the method described below can be adapted to length constraints that might differ from frame to frame. The method may also be adapted to low latency applications, where the length constraint is applied to smaller collections of code-blocks that represent only a fraction of the frame.

As the PCRD-opt algorithm is invoked on each frame k, selecting a set of coding passes (one Cleanup, optionally followed by SigProp and perhaps a MagRef pass) to include in the frame's codestream, we record two types of information for the frame. First, we record the total number of bytes $L_\beta^k$, contributed to frame k's codestream by each subband $\beta$. These can be converted to a set of "suggested" subband data rates $R_\beta^k$, according to $$R_\beta^k = \frac{L_\beta^k}{\Sigma_{b\in\beta}N_b} \cdot \frac{L_{max}}{\Sigma_i L_i^k} \text{ bytes/samples}$$

where $N_b$ is the number of samples in a code-block b, so that $\Sigma_{b\in\beta}N_b$ is just the total number of samples in subband $\beta$.

Now let $L_{p,b}{}^k$ be the length (in bytes) associated with the Cleanup pass belonging to bit-plane p within code-block b of frame k and consider a subsequent (being generated) frame, $k_{gen}$. So long as each code-block b in subband β has at least one generated Cleanup pass, for which $$L_{p,b}{}^{k_{gen}} \leq R_\beta{}^k N_b \quad \text{(RB)}$$

then we can be sure that the PCRD-opt algorithm will be able to generate a codestream for frame $k_{gen}$ whose overall length is no larger than $L_{max}$. Actually, even without this constraint it is always possible for the PCRD-opt algorithm to entirely discard one or more code-blocks in order to satisfy the length constraint $L_{max}$. However, this may incur a large degradation in quality, if code-blocks are being discarded only because the coding passes associated with sufficiently coarse bit-planes were not generated by the block encoder.

The second type of information to be recorded during the generation of frame k's codestream is a coarsest bit-plane index $p_{max,\gamma}{}^k$ associated with each of a collection of code-block groups γ. One grouping approach is to identify each code-block group γ, with a distinct JPEG2000 precinct, although it can be preferable to further differentiate (via distinct groups) the distinct subband orientations (e.g., HH, LH, HL) of the code-blocks within a precinct. It can also be desirable to use overlapping groups of code-blocks. At one extreme, a group consists of a single code-block, while at the other extreme, all subbands from a given resolution level in the wavelet decomposition of an image component might be considered to constitute a single group. In any event, $p_{max,\gamma}{}^k$ is the coarsest bit-plane associated with any Cleanup pass from any code-block in group γ that the PCRD-opt algorithm chooses to embed in the codestream for frame k. Additionally, let $\gamma_b$ be the "natural" group for code-block b, which is just the group to which code-block b belongs, unless there are multiple such groups (overlapping groups), in which case $\gamma_b$ is the group whose geometric centre most closely coincides with that of code-block b.

Using this information in a subsequent (i.e., being generated) frame, $k_{gen}$, the block encoder for code-block b starts by generating its first Cleanup coding pass for bit-plane $$p = \min\{p_{msb,b}{}^{k_{gen}}, p_{max,\gamma_b}{}^k + \Delta_{adj}\}, \text{ yielding coded length } L_{p,b}{}^{k_{gen}}$$

Here, $p_{msb,b}{}^{k_{gen}}$ is the coarsest (most significant) bit-plane for which any sample in code-block b is significant in frame $k_{gen}$. Essentially, the block encoder interprets the coarsest bit-plane for which any coding pass was emitted in the earlier frame k, within a neighbourhood (the group $\gamma_b$) of code-block b, as an initial estimate for the coarsest bit-plane that it needs to consider in frame $k_{gen}$. The offset $\Delta_{adj} \geq 0$ must at least sometimes be non-zero so as to ensure that the algorithm does not become trapped (over time) in a sub-optimal state.

Importantly, the block encoder compares the length $L_{p,b}{}^{k_{gen}}$ of this first generated Cleanup pass with the suggested subband data rate, as given by equation (RB) above. If $L_{p,b}{}^{k_{gen}}$ exceeds the bound $R_\beta{}^k N_b$ and $p < p_{msb,b}{}^{k_{gen}}$, the bit-plane index p is increased by 1 and a new Cleanup pass is encoded, having the (generally smaller) length $L_{p,b}{}^{k_{gen}}$. This process is repeated until the coarsest generated Cleanup pass satisfies the suggested rate bound or no coarser significant bit-planes exist. Once this condition is reached, the encoder may generate content for even coarser bit-planes to provide the PCRD-opt algorithm with a greater diversity of content, subject to available computational resources.

Both the complexity and performance of this method depend on the $\Delta_{adj}$ value. In software implementations that do not have tight latency constraint, the value of $\Delta_{adj}$ can be adapted from frame to frame in order to achieve a required average throughput.

A Coding Pass Selection Algorithm for Low Latency Applications

In this section we describe an algorithm for generating a prescribed maximum number of coding passes in any given code-block. The algorithm is suitable for high performance hardware implementation, as well as software, since the bit-planes to be processed are determined up front, without relying upon a sequential encoding process. Unlike the preceding section, which considered only the determination of a coarsest bit-plane to process, here we are concerned with the determination of the full set of coding passes to be processed for a given code-block.

The algorithm described here is suitable for low latency applications, where the PCRD-opt algorithm is exercised regularly on collections of code-blocks that might represent only a small part of a complete video frame; we use the term "flush-set" for such a collection of code-blocks. Again, we rely upon the fact that a sequence of video frames is being compressed, so that outcomes from the PCRD-opt algorithm in a previous frame can be used to guide the selection of coding passes in a subsequent frame. The selection of coding passes for each code-block is based on distortion-length slope information, since coded lengths are not available up front.

In the following discussion, we first briefly review the PCRD-opt process for selecting an appropriate coding pass from a set of coding passes generated for each code-block. This is essentially a review of the PCRD-opt algorithm, which is not specific to the problem of limiting the set of coding passes actually generated in the first place.

Let $L_\gamma{}^{k_{gen}}$ represent the length constraint that applies to a single flush-set (group of code-blocks) γ in the current frame being generated. Let $T_\gamma{}^{k_{gen}}$ represent a distortion-length slope threshold for the flush-set γ. The slope threshold $T_\gamma{}^{k_{gen}}$ is used to select appropriate coding passes from each code-block in accordance with distortion-length performance. We use the notation $S_{cp,b}{}^{k_{gen}}$ to refer to the distortion-length slope resulting from choosing coding pass cp for a code-block b. This is the ratio between distortion reduction and coded length increase, measured between coding passes which lie on the convex hull of the code-block's operational distortion-length characteristic; these slope values necessarily decrease monotonically as the coding passes progress from coarse bit-planes to the finest bit-plane. The PCRD-opt algorithm identifies the last coding pass cp, if any, to be included from code-block b in the generated flush-set. Specifically, cp is the last (finest) coding pass, if any, for which $S_{cp,b}{}^{k_{gen}} \geq T_\gamma{}^{k_{gen}}$.

Let $L_{cp,b}{}^{k_{gen}}$ represent the length of a code-block b for the selected coding pass cp which adheres to the distortion-length slope objective. The summation of all length contributions from each code-block in the flush-set $\hat{L}_\gamma{}^{k_{gen}} = \Sigma_{b \in \gamma} L_{cp,b}{}^{k_{gen}}$ provides an initial length value which can then be compared to the flush-set target length $L_\gamma{}^{k_{gen}}$. If the initial length $\hat{L}_\gamma{}^{k_{gen}}$ exceeds the target length $L_\gamma{}^{k_{gen}}$ then $T_\gamma{}^{k_{gen}}$ can be increased appropriately and the coding pass selection process repeated for the flush-set. A larger value for $T_\gamma{}^{k_{gen}}$ means coarser bit-planes will potentially be selected from each code-block, thereby reducing the contribution to total length. The slope threshold $T_\gamma{}^{k_{gen}}$ can be repeatedly increased until total flush-set length $\hat{L}_\gamma{}^{k_{gen}}$ no longer exceeds the target $L_\gamma{}^{k_{gen}}$. In a similar manner, if initially $\hat{L}_\gamma{}^{k_{gen}}$ is lower than the target length $L_\gamma{}^{k_{gen}}$ then the slope threshold $T_\gamma{}^{k_{gen}}$ can be decreased and the coding pass selection process repeated. A lower value for $T_\gamma^{k_{gen}}$ implies finer bit-planes will potentially be selected from each code-block, increasing the contribution to total length.

We now describe the process followed in generating a limited set of coding passes for each code-block. This relies upon the observation that the rate-distortion characteristics of code-blocks are relatively stable from frame to frame. Therefore the coding of the current code-block b can be guided by attributes of the corresponding code-block $\hat{b}$ in the previous frame. The preferred embodiment makes use of a number of stored attributes of $\hat{b}$; these include the bit-plane $p_{\hat{b}}^k$ and the associated coding pass $cp_{\hat{b}}^k$ (ie Cleanup, SigProp or MagRef) that was last included in the bit-stream. We find that in many instances, $p_{\hat{b}}^k$ is a good estimate for the bit-plane of the current code-block at which coding should be performed. Therefore the Cleanup pass at bit-plane $p_{\hat{b}}^k$ and associated SigProp and MagRef passes are always generated for the current code-block. To allow the rate-control algorithm to adapt to changes in content from frame to frame, it is important to also consider generating coding passes for coarser and finer bit-planes with respect to the predicted anchor $p_{\hat{b}}^k$. In the preferred embodiment, coding passes for bit-planes $p_{\hat{b}}^k+1$ and $p_{\hat{b}}^k-1$ are considered, depending on the status of the corresponding code-block $\hat{b}$ in the previous frame.

If $p_{\hat{b}}^k$ equates to the coarsest bit-plane that was generated for the previous code-block $\hat{b}$; and the corresponding last coding pass that was included $cp_{\hat{b}}^k$ is a Cleanup pass then an "initial coding pass" flag is set to 1 (INITIAL_CP=1). This indicates that a coarser bit-plane may have been useful but was not available to the prior code-block $\hat{b}$. The current code-block therefore considers the coarser bit-plane $p_{\hat{b}}^k+1$, generating the Cleanup pass and optionally the associated SigProp and MagRef passes. The inclusion of the SigProp and MagRef can be made dependent on a user defined upper limit on the total number of coding passes that are to be generated.

If $p_{\hat{b}}^k$ equates to the finest bit-plane that was generated for the previous code-block $\hat{b}$, and the corresponding last coding pass that was included $cp_{\hat{b}}^k$ is a MagRef pass then a "final coding pass" flag is set to 1 (FINAL_CP=1). This indicates that a finer bit-plane may have been beneficial but was not generated for the prior code-block $\hat{b}$. To further validate the benefit of considering a finer bit-plane, the distortion-length slope $S_{cp,\hat{b}}^k$ corresponding to coding pass $cp_{\hat{b}}^k$ is compared with the flush-set threshold $T_\gamma^k$; where $\hat{\gamma}$ denotes the flush-set which includes the prior code-block $\hat{b}$. If there is only a small difference between $S_{cp,\hat{b}}^k$ and $T_\gamma^k$ then this implies that the generated coding pass $cp_{\hat{b}}^k$ was adequate and there may be little gain in considering a finer bit-plane for current code-block. However, if the "final coding pass" flag is set to 1 (i.e. FINAL_CP=1) and the slope value $S_{cp,\hat{b}}^k$ is substantially larger than the flush-set threshold $T_\gamma^k$ then the finer bit plane $p_{\hat{b}}^k-1$ is considered for the current code-block. The Cleanup pass and optionally the associated SigProp and MagRef passes are then generated for bit plane $p_{\hat{b}}^k-1$. Once again the generation of the SigProp and MagRef passes can be made dependent on a user defined upper limit on the total number of coding passes that are to be generated.

Another important code-block attribute that is monitored from frame to frame is the number of missing MSB for each code-block. Large differences in missing MSB between the prior code-block $\hat{b}$ and current block b can be used as crude measure of a rapid change in the complexity of the code-block. In the preferred embodiment, if the number of missing MSB for the current block b is greater than that of the prior block $\hat{b}$ then coding passes for the finer bit plane $p_{\hat{b}}^k-1$ are generated regardless of the FINAL_CP flag or the values for $S_{cp,\hat{b}}^k$ and $T_\gamma^k$; since these measures are not considered valid due to the rapid change in code-block complexity. The impact that the number of missing MSB can have on coding pass generation can be made selective depending upon sub-band; for example in the preferred embodiment for the LL sub-band the number of missing MSB is not considered as a dependable measure of change in code-block complexity.

For each of the generated coding passes, a corresponding distortion-length slope is calculated and stored. These slope values are then used to select the coding passes that will be finally included into the bit-stream. The rate-distortion optimal coding pass selection strategy, based on distortion-length slopes, was described earlier in this section.

In some implementations, it is not actually necessary to store distortion-length slopes and thresholds from a previous frame, because the algorithm described above relies only upon whether the difference between $S_{cp,\hat{b}}^k$ and $T_\gamma^k$ is small.

Complexity-Aware Coding Pass Selection Algorithm

The method described above works well in practice, even when every code-block is constrained to process no more than 2 consecutive bit-planes, except where large changes in complexity are experienced between consecutive frames in the video sequence. In particular, if a frame (or region of a frame) exhibits very low complexity (e.g., little texture, few edges, etc.), the PCRD-opt algorithm tends to select the finest bit-plane available for each relevant code-block. Over a sequence of frames, this rapidly moves the operating point to one that represents very fine quantization of the content. If the complexity then suddenly increases, this fine operating point produces far too many bits and the PCRD-opt algorithm is forced to discard whole code-blocks, resulting in a large distortion penalty. The condition disappears rapidly, with high performance restored typically within 2 or 3 frames from a large complexity transient, which might well be sufficient to avoid perceptible distortions, but it is desirable to take steps to reduce or eliminate such transients. In this section, we describe a way to measure both global and local complexity, which can be used to enhance the coding pass selection algorithm described above.

In memory/latency constrained environments, lines of subband samples produced by the wavelet transform are pushed incrementally to a collector, which assembles them into code-blocks and then launches the block encoding process at the earliest convenience. During this process, the subband samples can be analysed to assess coding complexity. Subband samples from horizontally adjacent code-blocks in the same subband and from other subbands at the same level in the wavelet hierarchy are produced at similar times, so their complexity can be combined to form more global estimates. Similarly, complexity information can be combined from subbands belonging to different image components (e.g., colour components), where the combined subbands have the same vertical resolution. Even more global estimates can be formed by accumulating complexity estimates across different resolutions, but this can only be done selectively in memory or latency constrained applications.

The method described here begins with the accumulation of absolute subband samples within individual code-blocks, as a local measure of complexity. Specifically, for a code-block b within subband β, the local complexity measure may be expressed as $$C_\beta[b] \cong \log_2\left(\frac{1}{\|\mathcal{N}_b\| \cdot \Delta_b} \sum_{n \in \mathcal{N}_b} (X_b[n] | | \Delta_\beta)\right)$$

Here, $\Delta_\beta$ is the quantization step size, $\mathcal{N}_b$ denotes the set of sample locations that lie within code-block b, and $\|\mathcal{N}_b\|$ is the code-block area. We write rather than strict equality, since in many applications the $\log_2(x)$ operation will be approximated rather than computed exactly. For example, some or all of the bits in a floating point representation for x may be re-interpreted as a fixed-point approximation of $\log_2(x)$. Efficient computation of $C_\beta[b]$ might involve moving the division by $\|\mathcal{N}_b\| \cdot \Delta_\beta$ outside the logarithm, where it becomes a fixed offset.

As mentioned, the accumulation represented by the above equation would typically be performed incrementally, as subband samples become available from the wavelet transform and perhaps other transformation processes, such as a colour transform. Once a complete row of code-blocks has been assembled for encoding, the normalization and log operations associated with $C_\beta[b]$ may be performed for each code-block in the row. At the same time, the local complexity estimates may be combined into more global estimates as follows:

$$\mathcal{G}_v = \frac{\sum_{(\beta,b) \in \mathcal{V}_v} C_\beta[b] \cdot \|\mathcal{N}_b\|}{\sum_{(\beta,b) \in \mathcal{V}_v} \|\mathcal{N}_b\|}$$

Here, $V_v$ identifies a single "v-set" (vertical set) of subband samples, consisting of one row of code-blocks from each subband that has the same vertical resolution. The subbbands that contribute to a given v-set may belong to different image components but should have the same vertical sampling rate[5] and the same vertical code-block size, taking into account the effect of the relevant JPEG 2000 precinct partition. Thus, $\mathcal{G}_v$ can be understood as an area-weighted average complexity of the code-blocks that are found within the v-set indexed by v.

[5] By vertical resolution, we mean the rate at which subband lines appear as image lines (from the image component with the highest vertical resolution) are pushed into the wavelet transform. Apart from rounding effects, the vertical resolution of a subband is the number of lines in the subband, divided by the height of the image.

As mentioned, complexity values from different vertical resolutions may be selectively combined. To make this concrete, let $\mathcal{P}(V_v)$ denote the region spanned by the subband samples belonging to v-set $V_v$, when projected onto the "high resolution grid" of the JPEG 2000 canvas coordinate system. The complexity information within v-set V is considered compatible with v-set $V_v$ if $\mathcal{P}(V_w) \subseteq \mathcal{P}(V_v)$. The complexity information from compatible v-sets $V_w$ may be used to augment the global complexity value $\mathcal{G}_v$ for v-set, so long as this information is available prior to the point at which the code-blocks belonging to $V_v$ need to be coded. Since the vertical delay incurred due to wavelet transformation grows with depth in the multi-resolution hierarchy, we do not expect to be able to integrate complexity information from v-sets with low vertical resolutions with those having much higher vertical resolutions. In some cases, however, information from a lower resolution might be used to augment the global complexity available to v-sets at the next higher resolution, subject to constraints on latency and memory. On the other hand, it is relatively straightforward to integrate complexity information from higher resolutions into the global complexity available to v-sets at lower resolutions.

Taking these considerations into account, let $\mathcal{U}(V_v)$ denote the collection of all v-sets $V_w$, including $V_v$ itself, such that $\mathcal{P}(V_w) \subseteq \mathcal{P}(V_v)$ and such that the subband samples found within $V_w$ are produced by the wavelet transform sufficiently ahead of the point at which the code-blocks in v-set $V_v$ need to be encoded. We then define an augmented (or "unified") global complexity value that can be used during the encoding of code-blocks in v-set $V_v$ as follows:

$$\mathcal{G}_v^\mathcal{U} = \frac{\sum_{V_w \in \mathcal{U}(V_v)} \sum_{(\beta,b) \in V_v} C_\beta[b] \cdot \|\mathcal{N}_b\|}{\sum_{V_w \in \mathcal{U}(V_v)} \sum_{(\beta,b) \in V_v} \|\mathcal{N}_b\|}$$

In the simplest case, $\mathcal{U}(V_v)$ can just be $V_v$ itself, so that $\mathcal{G}_v^\mathcal{U} = \mathcal{G}_v$.

We now explain how the local and global complexity values affect the selection of coding passes to encode within code-block b. Let v(b) be the index of the v-set to which code-block b belongs. Then the local and global complexity information available during the encoding of code-block b consists of $C_\beta[b]$ and $\mathcal{G}_{v(b)}^\mathcal{U}$, respectively. Let $C_{\hat\beta}[\hat b]$ and $\mathcal{G}_{v(b)}^\mathcal{U}$ denote the corresponding quantities, as computed in a previous frame of the video sequence, where $\hat b$ and $\hat\beta$ are the code-block and subband from the previous frame that correspond to b and β in the current frame. Since these are all logarithmic quantities, an 8-bit fixed-point representation with 2 or 3 fraction bits should be sufficient for storing them between frames, for most practical applications. The coding pass selection method of Section 0 is modified by adding an offset $\delta_b$ to the predicted anchor bit-plane $p_{\hat b}^k$ discussed there. Specifically, $$\delta_b = [\mathcal{G}_{v(b)}^\mathcal{U} - \mathcal{G}_{v(b)}^\mathcal{U}] + \alpha \cdot \max\{0, [C_\beta[b] - C_{\hat\beta}[\hat b]] - [\mathcal{G}_{v(b)}^\mathcal{U} - \mathcal{G}_{v(b)}^\mathcal{U}]\}$$

where α is a small positive constant (e.g., 0.5 or 0.25).

To understand this modification, observe firstly that an increment of δ=1 effectively doubles the quantization step size associated with the anchor bit-plane that is encoded. At face value, simply setting $\delta_b = \mathcal{G}_{v(b)}^\mathcal{U} - \mathcal{G}_{v(b)}^\mathcal{U}$ could be expected to approximately compensate for global scene complexity changes. The second term in the above expression encourages the generation of even coarser bit-planes for code-blocks whose relative complexity (local relative to global) has increased. This reduces the risk of generating too much data within code-blocks which undergo large increases in complexity that might not be compensated fully be decreases in complexity elsewhere. Essentially, the parameter α is used to manage the risk mentioned earlier, that a sudden change in complexity may result in generated coding passes that are too large for any information associated with a code-block to be included in the flush-set, resulting in large local distortions.

In the formulation above, $\delta_b$ is not generally integer-valued, while the predicted anchor bit-plane $p_{\hat b}^k$, which it adjusts is necessarily an integer. Of course, $\delta_b$ should be rounded to an integer value, but the remaining fractional part of $\delta_b$ can also be taken into account in the selection of coding passes to generate. As mentioned in Section 0, the coarsest bit-plane that is actually generated may lie above or below the anchor bit-plane, depending on the actual coding pass that was selected in the previous frame, the INITIAL_CP flag, the FINAL_CP flag, and the relevant distortion-length slopes. Moreover, in typical applications at least two bit-planes are generated, usually with 3 coding passes each (Cleanup, plus SigProp and MagRef refinements). The fractional part of $\delta_b$ may clearly be used to bias these decisions.

Bit-Rate and Distortion-Length Slope Estimation Strategies

The algorithm described above can be understood in terms of an assumption that the bit-rate experienced when coding code-block b to bit-plane p should be of the form $R_0 + C_\beta[b] - p$, where $R_0$ is a constant that does not vary from frame to frame. This is a very crude model, that we do not expect to be accurate at lower bit-rates (coarser bit-planes) where many samples are insignificant.

Much more accurate estimates of the coded bit-rate can be formed for a code-block without actually performing the encoding process. One way to do this is by forming a tally $\Sigma_p$ of the number of significant samples that occur in each available bit-plane p=0, p=1, .... Certainly this requires computation, but it can be much less expensive than actually performing the encoding steps. From these $\Sigma_p$ values, one can directly determine the $1^{st}$ order entropy of the significance flags for each bit-plane p, and one also knows the number of magnitude and sign bits that need to be packed in the MagSgn bit-stream for each p. Allowing 1 or 2 bits for coding the unsigned magnitude exponent prediction residuals for each significant sample, one obtains a reasonable estimate for the number of bits required by the Cleanup pass at any given bit-plane p. This estimate is likely to be conservative, since the actual coding methods tend to be more efficient.

Another way to estimate the bit-rate of the encoding process is to fit a generalized Gaussian model for the probability density function of the subband samples within a code-block and use pre-computed values for the bit-rate at each bit-plane p, that depends only on the parameters of the model. To fit the model, it is sufficient to collect just two statistics for each code-block, one of which can be the mean absolute value, or equivalently the complexity estimate $R_0 + C_\beta[b]$ introduced earlier, while the other can be the mean squared value of the subband samples.

The main advantage of the model based approach over directly counting significant samples in each bit-plane is reduction in complexity. Both approaches yield a function that predicts the coded bit-rate for any given code-block, as a function of the bit-plane p. From this function, one may also derive an estimate of the operational distortion-length slope for the code-block at each bit-plane. These bit-rate and distortion-length slope estimates can be used to select a narrow set of coding passes to actually generate for each code-block, in a variety of application settings.

In a variable bit-rate setting (VBR), we arrange for the distortion-length slope threshold $T_\gamma^{kgen}$ to change only slowly from frame to frame, even though this may mean that the coded size of each frame varies. An outer loop adjusts $T_\gamma^{kgen}$ slowly over time so as to maintain a target average bit-rate; this is usually done via the classic "leaky bucket" model. In such applications, the PCRD-opt algorithm is driven directly by the threshold $T_\gamma^{gen}$, which is known prior to the point at which code-blocks are actually encoded, so the distortion-length slope estimates for each bit-plane p can be used to determine the coding passes that should be generated for a code-block.

Specifically, if the estimates can be relied upon to be conservative, it is sufficient to find the smallest (i.e., highest quality) p such that the estimated distortion length slope is larger than $T_\gamma^{gen}$, generating the Cleanup pass for this p, followed by one or perhaps two higher quality (smaller p) Cleanup passes, along with their respective SigProp and MagRef coding passes. The actual PCRD-opt algorithm then operates with this limited set of generated coding passes.

In a constant bit-rate (CBR) setting, the estimated bit-rates and distortion-length slopes for each code-block in a v-set $V_v$, or in the larger set $\mathcal{U}(V_v)$, to which it belongs, can be used to simulate the expected behaviour of the PCRD-opt algorithm, to determine the bit-plane (if any) whose Cleanup pass we expect to include in the code-stream for each code-block. Again, assuming that the estimates are conservative, meaning that the actual block coder is more efficient than the estimate suggests, it is then sufficient to generate just this estimated Cleanup pass, plus one or two higher quality (i.e., smaller p) Cleanup passes, along with their respective SigProp and MagRef coding passes. The actual PCRD-opt algorithm then operates with this limited set of generated coding passes.

Codestream Syntax and Transcoding

In this section we explain how the FAST block coding process can be used to realize a variety of valuable transcoding objectives. First, we explain the small set of modifications to the JPEG2000 standard that are required to support incorporation of the FAST block coder as an option that can be used on a precinct-by-precinct basis. Then we explain how this capability can be exploited.

Changes to the JPEG2000 Codestream Syntax

The FAST block coding algorithm has almost no impact on the JPEG2000 syntax. The simplest way to incorporate this coding option in the existing codestream syntax is to extend the definition of the 16-bit SXcod field in from IS15444-2/AMD4. We begin by explaining the standard interpretation of the SXcod field.

If bit-5 is set within a JPEG2000 COD (resp. COC) marker segment's style byte Scod (resp. Scoc), then the marker segment contains a 16-bit SXcod field that is used by the standard JPEG2000 block coder to identify additional BYPASS options. In particular, according to IS15444-2/AMD4, the 2 LSB's of the SXcod field encode a value BB that identifies the number of additional bypassed bit-planes to be used, whenever the BYPASS flag (bit-0) of the codeblock style field SPcod (resp. SPcoc) is set. When BYPASS=1 and BB=01, arithmetic coding is bypassed in all bit-planes, for both the SigProp and MagRef coding passes.

To incorporate the FAST block coding algorithm, additional (currently reserved) bits within the SXcod field can be given the interpretation identified in Table 10. If the FAST block coder is to be used in all precincts described by the COD (or COD) marker segment, then BYPASS should be 1 and BB should be 01. Then the existing JPEG2000 packet parsing machinery will correctly recover the FAST block coder's codeword segments without any modification.

TABLE 10

Structure of the SXcod field

| SXcod Bit Fields | Interpretation |
| --- | --- |
| cccxxxxx xxxxxxxx | Block-coding type $C_{typ}$ (ccc = 0 to 7): <br> 0 = STD JPEG2000 block coder; <br> 1 = FAST block coder used in all precincts |

TABLE 10-continued

Structure of the SXcod field

| SXcod Bit Fields | Interpretation |
| --- | --- |
|  | 2 = MIXED; FAST block coder used in selected precincts<br>3-7 = reserved |
| 00000000 000000BB | Ultra-fast bypass extensions (BB = 0 to 3):<br>0: no ultra-fast mode;<br>1-3: 4 − number of extra bypassed bit-planes |
| 00100000 00000001 | When the FAST block coder is used in all precincts, the BB field should equal 01. |
| 010xxxxx xxxxxxxx | When the FAST and STD block coding algorithms might be used in different precincts, all mode flags, the BB field describes extra bypass options (if any) for the STD block coding algorithm, while precincts that use the FAST block coding algorithm implicitly use BB = 01. |

The more interesting (and slightly more invasive) option identified in Table 10 is the MIXED mode, where the FAST block coding algorithm may be used in selected precincts, while the standard JPEG2000 block coding algorithm is used in the others. In this case, all block coding options defined by the COD (resp. COC) marker segment apply to the standard block coding algorithm, where it is used, while the FAST block coding algorithm uses the same coding options (where applicable), except that the BYPASS=1 and BB=01 are implied.

In this MIXED mode, the precincts that use the FAST block coding algorithm are identified by slightly modifying the way in which the first byte of the first packet within each precinct is interpreted. The standard JPEG2000 packet parsing algorithm interprets packets whose first byte has its MSB (bit-7) set as "Zero Length" packets. Accordingly, we identify this bit as the ZLP bit here. In practice, the ZLP signalling mechanism in JPEG2000 is only valuable for non-initial packets of a precinct, since the first packet can be identified as entirely empty, simply by setting the first byte equal to 0[6]. With this in mind, the ZLP bit of the first packet of any precinct that is in the MIXED mode is redefined to be 1 if the FAST block coding algorithm is used and 0 otherwise. All other aspects of packet parsing (Tier-2 decoding) then remain unchanged, except that the first packet cannot be a "Zero Length" packet and the precinct's packets are parsed as if the BYPASS and BB modes were 1 and 01, respectively, if the first packet's ZLP bit was 1.

[6] Strictly speaking, an additional 0 byte may be required to signal the presence of an entirely empty initial packet if the precinct has more than 7 subbands, but this is only possible when the Part-2 Arbitrary Decomposition Style (ADS) feature is used.

Transcoding STD Bit-Streams to FAST Bit-Streams

Transcoding to the FAST block coder representation can be valuable in a number of applications. In a media distribution service, entire images, video frames or video sequences might be transcoded to the FAST representation in order to match the computational or hardware capabilities of the final rendering platform. In particular, mobile platforms could benefit from the availability of FAST representations to reduce the energy demands associated with full JPEG2000 decoding. In such applications, the media distribution service (e.g. a "cloud" based service) can take advantage of the quality scalability of the standard JPEG2000 representation, selecting a quality layer that best matches the intended rendering task, along with available communication bandwidth. Each FAST block bit-stream in such an application is transcoded from a (possibly) truncated set of original coding passes, depending on the quality layer selected.

Transcoding to the FAST block coder representation can also be performed locally by the image/video rendering platform itself, based on the frequency with which code-blocks need to be re-rendered. Interactive rendering applications based on JPEG2000, usually involve repeated reconstruction of at least some code-blocks, as a user dynamically pans or zooms within the content, taking advantage of the fact that only those code-blocks that relate to the content of interest need actually be decoded. Such applications can benefit from transcoding frequently reconstructed code-blocks to the FAST representation. In particular, an efficient interactive rendering engine can maintain a limited history, recording the identities of precincts containing recently decoded code-blocks, along with the number of code-block decoding operations that have been performed for each such precinct. Based on this information, the rendering engine can determine whether it is likely to be favourable to transcode all code-blocks in the precinct, so that future reconstruction of the content can be much more efficient in terms of energy or processing time.

In the case of JPIP-based interactive browsing of remote media, the JPIP client generally caches so-called "precinct data-bins" that it receives from the server. The cache can then be augmented with the ability to selectively transcode precincts to the FAST representation based on the frequency with which they are accessed by the rendering machinery (decoding history) together with the frequency with which they are being updated by the arrival of new content from the server (communication history). For example, a JPIP cache can augment each the entry associated with each precinct data-bin in its cache with a counter that records the number of times the precinct's content has been retrieved for rendering, since it was last augmented by the arrival of data from the server. Based on the value of this counter, the precinct can be transcoded to a FAST representation that either overwrites the original cache entry or is recorded in a parallel cache entry reserved for such transcodings. This gives the rendering engine the alternative of using the FAST block bit-stream unless the precinct has been sufficiently augmented by the arrival of new data from the server since it was last transcoded. The improvement in processing throughput/energy associated with the FAST representation becomes increasingly significant as the coded bit-rate (bits per sample) associated with a code-block increases. A smart JPIP cache can take this into account by transcoding only those precincts whose data-bins are sufficiently large.

All transcoding operations can be performed independently on individual code-blocks without the need for wavelet or multi-component transforms to be inverted and/or re-applied. Notionally, transcoding from a standard JPEG2000 block bit-stream to a FAST bit-stream is achieved by decoding the available JPEG2000 coding passes and then re-encoding the resulting samples using the FAST block coding algorithm. However, this superficial approach is neither as efficient as it can potentially be, nor is it necessarily truly reversible.

For a truly reversible transcoding, it is important that the Cleanup pass of the FAST block bit-stream is followed by a SigProp coding pass if and only if the final Cleanup pass of the original JPEG2000 block bit-stream was also followed by a SigProp coding pass. Similarly, the FAST block bit-stream must finish with a MagRef coding pass if and only if the original JPEG2000 block bit-stream finished with a MagRef coding pass. The reason for these conditions is that the effective quantizer that has been applied to each sample in the code-block depends on whether the final coding pass in the JPEG2000 embedded bit-stream is a Cleanup, a SigProp or a MagRef coding pass. This, in turn, affects the way in which a sample should be dequantized. A key element in the design of the FAST block coding algorithm is that its coding passes represent exactly the same set of sample-dependent quantizers as those of the standard JPEG2000 block coding algorithm, so it is important that the transcoded representation finishes with the same type of coding pass as the original one.

The FAST block coding algorithm need only generate one Cleanup pass when transcoding a standard JPEG2000 block bit-stream. Moreover, the sample magnitudes and signs that must be coded in the Cleanup pass are those produced after decoding the final Cleanup pass of the original bit-stream. In fact, the magnitude exponent E[n] of each significant sample to be coded by the FAST block coder's Cleanup pass can be obtained as a byproduct of the MagRef membership tests performed by while decoding the standard JPEG2000 block bit-stream.

If the standard JPEG2000 block bit-stream used the arithmetic coder BYPASS option for its final SigProp or MagRef coding passes (following the final Cleanup pass), the codeword segments for those coding passes can be transferred directly to the FAST block bit-stream, further simplifying the transcoding process.

Transcoding FAST Bit-Streams to STD Bit-Streams

Transcoding in the reverse direction, from the FAST representation back to a standard JPEG200 block bit-stream, can also be valuable. In a high resolution/frame-rate video capture application, the content can initially be encoded using the FAST block coder representation. Subsequently, the content can be transcoded either in full, or on a precinct basis, to the standard JPEG2000 representation so as to enable quality scalability. The enabling of quality scalability is particularly important for bandwidth-efficient JPIP-based interactive media browsing. Specifically, a JPIP server can choose to transcode precincts on demand, only when they are accessed by JPIP clients.

Again, for efficient and truly reversible transcoding, it is important that the transcoded representation finish with the same type of coding pass (Cleanup, SigProp or MagRef) as the original representation.

Indication of Compression Performance

While the FBCOT algorithm documented herein will be tested thoroughly for low latency applications as part of the JPEG-XS standardization effort, it is worth providing here some initial experimental evidence concerning the performance of the method.

We have created a version of the Kakadu tools for JPEG2000 that allow the FAST block coder to be selected as a drop-in replacement for the standard block coder, preserving all other attributes, such as visual weights, codestream structure and so forth. The new option is made available by specifying Ctyp=FAST instead of the default Ctyp=STD. Using this implementation, we evaluate compression efficiency for the following options:

DEF: kdu_compress -i <image> -o im.jpx -rate <rate>

BYP: kdu_compress -I <image> -o im.jpx -rate <rate>
   Cmodes=BYPASS|BYPASSS_E1|BYPASS_E2

FAST: kdu_compress -I <image> -o im.jpx -rate <rate>
   Cmodes=BYPASS|BYPASSS_E1|BYPASS_E2
   Ctyp=FAST Here <rate> is the compressed bit-rate, measured in bits/pixel, for which we explore 1 bpp, 2 bpp and 4 bpp. <image> is the test image being compressed, for which we use the standard ISO test images "bike" and "woman", each of which is an original (never compressed) full RGB 2560×2048 colour image. The "bike" image exhibits numerous sharp features with strong spatial structure, while "woman" provides a very different type of content, characterized by smooth regions and strong, unstructured textures. Although we report results only for these two images for brevity, we find that other content exhibits similar behaviour.

In all 3 images, the code-block size is 64×64. These conditions allow us to equitably compare the compression efficiency of the FAST block coding algorithm with two variants of the standard JPEG2000 block coding algorithm (DEF and BYP). The DEF configuration corresponds to the default JPEG2000 coder conditions in which arithmetic coding is used for all coding passes and a single embedded bit-stream is generated with just one codeword segment (minimal overhead). The BYP configuration corresponds to the case in which arithmetic coding is bypassed in all possible coding passes, leading to higher throughput in exchange for some loss in compression efficiency. This mode is the closest to that of the FAST block coder, but note that it still involves a large number of coding passes, and all Cleanup passes use context adaptive arithmetic coding for all symbols.

Initial Experiments with Consolidated Magnitude Coding

In a first set of experiments, we evaluate two variants of the FAST block coder, corresponding to the use of MQ and MEL coding options for the adaptively coded bit-stream of the cleanup pass, as detailed in Sections 0 and 0. We denote these two cases as FAST-MQ and FAST MEL. In these experiments, the linear 1×4 group structure is employed for the FAST Cleanup pass, with consolidated magnitude coding and a dual bit-stream configuration.

Table 11 and Table 12 compare compression performance for the four configurations described above, over the identified bit-rates. Evidently, the FAST-MQ, FAST-MEL and BYP options all have nearly identical compression efficiency over all bit-rates and colour components. The DEF scheme does of course have higher compression efficiency, making extensive use of context adaptive arithmetic coding, but the difference diminishes to around 0.4 dB in the high bit-rate regime.

TABLE 11

Compression efficiency comparison between JPEG2000 variants (DEF and BYP) and the FAST block coding algorithm, with MQ and MEL coding technologies for AZC group significance symbols, linear 1 × 4 groups, consolidated magnitude coding and dual bit-stream Cleanup pass; results are reported in PSNR (dB) at 3 bit-rates. The results here are obtained with MSE (equivalently PSNR) as the PCRD optimization objective.

| | Image: | | | | | |
| --- | --- | --- | --- | --- | --- | --- |
| | Bike | | | Woman | | |
| Rate/Scheme | R-PSNR | G-PSNR | B-PSNR | R-PNSR | G-PSNR | B-PSNR |
| 1 bpp/DEF | 35.70 | 36.03 | 33.45 | 35.95 | 36.93 | 35.27 |
| 1 bpp/BYP | 35.00 | 35.16 | 32.83 | 35.57 | 36.52 | 34.89 |
| 1 bpp/FAST-MQ | 34.93 | 35.06 | 32.72 | 35.50 | 36.46 | 34.77 |
| 1 bpp/FAST-MEL | 34.95 | 35.08 | 32.73 | 35.50 | 36.45 | 34.76 |
| 2 bpp/DEF | 39.08 | 40.51 | 36.85 | 39.25 | 41.18 | 38.69 |
| 2 bpp/BYP | 38.37 | 39.87 | 36.35 | 38.89 | 40.72 | 38.35 |
| 2 bpp/FAST-MQ | 38.31 | 39.81 | 36.30 | 38.91 | 40.69 | 38.37 |
| 2 bpp/FAST-MEL | 38.31 | 39.81 | 36.29 | 38.92 | 40.70 | 38.38 |
| 4 bpp/DEF | 42.66 | 45.36 | 41.24 | 42.98 | 46.08 | 42.53 |
| 4 bpp/BYP | 42.05 | 44.96 | 40.77 | 42.50 | 45.68 | 42.18 |
| 4 bpp/FAST-MQ | 41.92 | 44.91 | 40.70 | 42.39 | 45.58 | 42.08 |
| 4 bpp/FAST-MEL | 41.93 | 44.91 | 40.70 | 42.44 | 45.62 | 42.11 |

TABLE 12

Results from the same experiment as Table 11, except that Kakadu's default visual optimization (CSF weights) is enabled in all these tests. As a result, PSNR values are lower and not necessarily all that meaningful, except to the extent that they can be used to compare the different configurations evaluated.

| | Image: | | | | | |
| --- | --- | --- | --- | --- | --- | --- |
| | Bike | | | Woman | | |
| Rate/Scheme | R-PSNR | G-PSNR | B-PSNR | R-PNSR | G-PSNR | B-PSNR |
| 1 bpp/DEF | 34.17 | 33.94 | 31.97 | 34.46 | 35.01 | 33.62 |
| 1 bpp/BYP | 33.54 | 33.18 | 31.43 | 34.29 | 34.84 | 33.48 |
| 1 bpp/FAST-MQ | 33.49 | 33.08 | 31.33 | 34.27 | 34.82 | 33.46 |
| 1 bpp/FAST-MEL | 33.49 | 33.08 | 31.33 | 34.27 | 34.81 | 33.45 |
| 2 bpp/DEF | 37.74 | 38.30 | 35.06 | 37.58 | 38.64 | 36.63 |
| 2 bpp/BYP | 37.28 | 37.70 | 34.75 | 37.22 | 38.18 | 36.27 |
| 2 bpp/FAST-MQ | 37.26 | 37.70 | 34.72 | 37.13 | 38.08 | 36.21 |
| 2 bpp/FAST-MEL | 37.25 | 37.69 | 34.72 | 37.12 | 38.06 | 36.19 |
| 4 bpp/DEF | 41.80 | 43.41 | 38.37 | 41.87 | 44.19 | 40.40 |
| 4 bpp/BYP | 41.47 | 43.09 | 38.08 | 41.50 | 43.76 | 40.17 |
| 4 bpp/FAST-MQ | 41.38 | 43.03 | 37.99 | 41.40 | 43.74 | 40.12 |
| 4 bpp/FAST-MEL | 41.39 | 43.04 | 38.01 | 41.41 | 43.75 | 40.13 |

As to processing throughput, the FAST block coding algorithm is much faster than the JPEG2000 variants. We have only started to optimize the decoding process, but already find that the FAST block decoding algorithm is about 9 times faster than the DEF option and about 5 times faster than the BYP option at 4 bpp.

These measurements are based on timing the actual execution (single threaded) of the block decoding process alone. For example, on a 3.5 year old 2.6 GHz Core i7 (Ivy Bridge) Macbook Pro, at 4 bpp, a single thread takes 45 ms to complete all FAST-MQ block decoding tasks for the Woman image tested above, with FAST-MEL taking 43 ms. For reference, the STD block decoding process for the same image takes 405 ms, while in the BYP configuration, Kakadu's implementation takes 218 ms. The Kakadu implementation is already widely regarded as being highly efficient, which makes these results significant[7]. We expect to have little difficulty achieving real-time decoding of 4K 4:4:4 video at 60 fps on recent 4-core CPU's.

[7] There is a faster implementation of both the STD and BYP block coding algorithms that is bundled with the so-called Speed-Pack variant of Kakadu (about 1.5× faster), but the same techniques that are used there can be applied also to accelerate the FAST block coder.

Encoding can be significantly faster than decoding for the FAST block coding algorithm, since it is extremely amenable to vectorization, especially if technologies such as AVX2 are considered. In our investigations so far, we find that the FAST-MEL cleanup pass requires less than 4 clocks per sample at bit-rates of around 4 bpp, but we expect to achieve higher throughputs again with careful optimization. We find that the FAST-MQ variant is slower by 0.5 to 1.0 clocks/sample than FAST-MEL, over a wide range of bit-rates.

The other two coding passes (not required) have much lower complexity again: the MagRef pass currently requires less than 0.4 clocks per sample, while the SigProp pass can be implemented with less than 1 clock per sample. These results already mean that encoders should usually be in a position to generate multiple coding passes, allowing them to employ PCRD-optimization techniques for rate control, if desired.

Experiments with Distributed Magnitude Coding

Here we present results from a second set of experiments, in which a triple bit-stream variant of the FAST Cleanup pass is used, with the distributed magnitude coding strategy described above. Both a linear 1×4 group structure and a 2×2 square group structure are tested here. In Table 13 and Table 14 we compare the performance of these configurations with the dual bit-stream consolidated magnitude configuration reported (in bold) within Table 11 and Table 12.

TABLE 13

Compression efficiency comparison between FAST block coder variants involving consolidated and distributed magnitude coding. The "CONS1 × 4" rows correspond to the variant reported in Table 11, with MEL coding, linear 1 × 4 groups, consolidated magnitude coding and a dual bit-stream Cleanup pass. The "DIST1 × 4" rows correspond to a variant with MEL coding, linear 1 × 4 groups, distributed magnitude coding and a triple bit-stream Cleanup pass. The "DIST2 × 2" configuration is the same, except that square 2 × 2 groups are employed. Results are reported in PSNR (dB) at 3 bit-rates, obtained with MSE (equivalently PSNR) as the PCRD optimization objective.

| | Image: | | | | | |
|---|---|---|---|---|---|---|
| | Bike | | | Woman | | |
| Rate/Scheme | R-PSNR | G-PSNR | B-PSNR | R-PNSR | G-PSNR | B-PSNR |
| 1 bpp/CONS1 × 4 | 34.95 | 35.08 | 32.73 | 35.50 | 36.45 | 34.76 |
| 1 bpp/DIST1 × 4 | 34.89 | 35.00 | 32.68 | 35.44 | 36.39 | 34.72 |
| 1 bpp/DIST2 × 2 | 34.79 | 34.92 | 32.62 | 35.45 | 36.41 | 34.75 |
| 2 bpp/CONS1 × 4 | 38.31 | 39.81 | 36.29 | 38.92 | 40.70 | 38.38 |
| 2 bpp/DIST1 × 4 | 38.23 | 39.67 | 36.17 | 38.75 | 40.50 | 38.23 |
| 2 bpp/DIST2 × 2 | 38.27 | 39.74 | 36.23 | 38.79 | 40.57 | 38.29 |
| 4 bpp/CONS1 × 4 | 41.93 | 44.91 | 40.70 | 42.44 | 45.62 | 42.11 |
| 4 bpp/DIST1 × 4 | 41.84 | 44.82 | 40.60 | 42.31 | 45.45 | 42.01 |
| 4 bpp/DIST2 × 2 | 41.82 | 44.80 | 40.55 | 42.34 | 45.48 | 42.04 |

Evidently, the new configurations tested here provide slightly inferior compression performance, with a loss of between 0.04 dB and 0.2 dB for the linear group structure and between 0.01 dB to 0.16 dB for the 2×2 group structure; some of this is attributed to the overhead of the triple bit-stream structure, but most is the result of the distributed magnitude coding process, which restricts the amount of context information available for exploiting redundancies between the magnitudes of significant samples.

In exchange for this small loss in compression efficiency, large improvements in decoding throughput are possible. An optimized implementation of this variant of the FAST block decoder, exploiting AVX2 and bit-manipulation instructions available on an Intel Skylake processor, is able to achieve twice the throughput of our less heavily optimized implementation of the earlier variant with consolidated magnitude coding. At 4 bpp, the average block decoding throughput is around 6 clock cycles per sample. While our implementation of the distributed magnitude variant of the FAST block decoder is more heavily optimized than the consolidated one, this is largely because the distributed variant provides more optimization opportunities: more vectorization opportunities; more opportunities for the use of bit manipulation instructions; and much smaller latencies. Meanwhile, the encoder is at least as fast. These observations are for the linear 1×4 group structure. It is expected that the same or higher throughput should be achievable with an optimized implementation of the 2×2 square group structure, since the operations are of similar compexity, and significant samples should be consolidated more compactly with the 2×2 group structure.

TABLE 14

Results from the same experiment as Table 4, except that Kakadu's default visual optimization (CSF weights) is enabled in all these tests. As a result, PSNR values are lower and not necessarily all that meaningful, except to the extent that they can be used to compare the different configurations evaluated.

| | Image: | | | | | |
|---|---|---|---|---|---|---|
| | Bike | | | Woman | | |
| Rate/Scheme | R-PSNR | G-PSNR | B-PSNR | R-PNSR | G-PSNR | B-PSNR |
| 1 bpp/CONS1 × 4 | 33.49 | 33.08 | 31.33 | 34.27 | 34.81 | 33.45 |
| 1 bpp/DIST1 × 4 | 33.41 | 33.01 | 31.29 | 34.22 | 34.76 | 33.40 |
| 1 bpp/DIST2 × 2 | 33.31 | 32.91 | 31.22 | 34.25 | 34.80 | 33.44 |
| 2 bpp/CONS1 × 4 | 37.25 | 37.69 | 34.72 | 37.12 | 38.06 | 36.19 |
| 2 bpp/DIST1 × 4 | 37.03 | 37.49 | 34.57 | 37.07 | 38.00 | 36.15 |
| 2 bpp/DIST2 × 2 | 37.06 | 37.51 | 34.59 | 37.12 | 38.07 | 36.20 |
| 4 bpp/CONS1 × 4 | 41.39 | 43.04 | 38.01 | 41.41 | 43.75 | 40.13 |
| 4 bpp/DIST1 × 4 | 41.25 | 42.83 | 37.86 | 41.29 | 43.60 | 40.01 |
| 4 bpp/DIST2 × 2 | 41.29 | 42.90 | 37.90 | 41.31 | 43.62 | 40.05 |

Key Features of the Invention

It will be appreciated that there are a number of distinctive features of the process and apparatus of the present invention, exemplified in the above description of the preferred embodiment. Advantageous features of the embodiment are briefly discussed below. Please note that the invention is not limited to these features, and that embodiments may include some or all of these features or may not include these features and may utilize variations.

A. The coding of significance is carried out on groups (group size 4 is preferred)

B. The coding of significance precedes other coding steps in several ways:
  a. First, in preferred embodiments the significance of a specific subset of groups (known as the AZC groups) is coded using an adaptive coding engine that generates its own bit-stream.
  b. Other significance information is coded on a group basis, before the magnitude and sign information for significant samples is coded.
  c. In dual bit-stream embodiments, significance information is coded for one entire line of code-block samples, before the magnitude and sign information for those samples is coded, after which the next line is processed, and so forth.
  d. In triple bit-stream embodiments, significance encoding and decoding are fully decoupled from magnitude and sign coding processes, so that significance can be encoded in any order, while decoders can recover significance information either concurrently or ahead of the final magnitude and sign information, by any desired margin.

C. Significance coding is based on group contexts, where the context of a group depends only on the significance information that has already been coded within the code-block.

D. The coding of the significance makes use of variable length coding, with a single codeword emitted for each group that is not otherwise known to be entirely insignificant, where the codewords depend upon the group context.

E. The coding of magnitude information for significant samples makes use of magnitude exponents associated with magnitudes that have already been coded. These are used to form a context, or predictor, with respect to which an upper bound on the magnitude exponents of significant samples is coded. This bound determines the number of additional magnitude bits which must be emitted to a raw bit-stream, along with the sign bit, for significant samples. In embodiments, the sum of the neighbouring magnitude exponents is used to form the context mentioned above, with 2 preceding neighbours used in the first line of the code-block and 4 neighbours (left, above-left, above and above-right) for all other lines in the code-block.

F. The magnitude coding context is converted to a predictor G, then a comma code is used to encode R=max{0,E−1−G}, where E is the magnitude exponent (necessarily non-zero) of the significant sample, after which the sign and R+G least significant magnitude bits are emitted if R>0, else the sign and R+G+1 magnitude bits are emitted.

G. In other embodiments, magnitude exponent bounds are coded in groups, being the same groups for which significance is coded. In such embodiments, a predictor for these bounds is formed based on previously coded magnitudes, preferably from a prior row of groups within the code-block, and a prediction residual is coded to identify the difference between the predicted bounds and the actual bounds, which need not be tight. In preferred embodiments, the prediction residual is coded using a variable length code, generating one codeword for each group that contains at least one significant sample. Preferably, these residual codewords are interleaved with the variable length codewords that code significance for the same groups, allowing exponent bound residual codewords and significance codewords to be decoded ahead of the point at which the actual magnitude bits and sign of the significant samples need to be unpacked from the same or a different raw bit-stream. The coded magnitude bound residuals do not in general provide a self-contained description of the magnitudes or even the magnitude exponents, since the predictors are based on magnitudes that must first be decoded.

H. The use of an additional SigProp coding pass for each code-block that encodes the same information as the JPEG2000 Significance Propagation coding pass for the corresponding bit-plane. In embodiments, this coding pass emits significance and sign bits to a raw codeword segment. In some embodiments, the original JPEG2000 Significance Propagation pass may be used for this purpose, operating in the "adaptive coder BYPASS mode." In embodiments, the original JPEG2000 Significance Propagation pass is modified such that the relevant significance bits associated with a set of samples are emitted to the raw bit-stream ahead of the corresponding sign bits for that set of samples, rather than interleaving significance and sign bits on a sample by sample basis. Preferred embodiments perform this interleaving on the basis of a set of 4 samples. Embodiments may include the additional modification that bits are packed into the bytes of the raw bit-stream with a little-endian, rather than big-endian bit order.

I. The use of an additional MagRef coding pass for each code-block that encodes the same information as the JPEG2000 Magnitude Refinement coding pass for the corresponding bit-plane. In embodiments, this coding pass emits refinement bits to a raw codeword segment. In some embodiments, this coding pass may be identical to the original JPEG2000 Magnitude Refinement coding pass, operating in the "adaptive coder BYPASS mode." In embodiments, the JPEG2000 Magnitude Refinement pass is modified by packing bits into the bytes of the raw bit-stream with a little-endian, rather than big-endian bit order.

J. An image encoding method in which Cleanup passes are generated for one or more bit-planes of each code-block, together with SigProp and MagRef coding passes for some or all of said bit-planes, along with distortion estimates for the various coding passes, wherein the actual coding passes emitted to the final codestream are selected from those generated on the basis of a rate-distortion optimization step.

K. The above method in which the coarsest bit-plane for which coding passes are generated within a code-block is determined based on the coarsest bit-plane for which coding passes are emitted to the codestreams of previous frames in a video sequence, from code-blocks that are similar, where similarity is measured in terms of spatial location and the subband to which the code-blocks belong.

L. The above method in which the coasest bit-plane for which coding passes are generated within a code-block is determined subject to a subband specific maximum data rate objective, that is inferred from the behaviour of the rate control process in preceding frames.

M. The above method in which the full set of coding passes that are generated within a code-block is determined based on a small set of summary statistics that are collected the same code-block in a previous frame, together with information about the coding passes that were selected by the rate-distortion optimization step for the code-block in said previous frame.

N. In embodiments, the above methods are modified by adjusting the coarsest bit-plane for which coding passes are generated up or down based on complexity estimates, which are indicative of the compressibility of each code-block and larger regions within the image. Embodiments employ a complexity estimate which is formed by accumulating the absolute values of subband samples within each code-block and taking an approximate logarithm of the result. Complexity values of this form are generated and stored, so that local and more global complexity comparisons can be formed around each code-block, relative to previously compressed content whose rate-distortion optimization outcomes are used as the reference to determine the bit-planes for which coding passes are being generated.

O. In embodiments, the above methods are modified by the incorporation of rate and distortion-length slope estimates for each code-block that are formed variously from the fitting of statistical models for the subband samples to summary statistics accumulated for each code-block, or from the counting of significant samples within the code-block at each of a plurality of magnitude bit-planes.

P. A transcoder that converts a standard JPEG2000 block bit-stream to a FAST block bit-stream, of the nature described here, where the Cleanup pass encodes the information decoded from a corresponding JPEG2000 Cleanup pass, along with all preceding JPEG2000 coding passes, while the information found in any subsequent JPEG2000 SigProp and MagRef coding passes is encoded by the FAST SigProp and MagRef coding passes.

Q. A transcoder that converts a FAST block bit-stream, of the nature described here, into a standard JPEG2000 block bit-stream, where the information found in the FAST Cleanup pass is encoded by a corresponding JPEG2000 Cleanup pass, together with all required preceding JPEG2000 coding passes, while the information found in FAST SigProp and MagRef coding passes is encoded by the corresponding JPEG2000 SigProp and MagRef coding passes.

R. An image encoding service that first encodes an image using the FAST block coding algorithm described above and then selectively transcodes code-blocks to the standard JPEG2000 representation in order to achieve quality scalability in the communication or archiving of the images (including video).

S. An image rendering service that receives images encoded in the standard JPEG2000 format and then selectively transcodes code-blocks to the FAST block coder representation in order to optimize rendering efficiency.

T. An image transcoding service that receives content coded with one block coder representation and emits content using the other block coder representation, in order to improve the throughput or power consumption that are available to separate encoding or decoding systems. There is the potential for a cloud-based service that does the transcoding so that encoders can be very fast or decoders can be very fast, while other parts of the system can retain the quality scalability features of JPEG2000.

There are a number of applications for embodiments of this invention, many of which have been discussed above. Four particular application areas which can benefit from embodiments of the present invention are as follows.

Application to JPEG-XS

The JPEG ISO/IEC working group JTC1/SC29/WG1, known as JPEG, has announced a low latency, low complexity image coding standardization activity known as JPEG-XS. Applications for this standard include use as a mezzanine format for media capture and distribution, where JPEG2000 is sometimes used at present.

Envisaged applications primarily include display interconnect for high resolution high frame rate displays. While this second application might at first seem an unlikely target for a FAST variant of JPEG2000, we note that the JPEG2000 framework already provides transform and coding structures that are compatible with low latency. In particular, 1. Part-2 of the JPEG2000 standard includes Arbitrary Decomposition Style (ADS) and Downsampling Factor Style (DFS) options that provide considerable flexibility in defining the transform structure. These options have been available at least in the popular Kakadu implementation of JPEG2000 for many years. In particular, the DFS option effectively allows different numbers of wavelet decomposition levels to be used in the horizontal and vertical directions. For ultra low latency applications, a combination of 2 vertical decomposition levels with a much larger number of horizontal decomposition levels (e.g. 6) can yield good compression.

2. JPEG2000 allows for rectangular, as well as square code-blocks, including code-blocks with nominal heights as small as 4 lines and widths as small as 1024 columns. This can be combined with resolution-specific precinct dimensions to further constraint the height of code-blocks. In particular, with two levels of vertical wavelet decomposition, one can arrange for code-blocks from the first (highest) vertical subband to have 4 lines each, while code-blocks produced by the second level of vertical decomposition can have 2 lines each. A third level of vertical wavelet decomposition can produce code-blocks with only 1 line each.

3. The above code-block/precinct configuration can be combined with the spatially progressive packet progression order (notably PCRL) to ensure that a full set of code-blocks from all subbands are emitted by the encoder as often as every 8 image lines, without resorting to tiling, which can damage compression performance and introduce visual artefacts.

4. We note that the code-block structure of JPEG2000 naturally provides a significant level of computational parallelism that can be utilized to achieve high data rates, especially in hardware. Additionally, the PCRD (Post Compression Rate Distortion Optimization) property of JPEG2000 can be used to achieve a desired target bit-rate (even in a CBR setting) without relying upon dynamic modulation of quantization parameters, although adaptive quantization is also supported by Part-2 of the standard for applications that choose to use it.

5. Finally, we note that JPEG2000 codestreams can be partially decoded (for picture-in-picture applications) or decoded in reverse order, allowing large format video streams to be vertically flipped or rotated in the compressed domain without the need for a full frame buffer.

The main modification required to adapt JPEG2000 to fully meet the objectives of JPEG-XS is an alternative block coding algorithm with significantly reduced complexity.

Application to High Resolution Video Capture

Most mobile devices do not have sufficient CPU power to directly compress the high resolution video streams that their image sensors are capable of producing using JPEG2000. A FAST block coding option addresses this problem by allowing compressed streams to be produced in real time and then later transcoded to the JPEG2000 format if quality scalability attributes are important—e.g. for efficient interactive browsing via JPIP. While transcoding is possible between any two compression formats, the advantages of the FBCOT algorithm described in this document are:

a) Transcoding can take place in the transformed domain;
b) Transcoding is inherently lossless, even if though the compression itself is lossy; and
c) Transcoding can be done selectively, as the need arises, even on a code-block by code-block basis.

Cameras used in cinematography can be expected to derive particular benefit from a FAST block coder, since the digital cinema workflow is strongly oriented towards JPEG2000, while cameras themselves are often forced to adopt a different compression strategy due to computational/hardware constraints.

More generally, it expected that a FAST block coding option would provide compelling reasons to transition the processing architectures of high end digital cameras towards JPEG2000-centric structures, which provide much more functionality than JPEG, and potentially significant savings in coding and energy efficiency.

Application to Energy Efficient Image/Video Rendering

In many applications of JPEG2000, content is rendered multiple times. For example, large images are viewed interactively, by resolution or region of interest, so that successive rendered views contain many code-blocks in common. It is rarely practical to cache fully decompressed code-blocks in memory, but the availability of a FAST block coding option means that intelligent content caches can choose to transcode code-blocks that are being repeatedly accessed to a representation that can be decoded more quickly, or with less energy consumption. The advantage of the FBCOT algorithm described in this document is that transcoding of standard JPEG2000 code-block bit-streams to fast block bit-streams is both computationally efficient and entirely lossless; all aspects of the original JPEG2000 representation are preserved exactly.

Application to Cloud Based Video Services

JPEG2000 provides an excellent framework as an intermediate distribution format for video content, allowing the resolution (or even region) of interest to be extracted efficiently, close to the point of delivery, whereupon it may be transcoded into any of a number of common streaming video formats. While this use is already viable and potentially favourable over other approaches, such applications can further benefit from the availability of a light weight block coder, which preserves all other relevant functionality.

The above embodiments specifically relate to use within a JPEG2000 format. Aspects of embodiments are not limited to this. Some embodiments may be used in other image processing formats. For example, the use of a single code-word segment comprising two parts, each part being differently coded by different coding processes, may find application in other image processing contexts.

As discussed above, embodiments of the invention can be implemented in software or hardware or a mixture of software and hardware. Where software is used to implement the invention, the software can be provided on computer readable medium, such as disks, or as data signals of a network, such as the internet, or any other way.

It will be appreciated by persons skilled in the art that numerous variations and/or modifications may be made to the invention as shown in the specific embodiments without departing from the spirit or scope of the invention as broadly described. The present embodiments are, therefore, to be considered in all respects as illustrative and not restrictive.

Addressing the JPEG-XS Requirements

This section is intended to supplement the discussion above. We explain here how the FAST block coder can be used in a low latency, high throughput video compression/decompression environment, noting that this is not its only application.

Wavelet Transforms and Precincts for Low Latency

We begin by reminding the reader that the discrete wavelet transform (DWT) involves analysis and synthesis operators with finite spatial support, so that subband data can be generated (compression) and consumed (decompression) progressively as image lines appear. To exploit this property for applications with low delay/memory requirements, the JPEG2000 standard offers a variety of options for organizing code-blocks into spatial collections, known as precincts, and to sequence the coded information associated with these precincts in a spatially progressive manner. The bit-streams associated with each code-block in a precinct are arranged in so-called packets, with one packet per quality layer. In this discussion, we consider packets to be equivalent to precincts, since codestreams produced using the FAST block coding algorithm would normally only have one quality layer; moreover, spatially progressive packet sequences keep all the packets of each precinct together.

Precinct dimensions play an additional role in constraining the dimensions of code-blocks. This is important, since precinct dimensions can be specified differently for each resolution level. Finally, we note that the DFS (Downsampling Factor Style) feature of JPEG2000 Part-2 may be used to control whether each level in the DWT decomposition structure splits the preceding level horizontally, vertically, or both horizontally and vertically into subbands.

Figure 18:
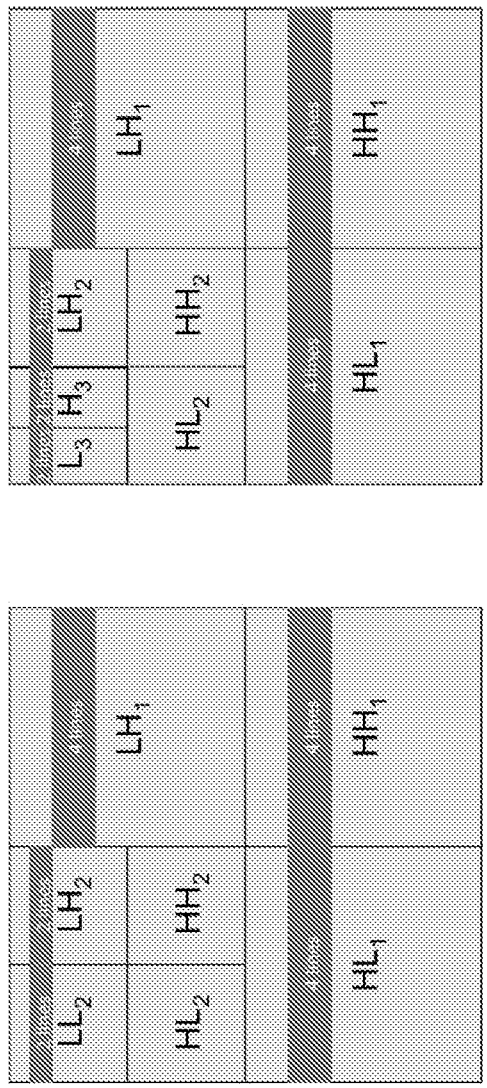
FIG. 18 is an example 2 level Mallat (left) and 3 level DFS (right) DWT structures, with the vertical partitioning of subbands into "precinct bands" shown in shading.
Figure 19:
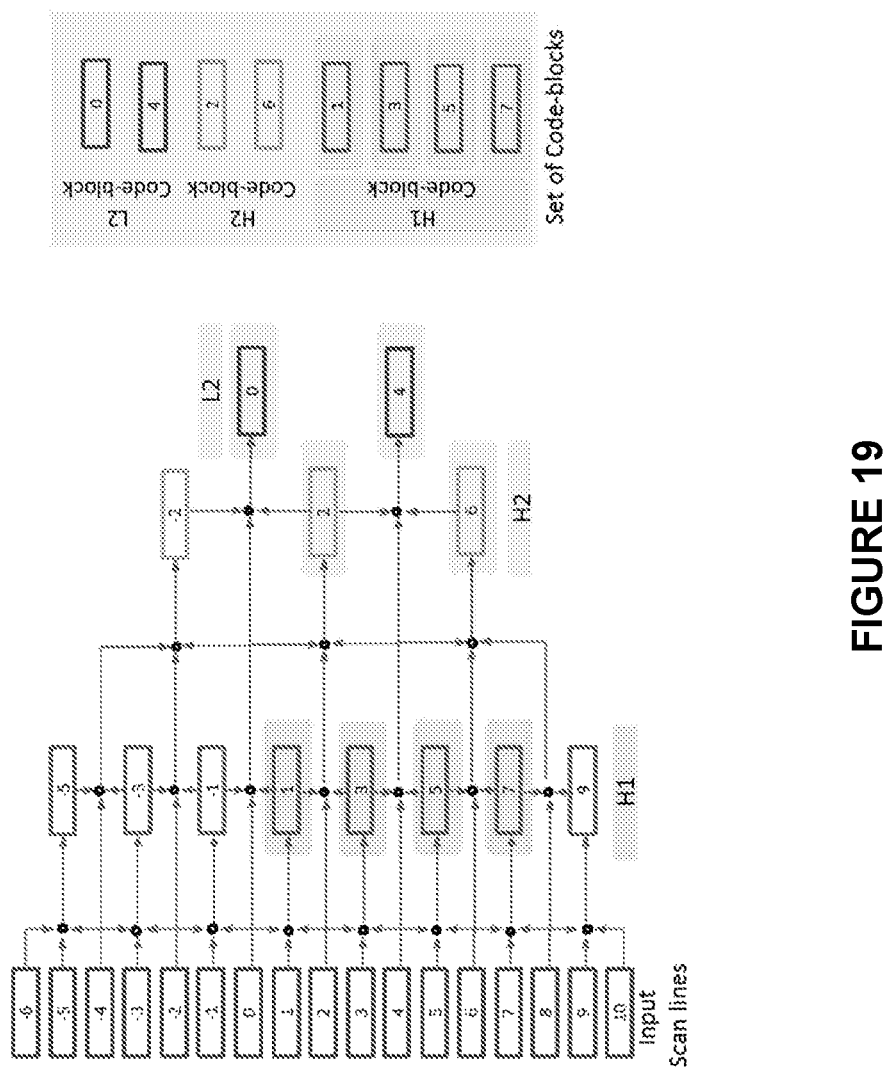
FIG. 19 is a diagram showing two levels of vertical decomposition on input scan lines to produce 8 transformed lines of the code-block "flush-set". The 5/3 DWT analysis lifting steps and the corresponding dependencies that they create between output code-block lines and input scan lines are shown.

FIG. 18 illustrates the subband structure associated with 2 levels of conventional Mallat-style decomposition, along with a DFS subband structure obtained by using 3 levels of decomposition, where the first two levels split horizontally and vertically, while the last level splits only horizontally. The figure also shows how the subbands are partitioned into precinct-bands, assuming precincts of height 8 in the highest resolution level, height 4 in the second highest resolution level, and height 2 for all lower resolution levels. Note that precincts are defined on the resolution level that is split by the corresponding DWT stage, whence they are projected onto the subbands generated by that stage to obtain precinct-bands. Code-block dimensions are constrained to ensure that they partition their precinct-bands. Since both transform structures in FIG. 18 involve only 2 levels of vertical decomposition, code-blocks in the highest vertical frequency subbands have height 8/2=4, those at the next level have height 4/2=2, and those in subsequent levels all have height 2/1=2. With the popular Kakadu[8] implementation of JPEG2000, the decomposition structures of FIG. 18 may be obtained using the following options:
1. Mallat: Clevels=2
   Cprecincts={8,8192}, {4,8192}, {2,8192}
2. DFS: Clevels=3 Cprecincts={8,8192}, {4,8192}, {2,8192}
   Cdecomp=B(-:-:-),B(-:-:-),H(-)

[8] See http://www.kakadusoftware.com

In practice, for JPEG-XS applications, we suggest using this same approach, but with a larger number of decomposition levels, so that the lowest frequency subband is partitioned more finely into horizontal subbands. From the perspective of latency and memory consumption, however, the key attributes are the number of vertical levels of decomposition and the vertical dimensions of precincts (and hence code-blocks).

We now provide an analysis of the intrinsic end-to-end delay of the approach, ignoring for the moment any delay due to computation or communication of compressed content. For the analysis, we assume the 5/3 LeGall DWT, which can be either reversible (for truly lossless compression) or irreversible. The latter leads to superior compression efficiency at high bit-rates[9]. The irreversible 5/3 transform is accommodated via the JPEG2000 Part-2 Arbitrary Transform Kernels (ATK) feature. In particular, the Kakadu implementation of JPEG2000 has long supported this capability via the following options:
Kextension:I2=SYM Kreversible:I2=no
Ksteps:I2={2,0,0,0},{2,-1,0,0} Kcoeffs:I2=-0.5,-0.5,0.25, 0.25

[9] At high bit-rates, as quantization step sizes become small, the effect of the integer rounding operations associated with the reversible 5/3 transform of JPEG2000 Part-1 tend to amplify quantization errors sufficiently that performance becomes noticeably inferior to that achieved with an irreversible transform.

Our analysis of intrinsic delay depends only on the vertical decomposition structure, for which we assume 2 levels, as in FIG. 12. Considering just the vertical transform, let $H_1$ denote the high-pass subband produced by the first level of decomposition, and let $H_2$ and $L_2$ denote the high- and low-pass subbands produced by the second level. With respect to the two dimensional decompositions shown in FIG. 12, $H_1$ is equivalent to $\{HL_1, LH_1, HH_1\}$, $H_2$ is equivalent to $\{HL_2, LH_2, HH_2\}$, while $L_2$ corresponds to all of the other subbands.

We assume the same precinct dimensions discussed above, so that code-blocks from $H_1$ have 4 lines each, while those associated with $L_2$ and $H_2$ have 2 lines each. We note that the spatially progressive packet progression sequence[10] from JPEG2000 has the property that higher resolution precincts appear in the codestream after the spatially corresponding lower resolution precincts. For the conditions described above, the packet progression sequence can be expanded as follows, where the numbers in parentheses indicate the height of code-blocks that are emitted within each precinct.

[10] Specifically, we refer to the PCRL sequence, in which the spatial dimension progresses most slowly, then the component dimension (i.e., component interleaving), followed then resolution and quality layers which advance most quickly.

$$L_2(2) \to H_2(2) \to H_1(4) \to L_2(2) \to H_2(2) \to H_1(4) \to L_2(2) \to H_2(2) \to H_1(4)$$

Evidently, the compressed content (code-block bitstreams in JPEG2000 packets) may be flushed to the resultant codestream every 8 original image lines. We refer to the corresponding set of code-blocks as the code-block "flush set."

The specific relationship between input image lines and the corresponding subband lines that belong to code-blocks is shown in FIG. 14. The two stages of vertical 5/3 DWT and the inherent dependencies between the code-blocks and the input line samples can be clearly deduced from the figure. Note that for the encoder to generate each flush-set, 11 lines of the input image (lines 0 to 10) need to be buffered. That is, in addition to the 8 lines being processed (lines 0 to 7), three further lines (lines 8 to 10) need to be buffered as part of the DWT analysis computation.

Figure 20:
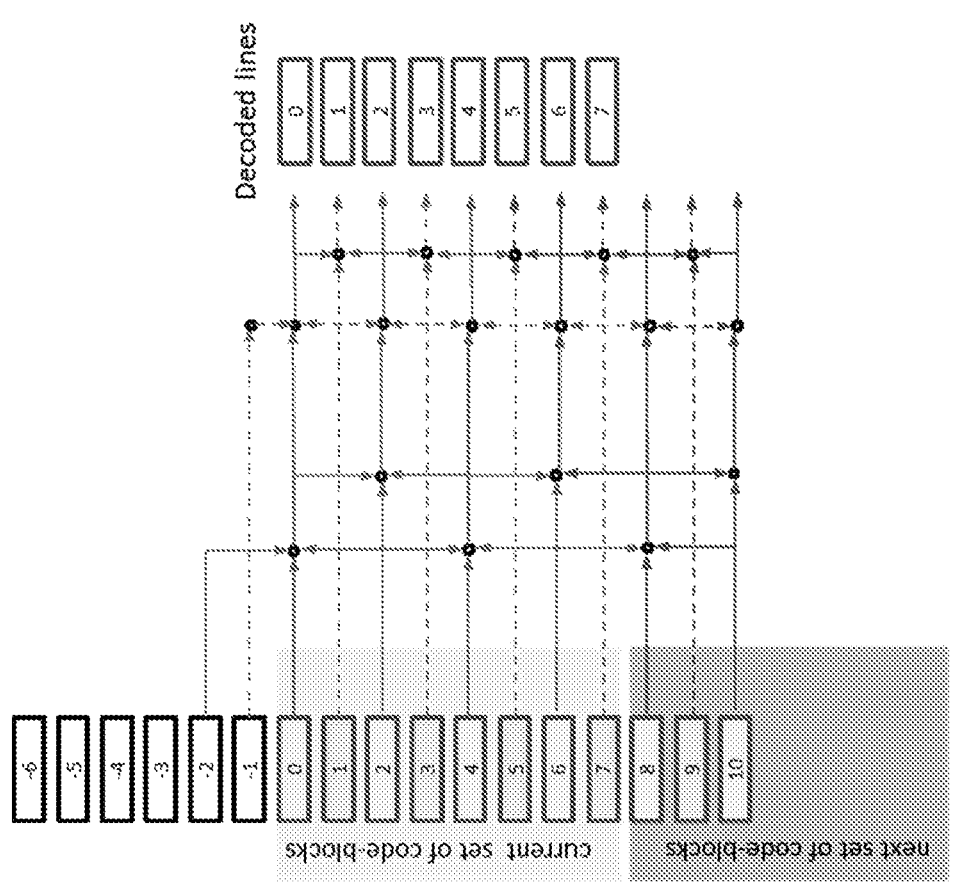
FIG. 20 is a diagram showing vertical 5/3 DWT synthesis steps for decoding 8 scan lines. The dependence of decoded scan lines on coded subband lines from the next consecutive second code-block "flush-set" is highlighted in shading. Decoded lines 5 to 7 require samples from both the first and second flush-sets.

Once code-blocks are available at the decoder, the synthesis operation is performed to recover the image scan lines. The synthesis procedure is illustrated in FIG. 20 where dependencies between decoded scan lines and sets of code-block samples are highlighted. Note that lines 0 to 4 can be decoded, requiring coefficients only from the first "flush-set," that was generated by the encoder based on image lines 11 and before. To decode lines 5 to 7, the decoder needs access to the second flush-set. This dependency is highlighted in the figure with the red colored lines, showing the synthesis paths that require data from the second flush-set. This second flush-set cannot be made available until the encoder has seen line 19.

The buffering requirement and the corresponding end-to-end delay that is experienced for each decoded line is summarized in Table 15. The maximum delay experienced is 14 lines and occurs for decoding line 5. This delay is equal to the difference between the line number being decoded and the maximum image line number required at the encoder.

TABLE 15

Delay inducing relationship between reconstructed output lines and required source lines.

| Line at decoder | Required flush-sets | Latest required source line | Delay (lines) |
|---|---|---|---|
| 0 | First | 10 | 11 |
| 1 | First | 10 | 10 |
| 2 | First | 10 | 9 |
| 3 | First | 10 | 8 |
| 4 | First | 10 | 7 |
| 5 | First & Second | 18 | 14 |
| 6 | First & Second | 18 | 13 |
| 7 | First & Second | 18 | 12 |

We conclude this section by noting that additional end-to-end delay is necessarily incurred in the communication of information between encoder and decoder. Under CBR (Constant Bit-Rate) conditions, the communication delay associated with each flush-set is equivalent to 8 image lines, so that the minimum end-to-end delay that can be achieved with the DWT and precinct configurations described above is 22 lines. The JPEG-XS requirements specify a maximum delay of 32 lines under CBR conditions. This means that an encoder would have the flexibility to distribute the bits associated with consecutive flush-sets non-uniformly.

It should also be noted that the above configuration is only an example. Other configurations of interest may involve different DWT transform kernels that still allow the 32 line end-to-end delay requirement of JPEG-XS to be satisfied.

Discussion of Hardware Resources

Since the hardware complexity of the discrete wavelet transform (DWT) is already well understood[11], we focus here on the complexity of the FAST block coding algorithm, noting that working/state memory for a lifting-based implementation of the 5/3 DWT (analysis or synthesis) consists of only two (2) line buffers. All other memory required for storing subband samples can be associated with the code-blocks themselves, as explained below. For all but the highest precision applications, it suffices to provide 16 bits per sample in each of these two line buffers.

[11] See, for example, Chapter 17 of Taubman and Marcellin, JPEG2000: Image Compression Fundamentals, Standards and Practice, Springer, 2002.

The discussion below relates to variants with the 1×4 group structure and consolidated magnitude coding.

However, similar considerations apply to *varians* with the 2×2 group structure and/or distributed magnitude coding.

VLC Tables

The encoder needs 128 entries of 9 bits each: 6 bits for the codeword; 3 bits for its length. These 128 entries correspond to 8 contexts, each with a 4-bit significance pattern to be encoded.

The decoder needs 512 entries of 7 bits each: 4 bits for the decoded significance pattern; 3 bits for the codeword length. These 512 entries correspond to 8 contexts, each producing codewords with at most 6 bits.

Code-Block Sample Buffer Memory

Assuming that the entire code-block is stored in local memory, a maximum of 4096 entries of 16 bits each should be sufficient for most applications. Very high precision applications may adopt a larger bit-depth for the subband samples.

It is not hard to see that concurrent processing of coding passes can be employed to reduce this memory requirement to just 4 code-block lines, noting that the SigProp and MagRef coding passes work on 4-line stripes. However, this itself is of no interest when using the code-block dimensions proposed in above, all of which are either 2 or 4 lines in height.

Encoders can achieve further reductions in sample buffering by using the following strategy. Each Cleanup pass[12] requires buffering only for one line of actual sample values, so processing can commence as soon as the first line of a code-block has been supplied by the wavelet transform machinery. Although SigProp and MagRef coding passes may not commence so early, these both operate only on the next finer bit-plane, so it is sufficient for the encoder to provide storage for just 1 full line of subband samples, plus 3 extra lines that hold only one magnitude bit and one sign bit per sample.

[12] Encoders may generate multiple Cleanup passes to give the rate control machinery more options.

Thus, working with 16-bit subband samples, encoders need only provide storage for 22W bits, where W is the width of the code-block.

A similar strategy could be adopted during decoding if the FAST block coding algorithm were augmented with a third bit-stream, as explained above, so that significance information for an entire set of 4 code-block lines could be decoded ahead of the sign/magnitude information. With the current (preferred) form of the FAST block coding algorithm, however, a code-block that is only 4 lines high requires storage for at least 3 lines of subband samples.

Magnitude Exponent Memory

Magnitude exponents are required for the magnitude coding step and they can also be used to directly infer significance—a sample is significant if and only if its magnitude exponent is non-zero. Encoders and decoders can avoid the need for explicitly storing magnitude exponents, deriving them on the fly from the sample values themselves. Nevertheless, both encoding and decoding implementations may find it useful to store the magnitude exponents associated with a current line that is being processed and the preceding line (used for magnitude context formation).

For lower precision image/video compression applications, 4 bits are sufficient to represent a magnitude exponent, while high precision applications may require 5 bits per exponent.

Inter-Pass State Information 1 bit is required per code-block sample to record its significance, as found in the Cleanup coding pass, so that the SigProp and MagRef coding passes can readily identify the samples for which extra information is to be encoded or decoded, as appropriate.

Storage for Coded Bits

The access bandwidth associated with the codeword segments themselves is significantly lower than that associated with the sample values and coder state information. Under CBR conditions, the total amount of compressed data for a set of working code-blocks can be easily bounded and it may make sense to store all such data on-chip, offering multiple low bandwidth access ports to a multitude of parallel block coding engines. Alternatively, it may be preferable to move portions of the coded data onto or off chip to a larger external memory store, so that only a small amount of local storage for compressed data is actually required. The costs associated with this are hard to analyze, but should ultimately be significantly less than the other memory costs.

Computation for Significance Coding

Significance coding is performed on groups of 4 samples at a time, so the throughput requirements are comparatively low. Coding contexts are formed using simple binary logic, operating on a small collection of neighbouring significance flag bits. The complexity of variable length encoding and decoding processes is well understood, but note here that the codeword lengths have only a small range from 1 to 6 bits, which also helps simplify the implementation.

MQ Arithmetic Coder

We currently prefer the use of MEL coding over MQ coding for the AZC group significance symbols, but it is nonetheless worth saying something about the hardware resources associated with MQ coding.

The multiplier-less MQ coder, with bounded carry propagation, can be implemented very efficiently in hardware (by design). Since only one coding context is employed in the FAST block coder (the AZC context), the MQ coder is effectively just a type of adaptive run-length coder, that has been optimized already for a reasonable trade-off between complexity and coding efficiency. It is characterized by low precision arithmetic and logic operations, with a probability estimation state machine that has 46 reachable 16-bit entries.

The overall throughput of the MQ coder need be no larger than one symbol per 4 code-block samples in the FAST block coding algorithm described here, so low cost pipelined implementations can be employed, and renormalization shifts of more than 1 can be allowed to stall the pipeline if desired, since the number of such shifts can be deterministically bounded, and neither the MQ encoder nor the MQ decoder need be tightly synchronized with the other encoding or decoding steps.

MEL Adaptive Coder

As detailed above, the MEL coder used for AZC group significance coding in the FAST block coding algorithm involves only 13 states. State transitions are also trivial, leading to exceptionally simple hardware implementations.

Computation for Magnitude Coding

Formation of the κ[n] values (magnitude exponent predictors) requires a total of 4 low precision adds (8-bit arithmetic is plenty), discarding the least significant 2 bits of the result. In the worst case, one κ[n] value must be computed per sample. The derived quantities u[n] and m[n] have even lower precision and can be formed using simple arithmetic and logic operations. Comma codes are trivial to implement and the remainder of the algorithm involves packing or unpacking of magnitude bits and the sign bit into the raw bit-stream.

To generate magnitude exponents, the encoder should be equipped with bit scanning logic that can find the most significant set bit in a magnitude value. Similarly, the decoder should be equipped with bit scanning logic for both decoding of the comma code and recovery of the magnitude exponents. Bit scanning is largely just a pool of AND gates.

Bit Stuffing

The FAST block coding algorithm described here uses bit stuffing to avoid the appearance of false marker codes (FF90h to FFFFh) within its codeword segments. This is a requirement for many existing JPEG/JBIG standards and should probably be retained. The introduction of bit-stuffing should not contribute significantly to hardware complexity, although it does have a small impact on software implementations.

Brief Discussion of Processing Delay

One could argue that block-based coding strategies might produce larger end-to-end delays in practice, than strategies that process samples or lines consecutively, without block partitions. Although the encoder can start processing the Cleanup pass as soon as the first line (line-0) of samples starts to arrive from the DWT analysis engine (i.e. without waiting for a block to be formed), with dual bit-stream arrangements, the other coding passes (if required) cannot commence until the last line (line-1 or line-3) starts to arrive. Similarly, the decoder can emit samples from the Cleanup pass in scan-line order, but these samples may need to be delayed until the SigProp and MagRef coding passes can start to produce results, which cannot happen until Cleanup decoding has reached the start of the last line (line-1 or line-3) in the short code-blocks that are proposed for JPEG-XS.

These considerations suggest at first that an implementation which can process the coding passes only at a uniform rate (e.g., due to clock-rate or memory bandwidth limitations) might add significantly to the practical end-to-end delays of the overall compression/decompression system, but note that this is only for dual bit-stream arrangements.

We argue, however, that the actual implications of inter-pass decoding delay are less significant than one might at first think. As studied above, the end-to-end delay is actually dominated by the low resolution subbands for which we propose to use code-blocks of height 2. Meanwhile, the $H_1$ subbands, with code-blocks of height 4, are both available sooner at the encoder and needed later at the decoder. In fact, the code-blocks from the $H_1$ subbands that have height 4 are not required for DWT synthesis until 2 lines later than the code-blocks from the $H_2$ and $L_2$ subbands, both of which have height 2. By happy coincidence, this difference of 2 scan lines is also the difference in the delays between the points at which a concurrent block decoder can start completing subband samples for each type of code-block. It follows, therefore, that the only processing delay of interest is that of the height 2 code-blocks, which is essentially one scan-line.

Nonetheless, the triple bit-stream arrangement of FIG. 7 is still preferable, because it allows the inter-pass decoding latency to be reduced to 1 line or even less, determined only by the rate at which the significance information can be decoded, which is done on groups of 4 samples at a time. Combining this low inter-pass delay with the arguments above, suggests that the practical impact of this small processing latency on end-to-end delay can be reduced to zero.

The invention claimed is:

1. A method of image compression, involving wavelet transformation of an image, where subband image samples are formed into code-blocks, with a block coding process that comprises:

determining for each of the subband image samples whether the subband image sample is significant or insignificant, wherein a subband image sample is determined to be significant if the subband image is non-zero and wherein a subband image sample is determined to be insignificant otherwise;

for each subband image sample determined to be significant, computing a magnitude-minus-one value for the subband image sample;

for each subband image sample, computing a magnitude exponent for the subband image sample, the magnitude exponent being a smallest non-negative integer e, such that 2 raised to the power of e is greater than twice the magnitude-minus-one;

collecting the subband image sample of the code-block into groups of n consecutive subband image samples in a scanning order in accordance with a scanning pattern;

assigning a coding context to each of the groups, the coding context depending only on the significance of subband image samples associated with previous groups in scanning order, wherein groups are identified as all zero content (AZC) groups, wherein all of the subband image samples used to from the coding context for the group are insignificant;

encoding significance information on a group by group basis with at least two separate bit-streams, the two separate bit-streams consisting of:
- a first bit-stream that encodes a group significance symbol for all groups identified as AZC groups, wherein the group significance symbol indicates whether or not any subband image sample in the group is significant, and
- a second bit-stream that jointly encodes the significance of all subband image samples in a group, for non-AZC groups and significant AZC groups, wherein at least one subband image sample in the group is significant, and wherein the at least two separate bit-streams being able to be concurrently decoded; and coding the magnitude-minus one value and sign information for significant subband image samples, using codes that depend only on the significance and magnitude-exponent of previous subband image samples in the scanning order;

arranging the significance and magnitude code bits for the code blocks into the at least two separate bit streams that are able to be decoded concurrently.

2. The method in accordance with claim 1, wherein the plurality of bit-streams comprise three bit-streams that are arranged to form a coded representation of the code-block, referred to as the code-block's codeword segment, by two of the three-bit streams growing forward consecutively from a start of the codeword segment, while a third bit stream grows backward from the end of the codeword segment, and wherein the interface between the two forward growing bit-streams and the overall length of the codeword segment are identified, thereby allowing a decoder to recover and concurrently process the plurality of bit-streams and the third bit-stream from the codeword segment.

3. The method in accordance with claim 2, wherein the magnitude-minus-one and sign information for significant samples is separated into a variable length coded part and an uncoded part, where bits produced by the variable length coded part are interleaved into the second bit-stream, along with code bits that jointly encode the significance of all subband image samples with each significance AZC group and each non-AZC group while the uncoded part is arranged in the third bit-stream, referred to as a raw bit-stream.

4. The method in accordance with claim 3, wherein the groups of a code-block are partitioned into sets, each set corresponding to a line or stripe with the code-block, and a number of bits of magnitude information that are included in the raw bit-stream for each significant sample in a set depends only on the significance and a variable length magnitude code bits for the same set, wherein are found in other neighboring samples within previous sets.

5. The method in accordance with claim 4, wherein the magnitude exponents of neighboring subband image samples in the previous set are used to form magnitude exponent predictors for a current set, and a variable length coded part of the magnitude information encodes the differences, referred to as magnitude exponent residuals, between the magnitude exponent predictors and actual magnitude exponents or upper bounds thereof, within the current set.

6. The method in accordance with claim 5, wherein the coding magnitude exponent residuals is performed on a group basis, wherein only one residual is coded per group, such the combination of this residual with the corresponding magnitude exponent predictor provides an upper bound for the magnitude exponent of each of each significant sample in the group.

7. The method in accordance with claim 6, where prediction residual and significance codewords are interleaved within an identical bit-stream and the interleaving of residual and significance codewords is such that the significance codewords for each pair of consecutive groups are followed by the prediction residual codewords for the same pair of consecutive groups, if the pair of consecutive groups contain significant subband image samples, being followed by the significance codewords for the next pair of consecutive groups, and so forth.

8. The method in accordance with claim 1, wherein the first bit-stream that encodes the significance of the AZC groups is produced using an adaptive run-length coding engine.

9. The method in accordance with claim 1, wherein coding of significance within a group is based on context, the context for the group being determined from the significance information that has already been coded for previous groups in the scanning order, and wherein the context of a group also determines whether the group is an AZC group or a non-AZC group.

10. The method in accordance with claim 9, wherein the second bit-stream that jointly encodes the significance of all subband image samples within each significant AZC group and each non-AZC group utilizes variable length codes, and a single codeword is emitted for each group that is not an insignificant AZC group.

11. The method in accordance with claim 1, wherein the method of image compression complies with the JPEG 2000 format.

12. The method in accordance with claim 1, wherein the significance and magnitude coding, referred to as Cleanup pass, produce a codeword segment, referred to as a Cleanup segment, that communicates quantized subband samples within a code-block relative to a certain magnitude bit-plane.

13. The method in accordance with claim 12, wherein an additional codeword segment, referred to as a SigProp segment, is produced that represents the significance of certain samples within the code-block that were coded as insignificant in the Cleanup pass, relative to the next lower magnitude bit-plane, along with the sign information for samples that are significant only relative to this finer bit-plane;
- wherein the subband image samples having significance coded in the SigProp segment are identical to those subband image samples that would be encoded in a corresponding JPEG 2000 Significance Propagation pass; and
- wherein a further codeword segment, referred to as a MagRef segment, is produced that holds the least significant magnitude bit, with respect to the next lower bit-plane, for subband image samples that are coded as significant in the Cleanup pass.

14. The method in accordance with claim 1, wherein the image samples that undergo image compression are in a standard JPEG2000 block bit-stream.

15. An encoding apparatus, comprising:
a memory; and
a processor that is in communication with the memory and has a structure to perform instructions from a program stored in the memory so that the following image compression process involving wavelet transformation of an image, wherein subband image samples are formed into code-block, is performed:

determining for each of the subband image samples whether the subband image sample is significant or insignificant, wherein a subband image sample is determined to be significant if the subband image is non-zero and wherein a subband image sample is determined to be insignificant otherwise;

for each subband image sample determined to be significant, computing a magnitude-minus-one value for the subband image sample;

for each subband image sample, computing a magnitude exponent for the subband image sample, the magnitude exponent being a smallest non-negative integer e, such that 2 raised to the power of e is greater than twice the magnitude-minus-one;

collecting the subband image sample of the code-block into groups of n consecutive subband image samples in a scanning order in accordance with a scanning pattern;

assigning a coding context to each of the groups, the coding context depending only on the significance of subband image samples associated with previous groups in scanning order, wherein groups are identified as all zero content (AZC) groups, wherein all of the subband image samples used to from the coding context for the group are insignificant;

encoding significance information on a group by group basis with at least two separate bit-streams, the two separate bit-streams consisting of:
- a first bit-stream that encodes a group significance symbol for all groups identified as AZC groups, wherein the group significance symbol indicates whether or not any subband image sample in the group is significant, and
- a second bit-stream that jointly encodes the significance of all subband image samples in a group, for non-AZC groups and significant AZC groups, wherein at least one subband image sample in the group is significant, and wherein the at least two separate bit-streams being able to be concurrently decoded; and coding the magnitude-minus one value and sign information for significant subband image samples, using codes that depend only on the significance and magnitude-exponent of previous subband image samples in the scanning order;

arranging the significance and magnitude code bits for the code blocks into the at least two separate bit streams that are able to be decoded concurrently.

* * * * *